US012748538B2

(12) United States Patent
Collins et al.

(10) Patent No.: US 12,748,538 B2
(45) Date of Patent: Sep. 29, 2026

(54) GRAPH-BASED MEMORY STORAGE

(71) Applicant: NVIDIA Corporation, Santa Clara, CA (US)

(72) Inventors: Alexander James Collins, Edinburgh (GB); Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/589,438

(22) Filed: Jan. 31, 2022

(65) Prior Publication Data

US 2023/0244391 A1 Aug. 3, 2023

(51) Int. Cl.
*G06F 3/06* (2006.01)

(52) U.S. Cl.
CPC .......... *G06F 3/0629* (2013.01); *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

2017/0293534 A1* 10/2017 Auvenshine ........ G06F 11/1464
2019/0005071 A1* 1/2019 Kvalnes .............. G06F 16/7854
2020/0202246 A1* 6/2020 Lin ................... G06F 16/24568
2020/0371761 A1* 11/2020 Gupta ...................... G06F 8/451
2023/0195359 A1* 6/2023 Sobol .................... G06F 3/0655 711/154

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.

* cited by examiner

*Primary Examiner* — Charles J Choi
(74) *Attorney, Agent, or Firm* — Davis Wright Tremaine LLP

(57) ABSTRACT

Apparatuses, systems, and techniques to cause information to be stored in one or more memory locations based, at least in part, on one or more graphs. In at least one embodiment, a compiler analyzes one or more graphs to determine one or more sets of data items to be stored in one or more consecutive memory locations.

33 Claims, 43 Drawing Sheets

FIG. 16B
GENERAL-PURPOSE GRAPHICS PROCESSING UNIT 1630
MEMORY CONTROLLER 1642B
MEMOR Y 1644B
HOST INTERFACE 1632
GLOBAL SCHEDULER 1634
COMPUTE CLUSTER 1636A
COMPUTE CLUSTER 1636B
COMPUTE CLUSTER 1636C
COMPUTE CLUSTER 1636D
CACHE MEMORY 1638
COMPUTE CLUSTER 1636E
COMPUTE CLUSTER 1636F
COMPUTE CLUSTER 1636G
COMPUTE CLUSTER 1636H
I/O HUB 1639
GPU LINK 1640
MEMORY CONTROLLER 1642A
MEMORY 1644A

GRAPH-BASED MEMORY STORAGE

FIELD

At least one embodiment pertains to processing resources used to cause information to be stored in one or more memory locations based, at least in part, on one or more graphs. For example, at least one embodiment pertains to processors or computing systems used to cause a compiler to analyze one or more graphs to determine a set of data items to be stored in one or more consecutive memory locations.

BACKGROUND

When performing deep learning and other types of software, many identical computations are performed on different sets of data. Because GPUs contain a large number of processors to perform these identical computations, many operations can be performed in parallel. When computations are grouped together to be performed in parallel, the data they compute on are typically loaded from memory and results are stored back to memory for each parallel computation. When that data is loaded from and stored to different locations in memory, loading and storing can cause delays in performing the software.

DETAILED DESCRIPTION

Figure 1:
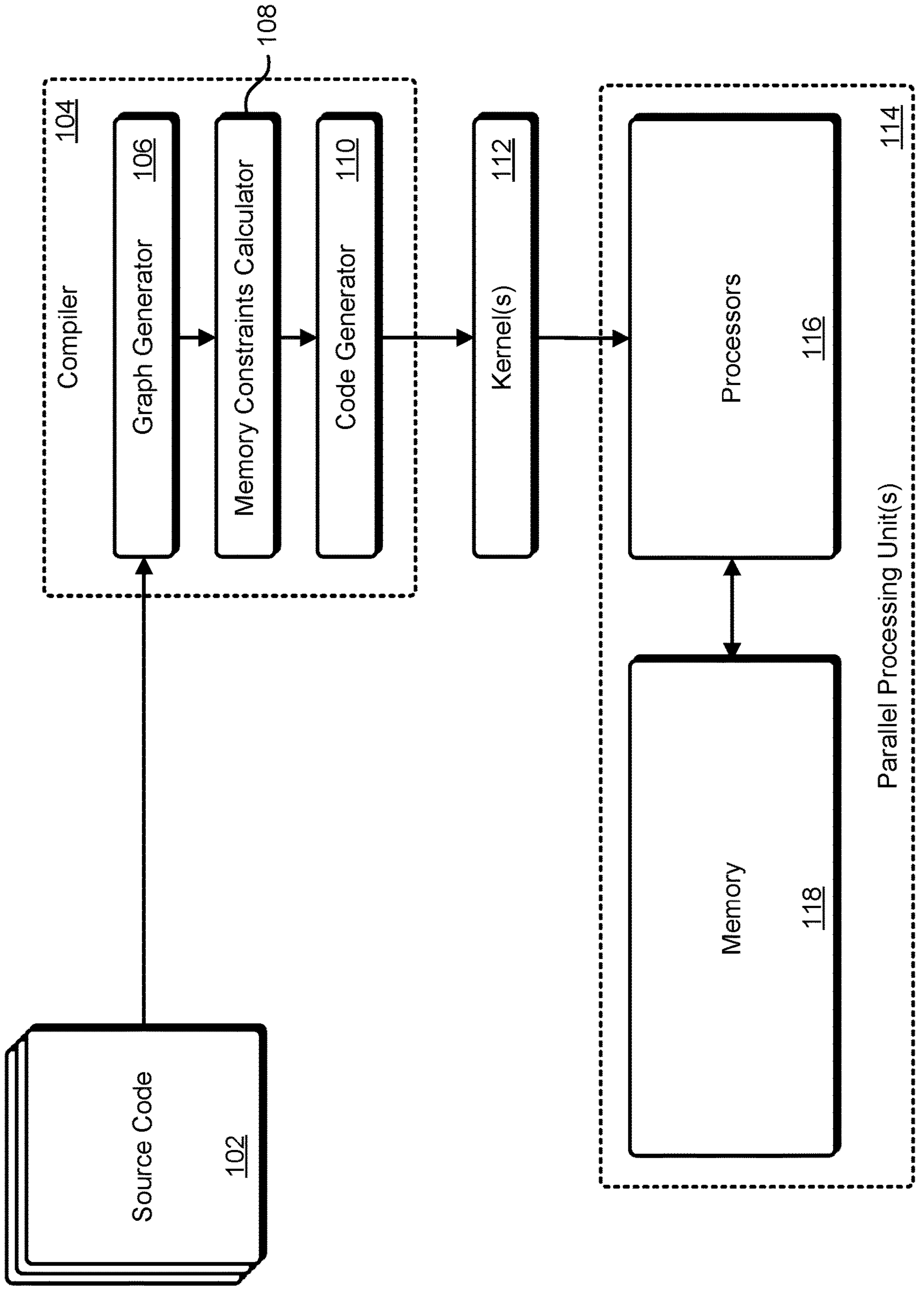
FIG. 1 is a block diagram illustrating a compiler to generate one or more kernels based, at least in part, on one or more graphs, in accordance with at least one embodiment.

FIG. 1 is a block diagram illustrating a compiler 104 to generate one or more kernels 112 based, at least in part, on one or more graphs, in accordance with at least one embodiment. In at least one embodiment, a compiler 104 is a set of software instructions that, if executed by one or more processors, such as those processors discussed below, take one or more input files comprising source code 102 and generate one or more outputs, such as one or more kernels 112. In at least one embodiment, a compiler 104 takes, as input, source code 102 and generates one or more output files, such as kernels 112, object files, or other files comprising a low-level programming language such as assembly language or any other low-level programming language further described herein, and symbols to represent one or more memory locations or other data. Using those one or more object files and any other code libraries provided, during compilation, to the compiler 104, in an embodiment, said compiler 104 generates one or more output executables files, such as one or more kernels 112.

In at least one embodiment, a kernel 112 is a file comprising binary data representing one or more executable instructions to be performed by one or more parallel processing units (PPUs) 114, such as graphics processing units (GPUs). In at least one embodiment, a kernel 112 is a file comprising executable instructions and one or more references to memory usable to perform one or more computational operations using one or more PPUs. In at least one embodiment, a kernel 112 comprises executable instructions and one or more references to memory usable to perform one or more computational operations using any other type of processor or processing unit, such as integrated circuits, further described herein. In at least one embodiment, a kernel 112 or any other file output by a compiler 104 has any executable file format further described herein. In at least one embodiment, a kernel 112 comprises instructions to be executed by one or more parallel processors or one or more PPUs, such as GPUs, as further described herein.

In at least one embodiment, a compiler 104 generates one or more output files, such as kernels 112, based, at least in part, on source code 102 input to said compiler 104. In at least one embodiment, source code 102 is text data comprising one or more descriptions of one or more computational operations that, when compiled into executable code by a compiler 104 and executed by one or more processors, performs said one or more computational operations. In at least one embodiment, source code 102 is text data comprising software instructions written in a high-level programming language, such as C++, Python, or any other programming language including, but not limited to, those further described herein. In at least one embodiment, source code 102 is text data comprising software instructions written in a low-level programming language, such as one or more types of assembly code or any other programming language including, but not limited to, those further described herein. In at least one embodiment, source code 102 includes software instructions to be interpreted by an interpreter. In at least one embodiment, source code 102 includes software instructions to be compiled by a compiler 104 into an output executable, such as a kernel 112, as described above.

In at least one embodiment, a compiler 104 comprises a graph generator 106. In at least one embodiment, a graph generator 106 is a hardware and/or software comprising instructions that, when performed, generate one or more graphs to represent source code 102 input to a compiler 104, as described below in conjunction with FIGS. 2A and 2B. In at least one embodiment, a graph generator 106 generates one or more graphs, such as compute uniform device architecture (CUDA) graphs as further described herein. In at least one embodiment, a graph generator 106 generates one or more graphs comprising an internal representation (IR) of a compiler to represent control and/or data flow determined, at least in part, from one or more source code 102 files input to a compiler 104. In at least one embodiment, a graph generator 106 generates one or more graphs comprising any other information further described herein.

In at least one embodiment, one or more graphs generated by a graph generator 106 comprise information about one or more source code 102 files input to a compiler 104. In at least one embodiment, one or more graphs generated by a graph generator 106 comprise control flow information about one or more source code 102 files input to a compiler 104. In at least one embodiment, one or more graphs generated by a graph generator 106 comprise data flow information about one or more source code 102 files input to a compiler 104. In at least one embodiment, one or more graphs generated by a graph code generator 106 comprise a set of nodes representing computational operations or any other operation to be performed by one or more kernels 112 output from a compiler 104 when executed by one or more processors, such as one or more PPUs, and determined based, at least in part, from one or more source code 102 files. In at least one embodiment, one or more graphs generated by a graph code generator 106 comprise edges between one or more sets of nodes representing data flow between said nodes when performed by one or more kernels 112 output from a compiler 104 when executed by one or more processors, such as one or more PPUs, and determined based, at least in part, from one or more source code 102 files. In at least one embodiment, one or more graphs generated by a graph code generator 106 directly indicate physical addresses at which to store and/or retrieve data from memory for use by one or more nodes of said one or more graphs. In at least one embodiment, one or more graphs generated by a graph code generator 106 directly indicate virtual addresses at which to store and/or retrieve data from memory for use by one or more nodes of said one or more graphs. In at least one embodiment, one or more graphs generated by a graph code generator 106 comprise dependency information usable to generate one or more sets of data indicating information to be stored as vectorized data sets, as described below and further in conjunction with FIGS. 2A and 2B. In at least one embodiment, one or more graphs generated by a graph code generator 106 comprise dependency information usable to generate one or more sets of data indicating information to be stored at one or more memory 118 locations. In at least one embodiment, one or more graphs generated by a graph code generator 106 comprise data flow information usable to determine one or more sets of data indicating elements of tensors to be used by one or more nodes of said one or more graphs, as described below in conjunction with FIGS. 2A and 2B. In at least one embodiment, one or more graphs generated by a graph code generator 106 comprise any other information usable to indicate data to be stored at one or more memory locations.

In at least one embodiment, a compiler 104 determines one or more memory constraints comprising information about how data is to be stored in one or more locations in memory using a memory constraints calculator 108. In at least one embodiment, a memory constraints calculator 108 is a set of instructions that, when performed, calculate or otherwise determine one or more constraints indicating how data is used by one or more graphs. In at least one embodiment, a memory constraints calculator 108 takes data represented as one or more graphs output from a graph generator 106 of a compiler 104 and determines one or more sets of constraints indicating how one or more sets of data are to be used during execution of one or more kernels 112 output by said compiler. In at least one embodiment, a memory constraints calculator 108, one or more sets of constraints are symbolic data representing one or more sets of data to be input into one or more nodes of one or more graphs. In at least one embodiment, one or more sets of constraints are to be generated by a memory constraints calculator 108 using one or more algorithms to infer data flow between nodes of a graph, such as those described below in conjunction with FIGS. 3-5.

In at least one embodiment, using one or more graphs generated based, at least in part, on one or more source code 102 files input to a compiler 104 as well as one or more sets of constraints indicating how data is to be used by said one or more graphs, said compiler 104 generates one or more output files, such as one or more kernels 112 as described above, using a code generator 110. In at least one embodiment, a code generator 110 is a set of software instructions that, when performed, generate one or more output files based on one or more graph representations of one or more source code 102 files input to a compiler 104. In at least one embodiment, a code generator 110 generates one or more kernels 112, as described above. In at least one embodiment, a code generator 110 generates one or more executable graphs, as further described herein. In at least one embodiment, a code generator 110 generates one or more object files, as further described herein. In at least one embodiment, a code generator 110 generates any other files of any type output by any compiler further described herein. In at least one embodiment, a code generator 110 generates one or more output files of a compiler 104, such as one or more kernels 112, comprising data indicating how information is to be stored in one or more locations of a memory 118 during execution of said one or more kernels 112. In at least one embodiment, a code generator 110 generates data indicating how information is to be stored in one or more memory 118 locations based, at least in part, on one or more graphs. In at least one embodiment, a code generator 110 generates data indicating how information is to be stored in one or more memory 118 locations based, at least in part, on one or more graphs generated by a graph generator 106. In at least one embodiment, a code generator 110 generates data indicating how information is to be stored in one or more memory 118 locations based, at least in part, on one or more graphs and one or more memory constraints, such as coordinate sets as described below in conjunction with FIG. 2B, generated by a memory constraints calculator 108. In at least one embodiment, one or more memory 118 locations are consecutive memory locations usable to store vectorized data 120, as described below. In at least one embodiment, one or more memory 118 locations are other memory locations usable to store non-vectorized data 122, as described below.

In at least one embodiment, a code generator 110 generates one or more output files based, at least in part, on one or more graphs generated by a graph generator 106. In at least one embodiment, a code generator 110 generates one or more output files based, at least in part, on one or more graphs generated by a graph generator 106 as well as any other information about said one or more graphs, such as one or more sets of memory constraints generated by a memory constraints calculator 108. In at least one embodiment, using one or more graphs and information output from a memory constraints calculator 108 indicating how data is to be used by one or more kernels 112, a code generator 110 generates one or more output files to be executed by one or more processors and/or PPUs 114.

In at least one embodiment, one or more kernels 112 output by a compiler 104 comprise information about vectorized and non-vectorized data to be used by said one or more kernels 112 during execution by one or more processors 116 of one or more PPUs 114, such as any processor further described herein. In at least one embodiment, vectorized data is one or more sets of data stored in memory 118 of a PPU 114, such as a GPU, in sequential or consecutive regions or addresses within a region. In at least one embodiment, vectorized data is one or more sets of data stored in memory 118 of a PPU 114 in sequential or consecutive regions or addresses within a region such that it can be loaded in bulk from said sequential regions or addresses within said region. In at least one embodiment, vectorized data is one or more sets of data stored in memory 118 such that it can be loaded from said memory in bulk using one or more load instructions. In at least one embodiment, non-vectorized data is any other type of data to be used during execution of one or more kernels 112 or other executable files by one or more processors 116 of one or more PPUs 114, such as any processor further described herein.

Figure 2A:
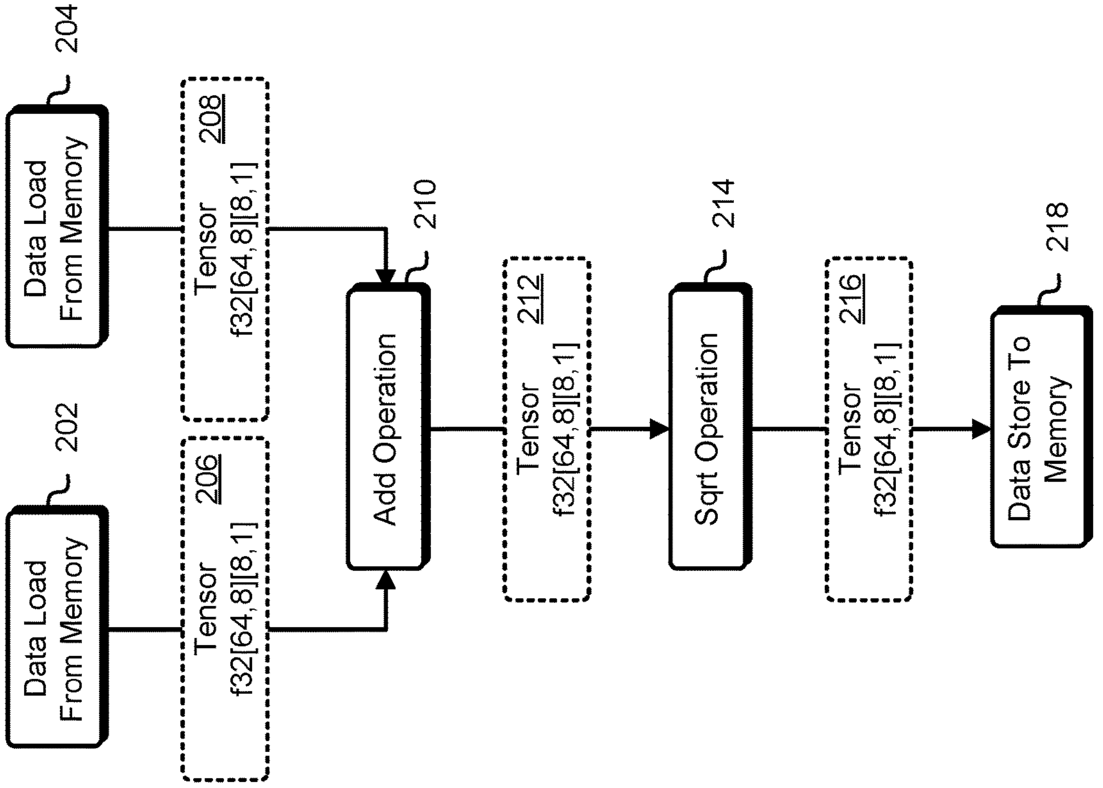
FIG. 2A is a block diagram illustrating a graph to be used by a compiler to generate one or more kernels, in accordance with at least one embodiment.

FIG. 2A is a block diagram illustrating a graph to be used by a compiler to generate one or more kernels, in accordance with at least one embodiment. In at least one embodiment, a graph is a data structure comprising one or more sets of data to represent one or more computational operations of a software program. In at least one embodiment, a graph represents an entire software program. In at least one embodiment, a graph comprises two or more sub-graphs representing portions of a software program. In at least one embodiment, a graph is a sub-graph of another graph. In at least one embodiment, a graph is generated internally by a compiler, such as by parsing or any other technique further described herein. In at least one embodiment, a graph is generated using a graph generator of a compiler, as described above in conjunction with FIG. 1.

In at least one embodiment, a graph comprises nodes 202, 204, 210, 214, 218 and/or edges 206, 208, 212, 216. In at least one embodiment, a node 202, 204, 210, 214, 218 is a data structure representing a computational operation of a graph. In at least one embodiment, a node 202, 204, 210, 214, 218 is a data structures representing any other operation of a graph. In at least one embodiment, a node 202, 204, 210, 214, 218 comprises information about a computational operation to be performed. In at least one embodiment, a node 202, 204, 210, 214, 218 comprises information about one or more data items and/or data structures to be input to said node 202, 204, 210, 214, 218. In at least one embodiment, a node 202, 204, 210, 214, 218 comprises information about one or more data items and/or data structures to be output from said node 202, 204, 210, 214, 218. In at least one embodiment, one or more computational operations represented by one or more nodes 202, 204, 210, 214, 218 of a graph are to be used by a code generator to generate one or more kernels or other output files by a compiler, as described above in conjunction with FIG. 1.

In at least one embodiment, data or other information output from one node 202, 204, 210, 214, 218 and input to another node 202, 204, 210, 214, 218 in a graph is represented by one or more edges 206, 208, 212, 216. In at least one embodiment, an edge 206, 208, 212, 216 is data and/or other information representing how data moves between nodes 202, 204, 210, 214, 218 of a graph. In at least one embodiment, an edge 206, 208, 212, 216 comprises information about one or more data structures and/or data items. In at least one embodiment, an edge 206, 208, 212, 216 comprises information about size, shape, type, and/or any other information about data flow between two or more nodes 202, 204, 210, 214, 218 of a graph as further described herein. In at least one embodiment, an edge 206, 208, 212, 216 comprises information about tensor data to be transferred between two or more nodes 202, 204, 210, 214, 218 of a graph. In at least one embodiment, an edge 206, 208, 212, 216 comprises information about any other type of data further described herein to be transferred between two or more nodes 202, 204, 210, 214, 218 of a graph.

In at least one embodiment, an edge 206, 208, 212, 216 comprises information about one or more tensors to flow, as data, between two or more nodes 202, 204, 210, 214, 218. In at least one embodiment, a tensor is a data structure representing a set of data. In at least one embodiment, a tensor comprises information about a set of data said tensor represents. In at least one embodiment, a tensor comprises a single data element. In at least one embodiment, a tensor comprises a plurality of data elements. In at least one embodiment, a tensor is a data structure representing a single-dimension set of data, such as a vector. In at least one embodiment, a tensor is a data structure representing a multi-dimension set of data, such as a matrix and/or set of matrices. In at least one embodiment, a tensor comprises information about data it represents. In at least one embodiment, a tensor comprises shape or dimension information indicating a size of a set of data represented by said tensor. In at least one embodiment, a tensor comprises stride information indicating spacing between data items it represents. In at least one embodiment, a tensor comprises any other information about data it represents further described herein.

In at least one embodiment, a tensor is denoted as follows:

type[shape][structure]

where type is a data type of data represented by said tensor, shape is dimensions and/or other size information about said tensor's data, and structure is one or more structural characteristics of said tensor's data. For example, in an embodiment, a tensor is described as:

f32[64,8][8,1]

where f32 indicates that data items represented by said tensor have a 32-bit floating point data type, said tensor has a shape of or dimensions of 64×8, and [8,1] represents a number of locations in memory between elements of said tensor.

In at least one embodiment, a compiler generates one or more output files based, at least in part, on information indicated by nodes 202, 204, 210, 214, 218 and/or edges 206, 208, 212, 216 of a graph, as described above in conjunction with FIG. 1. In at least one embodiment, edges 206, 208, 212, 216 of a graph comprise additional information indicating how data is used by one or more nodes 202, 204, 210, 214, 218 of a graph, as described below in conjunction with FIG. 2B. In at least one embodiment, a compiler generates one or more output files, such as kernels, based, at least in part, on information indicated by one or more nodes 202, 204, 210, 214, 218 of a graph as well as additional information, such as coordinate sets, indicated by one or more edges 206, 208, 212, 216 of a graph, as further described below in conjunction with FIG. 2B.

Figure 2B:
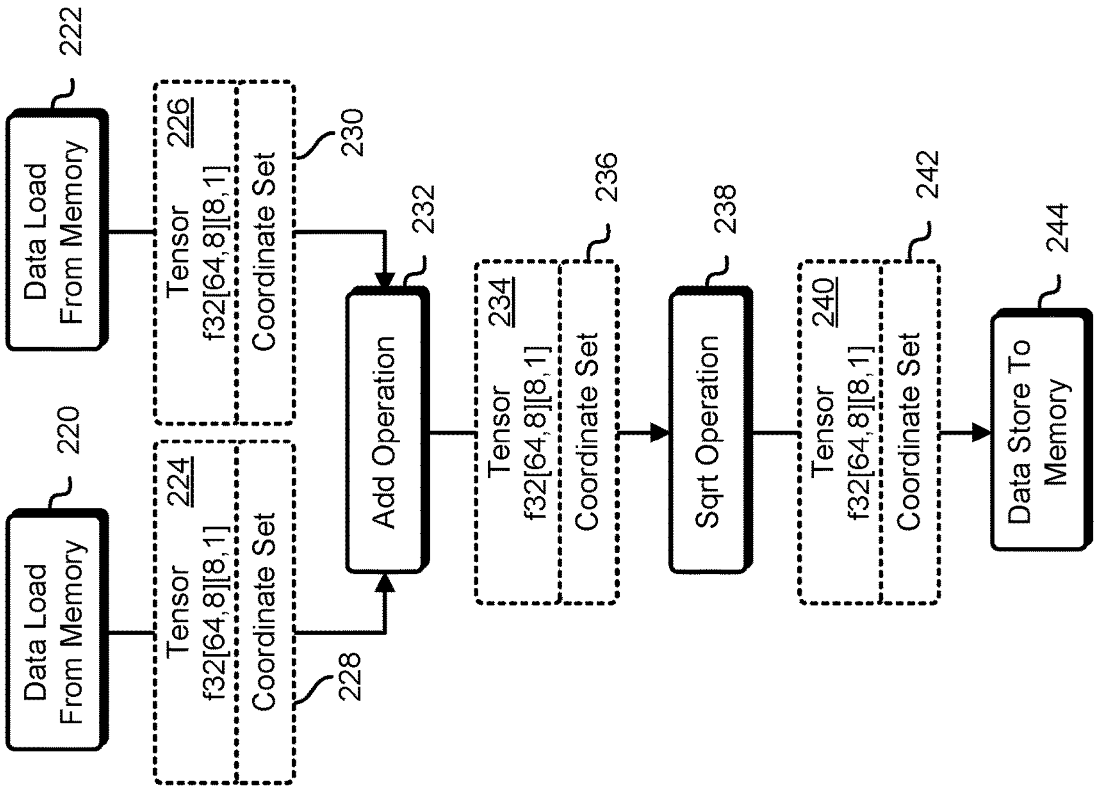
FIG. 2B is a block diagram illustrating a graph comprising coordinate set information to be used by a compiler to generate one or more kernels, in accordance with at least one embodiment.

FIG. 2B is a block diagram illustrating a graph comprising coordinate set 228, 230, 236, 242 information to be used by a compiler to generate one or more kernels, in accordance with at least one embodiment. In at least one embodiment, a graph is a graph as described above in conjunction with FIG. 2A, comprising two or more nodes 220, 222, 232, 238, 244 and one or more edges 224, 226, 234, 240. In at least one embodiment, a graph is any other type of graph further described herein. In at least one embodiment, nodes 220, 222, 232, 238, 244 of a graph comprise information about one or more computational operations, as described above in conjunction with FIG. 2A. In at least one embodiment, edges 224, 226, 234, 240 of a graph comprise information about data to flow between one or more nodes 220, 222, 232, 238, 244 of said graph during execution of one or more kernels and/or other executables representing said graph, such as tensor data as described above in conjunction with FIG. 2A.

In at least one embodiment, edges 224, 226, 234, 240 of a graph further comprise information about how said data is to be used during execution of one or more kernels and/or other executables representing said graph generated by a compiler, as described above in conjunction with FIG. 1. In at least one embodiment, edges 224, 226, 234, 240 of a graph comprise coordinate set 228, 230, 236, 242 information to indicate how data is to be used during execution of one or more kernels and/or other executables representing said graph. In at least one embodiment, a coordinate set 228, 230, 236, 242 is a set of data comprising information indicating how data is used by one or more nodes of a graph. In at least one embodiment, a coordinate set 228, 230, 236, 242 is referred to as a coordinate space. In at least one embodiment, a coordinate set 228, 230, 236, 242 comprises one or more coordinates. In at least one embodiment, a coordinate is a data element, or a tile of data elements, within a tensor, as described above. In at least one embodiment, a tile is a subgroup of data elements within a tensor, as further described herein. In at least one embodiment, a coordinate representing a single data element is a point coordinate.

In at least one embodiment, a coordinate set 228, 230, 236, 242 or coordinate space comprises information indicating a start expression, a size, and one or more predicates. In at least one embodiment, a start expression defines a location for a coordinate in a tensor. In at least one embodiment, if a coordinate is a tile, a start expression defines a location of a first or [0,0] element in a tensor. In at least one embodiment, a size defines or describes a size of a coordinate. In at least one embodiment, if a coordinate represents a single data element, a size of a coordinate set 228, 230, 236, 242 is 1. In at least one embodiment, if a coordinate represents a tile, a size of a coordinate set 228, 230, 236, 242 is >1. In at least one embodiment, a predicate defines a range of a variable over which a coordinate is defined. For example, in an embodiment, for a given 2D tensor with shape [m,n], as described above in conjunction with FIG. 2A, a point coordinate at (x,y) is as follows:

[x,y][1,1],x{0:m},y{0:n} where x{0:m} denotes a range $0 \leq x < m$ and y{0:n} denotes a range $0 \leq y < n$. In at least one embodiment, a 1×2 tile consisting of elements at (x,2y) and (x,2y+1) is as follows:

[x,y][1,2],x{0:m},y{0:n/2} where x{0:m} denotes a range 0≤x<m and y{0:n/2} denotes a range 0≤y<n/2.

In at least one embodiment, a compiler uses information indicated by one or more coordinate sets 228, 230, 236, 242 in a graph to determine how data is to be stored in one or more memory locations of a memory for use by one or more kernels generated by said compiler using one or more graphs containing said coordinate sets 228, 230, 236, 242. Data indicated by one or more coordinate sets 228, 230, 236, 242, in an embodiment, is to be stored as vectorized data in memory for use by one or more kernels generated by a compiler during execution by one or more parallel processing units (PPUs), such as graphics processing units (GPUs), as described above in conjunction with FIG. 1. In at least one embodiment, one or more coordinate sets 228, 230, 236, 242 are to be generated by one or more memory constraints calculators of a compiler, as described above in conjunction with FIG. 1. In at least one embodiment, one or more coordinate sets 228, 230, 236, 242 are to be generated by any other executable or interpreted software programs based, at least in part, on a graph, including those software programs further described herein.

In at least one embodiment, one or more coordinate sets 228, 230, 236, 242 are to be calculated using an algorithm to determine one or more memory constraints of data between nodes of a graph. In at least one embodiment, one or more coordinate sets 228, 230, 236, 242 are to be calculated using a coordinate inference algorithm, such as a coordinate inference algorithm described below in conjunction with FIGS. 3-5. In at least one embodiment, one or more coordinate sets 228, 230, 236, 242 are to be calculated using any other algorithm usable to determine how data is used by one or more nodes 220, 222, 232, 238, 244 of a graph.

Figure 3:
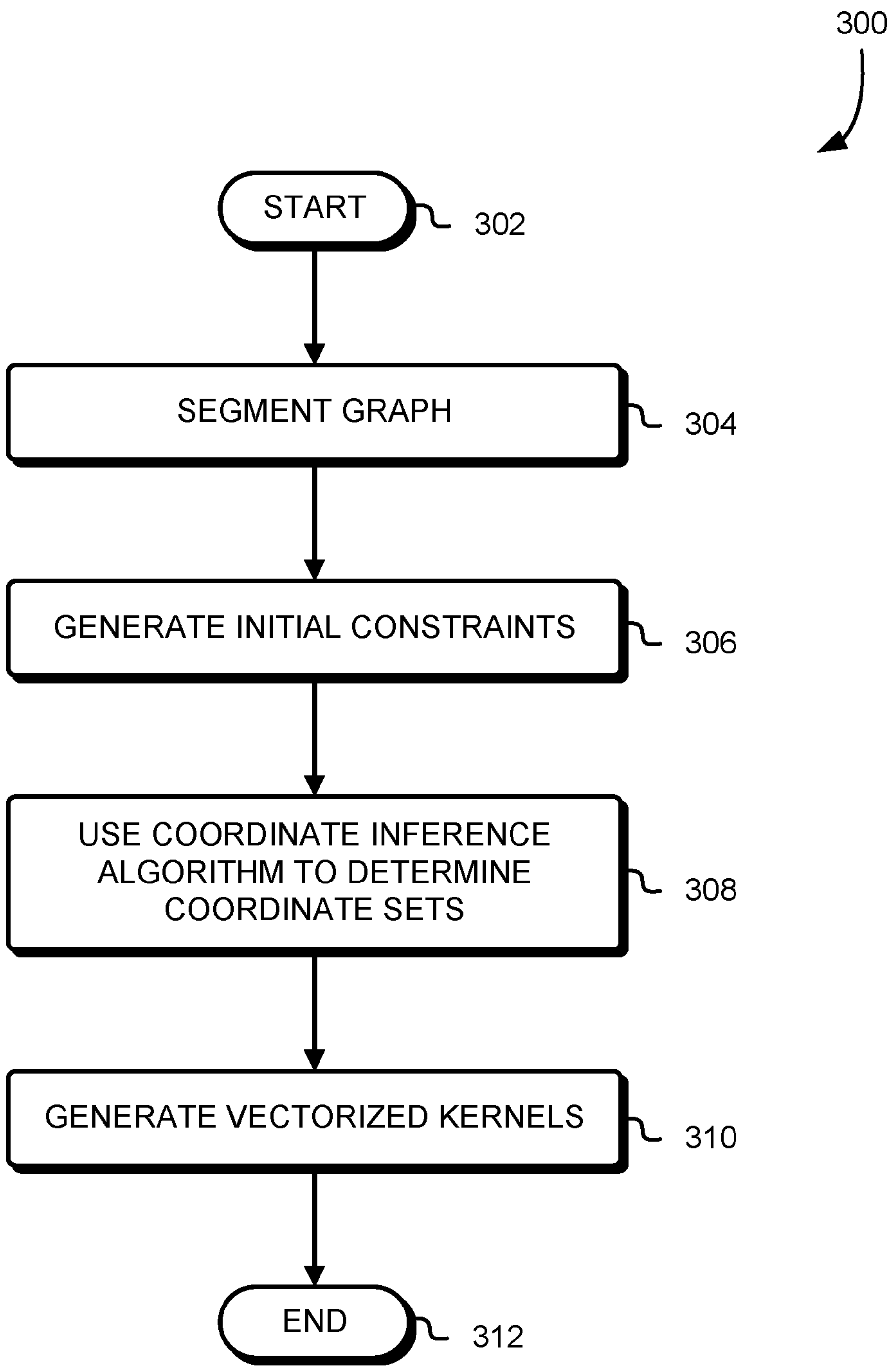
FIG. 3 illustrates a process to generate a kernel based on data flow indicated in a graph, in accordance with at least one embodiment.

FIG. 3 illustrates a process 300 to generate a kernel based on data flow indicated in a graph, in accordance with at least one embodiment. In at least one embodiment, data flow is indicated in a graph by one or more coordinate sets as well as other information represented by edges of said graph, such tensor information described above in conjunction with FIG. 2B. In at least one embodiment, a compiler performs a process 300 to generate a kernel using one or more coordinate sets of a graph generated by said compiler, such as described above in conjunction with FIGS. 1 and 2B.

In at least one embodiment, a process starts 302 when a compiler, such as a compiler described above in conjunction with FIG. 1 or any other compiler further described herein, segments a graph 304 into sub-graphs. In at least one embodiment, a compiler segments a graph 304 into sub-graphs based on load and store operations indicated by said graph 304. In at least one embodiment, a compiler segments a graph 304 into sub-graphs based on groups of computational operations indicated by nodes of each sub-graph using data loaded from and stored to memory as a result of load and store operations. In at least one embodiment, a compiler segments a graph 304 into sub-graphs based on operations indicated by said graph that perform computations on a set of data. In at least one embodiment, a compiler segments a graph 304 into sub-graphs based on any other condition. In at least one embodiment, a compiler does not segment a graph 304 during a process 300 to generate a kernel based on data flow indicated in said graph.

In at least one embodiment, for a graph or for each sub-graph segmented 304 from a graph, a compiler generates initial constraints 306. In at least one embodiment, initial constraints are a starting set of information about data usable to determine how said data is generated by nodes in a graph or sub-graph. In at least one embodiment, a compiler generates initial constraints 306 by determining data to be output by or used as input to a final node in a graph or sub-graph. In at least one embodiment, a compiler generates initial constraints 306 by applying an algorithm to determine data to be output by or used as input to a final node in a graph or each sub-graph determined as a result of segmentation 304. In at least one embodiment, a compiler applies an initial constraints algorithm as described below in conjunction with FIG. 4. In at least one embodiment, a compiler applies any other algorithm usable to determine information about data to be output by or used as input to a final node in a graph or each sub-graph determined as a result of segmentation 304.

In at least one embodiment, once a compiler determines or otherwise generates initial constraints 306 for a graph or for each sub-graph of said graph, said compiler uses a coordinate inference algorithm to determine coordinate sets, such as a coordinate inference algorithm described below in conjunction with FIG. 5. In at least one embodiment, a compiler uses any other algorithm to determine coordinate sets from a graph indicating how data is to be stored in one or more memory locations, as described above in conjunction with FIG. 2B. In at least one embodiment, a compiler uses a coordinate inference algorithm 308, or any other algorithm, to determine one or more sets of data comprising information, such as coordinate sets, indicating how data is to be used by each node in a graph for each intermediate tensor and input in a graph and/or sub-graphs of said graph.

In at least one embodiment, using coordinate set information or any other information indicating how data is to be used by each node in a graph and/or sub-graphs of a graph, a compiler generates one or more vectorized kernels 310. In at least one embodiment, a vectorized kernel is a kernel, such as those described above in conjunction with FIG. 1 and further described herein, comprising information indicating one or more memory locations to consecutively store sets of data for use by one or more computational operations to be performed during execution of said vectorized kernel. In at least one embodiment, a compiler generates one or more vectorized kernels 310 using information from one or more graphs, as described above in conjunction with FIGS. 1, 2A, and 2B. In at least one embodiment, a compiler generates one or more vectorized kernels 310 using coordinate sets determined as a result of a coordinate inference algorithm 308, as further described below in conjunction with FIG. 5. In at least one embodiment, one or more vectorized kernels to be generated 310 by a compiler during a process 300 each comprise information indicating how information is to be stored in one or more memory locations. In at least one embodiment, one or more vectorized kernels to be generated 310 by a compiler during a process 300 each comprise information indicating how information is to be stored in one or more memory locations based, at least in part, on one or more graphs and/or sub-graphs. In at least one embodiment, one or more vectorized kernels to be generated 310 by a compiler during a process 300 each comprise information indicating how information is to be stored consecutively in one or more memory locations based, at least in part, on one or more graphs and/or sub-graphs.

In at least one embodiment, once compiler generates one or more vectorized kernels 310, a process ends 300 and each of said one or more vectorized kernels can be executed using one or more parallel processing units (PPUs), such as graphics processing units (GPUs), as described above in conjunction with FIG. 1. In at least one embodiment, once compiler generates one or more vectorized kernels 310, a process ends 312 and each of said one or more vectorized kernels can be executed using one or more processors and/or other integrated circuits as further described herein.

Figure 4:
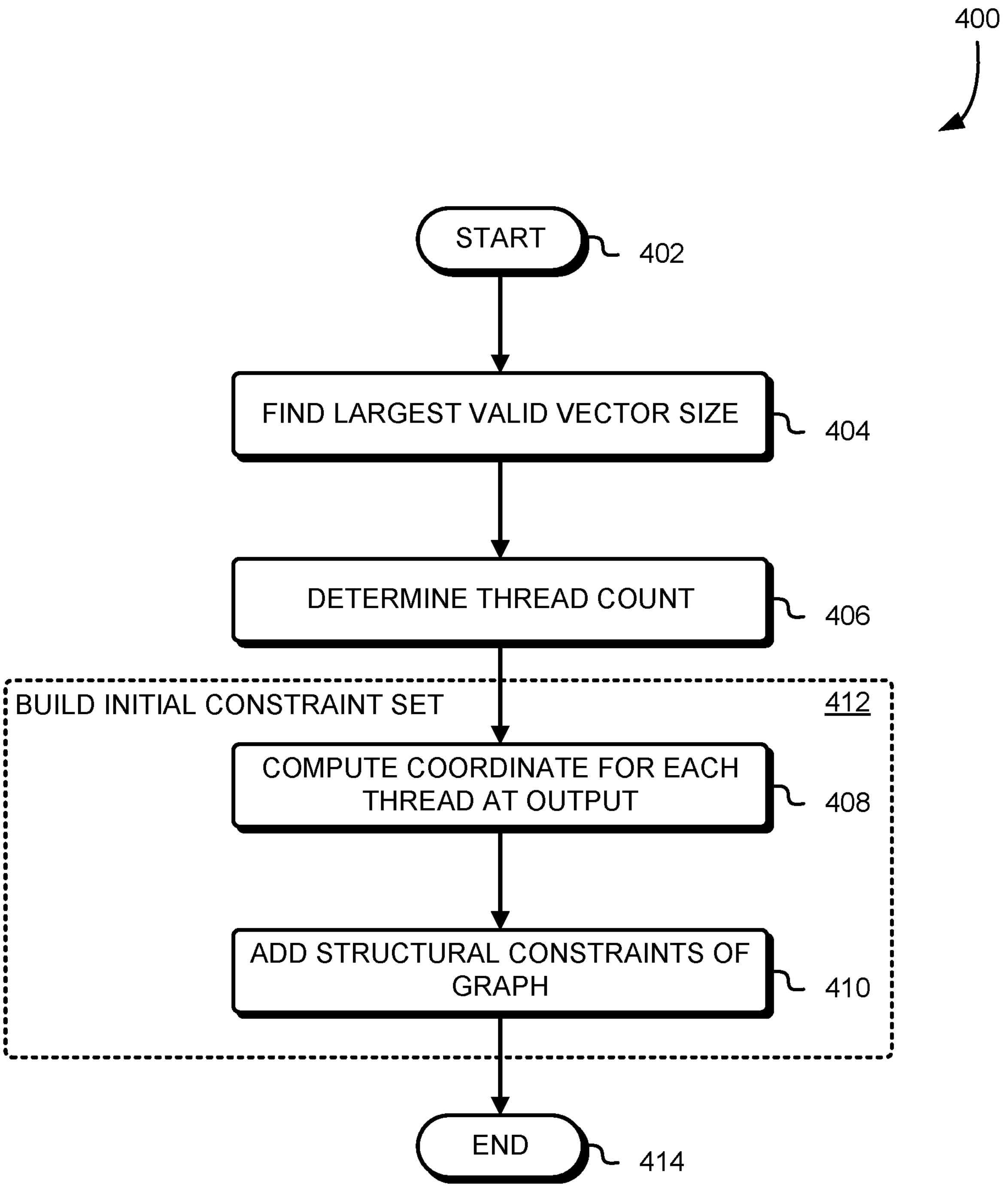
FIG. 4 illustrates a process to define and/or generate initial constraints based on a graph, in accordance with at least one embodiment.

FIG. 4 illustrates a process 400 to determine initial constraints based on a graph, in accordance with at least one embodiment. In at least one embodiment, a process 400 determines initial constraints to be used by a coordinate inference algorithm to determine one or more coordinate sets indicating how data is to be used by one or more graphs, as described below in conjunction with FIG. 5, and further used by a compiler to generate one or more kernels to be executed by one or more parallel processing units (PPUs), such as graphics processing units (GPUs), as described above in conjunction with FIG. 1 and further described herein. In at least one embodiment, initial constraints are data indicating information about one or more edges in a graph, as described above in conjunction with FIGS. 2A and 2B. In at least one embodiment, initial constraints indicate an initial set of data to be used as input to a final node in a graph or output from a final node in a graph.

In at least one embodiment, a process 400 to determine initial constraints of a graph starts 402 by a compiler finding a largest valid size for a vector of data 404. In at least one embodiment, a largest valid vector size is determined 404 by a compiler based on properties of a graph. In at least one embodiment, a compiler determines a largest valid vector size 404 based on a size of data input to, or output from, a final node in a graph. In at least one embodiment, a largest valid vector size is a largest vector size for an outer dimension of an output from a final node in a graph. For example, in an embodiment, given an output tensor from a final node in a graph with element type f32 and shape [2,18], a largest valid vector size is 2, as said largest valid vector size for f32 that divides into 18 is 2.

In at least one embodiment, once a compiler determines a largest valid vector size 404, said compiler determines a thread count 406 for a graph. That is, in an embodiment, a compiler determines how many threads are required to generate a vector of a determined size 404. In at least one embodiment, to determine a thread count 406, a compiler chooses a number of threads equal to a size of a largest output tensor indicated by edges of a graph and divides that number by a largest valid vector size such that, when a kernel generated from said graph, as described above in conjunction with FIGS. 1 and 3, is run with said number of threads, said kernel will compute all elements in said output tensor.

In at least one embodiment, given a vector size 404 and thread count 406, a compiler begins to build a set of initial constraints 412 for each coordinate of a final edge of a graph (such as an edge representing a tensor as described above in conjunction with FIGS. 2A and 2B). To build an initial set of constraints 412, in an embodiment, a compiler generates a coordinate 408, as described above in conjunction with FIG. 2B, for each element of a tensor representing a final edge of a graph or output from a graph. In at least one embodiment, a compiler computes a coordinate for each thread t 408 used to compute each data value in a tensor. In at least one embodiment, given each initial coordinate computed by a compiler, said compiler creates coordinate set representing each data item of an output tensor or tensor input to a final node of a graph, as described above in conjunction with FIG. 2B.

In at least one embodiment, once a compiler generates an initial coordinate set by computing a coordinate 408 for each data element of an output tensor or tensor input to a final node of a graph, said compiler add structural constraints 410 indicating how each coordinate is to be used by a final node in a graph. In at least one embodiment, structural constraints indicate constraints of an operation to be performed by a final node of a graph. For example, in an embodiment, an input coordinate to a pointwise square root operation represented by a final node in a graph is equivalent to an output coordinate. In at least one embodiment, once a compiler adds structural constraints of a final node or other nodes of a graph to an initial set of constraints 410, said compiler has built an initial constraint set 412 and a process 400 to determine initial constraints ends 414.

Figure 5:
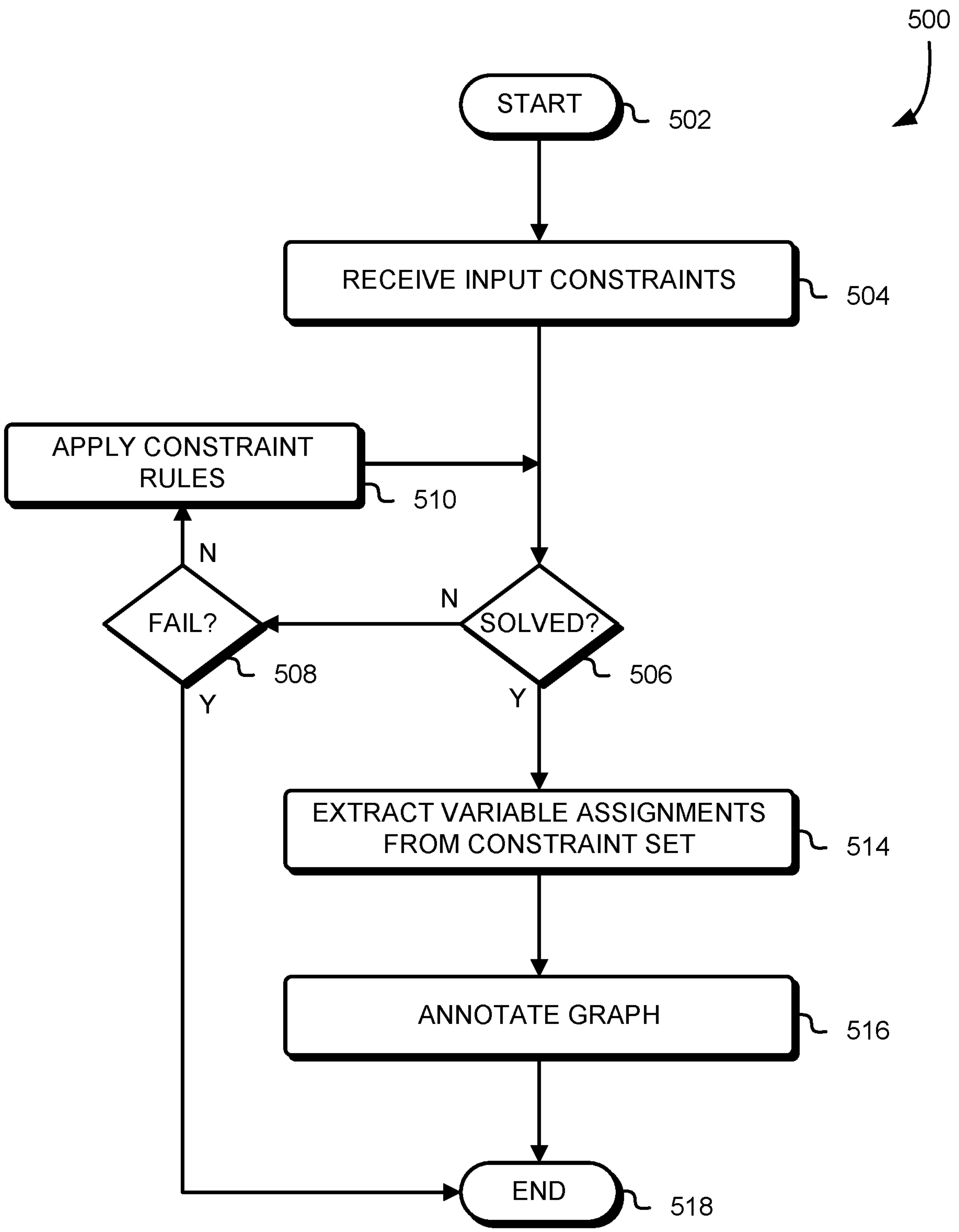
FIG. 5 illustrates a process to generate coordinate sets, in accordance with at least one embodiment.

FIG. 5 illustrates a process 500 to generate one or more coordinate sets, in accordance with at least one embodiment. In at least one embodiment, a process 500 generates one or more coordinate sets, as described above in conjunction with FIG. 2B, representing data flow in a graph. In at least one embodiment, using these coordinate sets determined based, at least in part, on a graph, a compiler generates one or more kernels indicating where or more memory locations to store information, as described above in conjunction with FIGS. 1 and 3. In at least one embodiment, a process 500 performs a coordinate inference algorithm to generate one or more coordinate sets. In at least one embodiment, one or more coordinate sets are generated using any other algorithm to determine said one or more coordinate sets, which are to be used by a compiler to generate one or more kernels as described above in conjunction with FIGS. 1 and 3.

In at least one embodiment, a process 500 to generate one or more coordinate sets starts 502 by a compiler receiving input constraints 504 generated using a process described above in conjunction with FIG. 4. In at least one embodiment, a compiler receives a graph consisting of nodes representing tensor operations and edges between those operations annotated with an initial coordinate set. In at least one embodiment, an initial coordinate set is initial constraints determined using a process described above in conjunction with FIG. 4. In at least one embodiment, an initial coordinate set comprises a set of constraints C of form:

$$C = \{e_1 = e'_1, \ldots, e_n = e'_n\}$$

where each $e_i$ is a coordinate set expression, or mathematical expression describing a coordinate set. In at least one embodiment, a coordinate set expression comprises information indicating how a value represented by each coordinate in a set is to be computed. In at least one embodiment, a coordinate set expression comprises coordinate set operators. In at least one embodiment, a coordinate set operator is a mathematical expression indicating an operation to be performed on a tensor. In at least one embodiment, a coordinate set operator is a forward operator, indicating an expression to translate an input to a given tensor operation into an output of a given tensor operation. In at least one embodiment, a coordinate set operator is a reverse operator, indicating an expression to translate a coordinate set at a given output of a tensor operation and translate it to a corresponding coordinate set at a given input of a tensor operation.

In at least one embodiment, a coordinate inference algorithm of process 500 attempts to take a set of constraints C and reduce coordinate set expressions to a fixed range of data values to be represented by each coordinate set of a graph, as described above in conjunction with FIG. 2B. In at least one embodiment, if coordinate set expressions can be represented by a fixed point or set of points, that coordinate set expression is said to be solved. For a given set of constraints C, in an embodiment, if each coordinate set expression in C is reduced to a fixed point or set of points representing data values and/or ranges of coordinates in a tensor, that set of constraints C is said to be solved.

In at least one embodiment, once a compiler receives input constraints 504 indicated by set C, as described above, said compiler performing a coordinate inference algorithm of process 500 attempts to solve said set C by repeatedly applying constraint rules to each coordinate set expression $e_i$. In at least one embodiment, rules are computational operations to remove constraints that are tautologies, perform replacement of coordinate set variables that have been determined to have a specific value, and emit errors when different constant data values are equated to each other in a constraint or some other improper constraint is encountered. In at least one embodiment, a compiler attempts to determine if a set C is solved 506, as described above. In at least one embodiment, if a set C is not solved, a compiler determines if said set comprises any failed constraints 508. In at least one embodiment, a failed constraint is a constraint in a set C that cannot be reduced to a concrete set of values, or a constraint using an invalid operation such as assigning one constant value to another constant value. In at least one embodiment, if a set C contains a failed constraint 508, a process ends 518 and no data in a graph can be vectorized, as described above in conjunction FIG. 1. In at least one embodiment, if a set C does not contain failed constraints 508, a compiler applies one or more constraint rules 510 as described above. In at least one embodiment, one or more constraint rules to be applied 510 comprise basic rules including tautologies:

$$C\cup\{e_1=e_2\}\Rightarrow C \text{ if } e_1\equiv e_2$$

where ≡ denotes syntactic equivalence between expressions. In at least one embodiment, one or more constraint rules to be applied 510 comprise basic rules including replacement of coordinate set variables that have been determined:

$$C\cup\{x=e\}\Rightarrow C[x/e]\cup\{x=e\} \text{ if } x\in fv(C) \text{ and } x \text{ not}\in fv(\dot{e})$$

where fv(e) denotes a set of coordinate set variables that are free in expression e and C[c/x] denotes a constraint set with all instances of variable x replaced with coordinate set literal c. In at least one embodiment, one or more constraint rules to be applied 510 comprise basic rules including error when different constants are equated to another in a constraint:

$$C\cup\{c_1=c_2\}\Rightarrow \text{FAIL if } c_1 \text{ not}\equiv c_2$$

In at least one embodiment, one or more constraint rules to be applied 510 comprise reordering rules. In at least one embodiment, reordering rules reorder constraints with a coordinate set literal on one side so that it is on a right hand side. In at least one embodiment, reordering rules remove need for symmetric versions of other rules:

$$C\cup\{c=x\}\Rightarrow C\cup\{x=c\}$$

$$C\cup\{(op\ e_1\ e_2)=x\}\Rightarrow C\cup\{x=(op\ e_1\ e_2)\}$$

In at least one embodiment, one or more constraint rules to be applied 510 comprise union simplification rules. In at least one embodiment, union simplification rules simplify a union operator:

$$C\cup\{\text{union}(x_1, \ldots, x_n)=c\}\Rightarrow C\cup\{x_1=c, \ldots, x_n=c\}$$

In at least one embodiment, one or more constraint rules to be applied 510 comprise transpose inversion rules. In at least one embodiment, a transpose operator is invertible, and this rule allows simplification when a transpose of an expression is equated to a coordinate literal:

$$C\cup\{\text{transpose}(e)=c\}\Rightarrow C\cup\{e=\text{transpose}(c)\}$$

In at least one embodiment, one or more constraint rules to be applied 510 comprise broadcast inversion rules. In at least one embodiment, a broad cast operator can be inverted into a forward broadcast to allow coordinate literals to be inferred forwards through a broadcasted pointwise operator:

$$C\cup\{\text{broadcast\_rev}(e)=c\}\Rightarrow C\cup\{e=\text{broadcast}(c)\}$$

In at least one embodiment, one or more constraint rules to be applied 510 comprise simplification rules. In at least one embodiment, simplification rules simplify coordinate expression operators using a simp function:

$$C\cup\{e_1=e_2\}\Rightarrow C\cup\{e_1'=e_2'\}$$
$$\text{where } e_1'=simp(e_1),\ e_2'=simp(e_2)$$
$$\text{if } e_1 \text{not}\equiv e_1' \text{ or } e_2 \text{not}\equiv e_2'$$

where a simp function takes a coordinate set expression and returns its simplified canonical form. In at least one embodiment, a simp function algorithm is recursive over a syntax of coordinate set expressions. In at least one embodiment, a simp function simplifies expressions by computing operators applied to coordinate literals, simplifying arithmetic expressions, and simplifying unions and other operations.

In at least one embodiment, once a compiler applies one or more constraint rules 510, said compiler again checks if a set C is solved 506, as described above. If a constraint set C is solved 506, a constraint set is of form:

$$C=\{x_1=c_1, \ldots, x_n=c_n, \ldots, e_1=e_1', \ldots, e_n=e_n'\}$$

where $x_i$ are coordinate set variables and $c_n$ are coordinate set literals.

In at least one embodiment, once a constraint set C is solved 506, a compiler extracts variable assignments from constraint set C 514. In at least one embodiment, a compiler extracts variable assignments $$e_i=e_i'$$

from a constraint set C 514 to form a substitution as:

$$S=\{x_1=c_1, \ldots, x_n=c_n\}$$

In at least one embodiment, once a compiler extracts variable assignments from a constraint set C to generate a set of substitutions S 514, said compiler applies said set of substitutions S to a coordinate set in a graph to replace variables in that coordinate set from initial constraints 504 with coordinate set literals indicating concrete values for each coordinate in a coordinate set, such as coordinate sets described above in conjunction with FIG. 2B. In at least one embodiment, once a compiler inputs coordinate set literals into a coordinate set, a process 500 to perform a coordinate inference algorithm ends 518.

In at least one embodiment, a compiler performs coordinate inference of process 500 for each node in a graph, such as a sub-graph as described above in conjunction with FIG. 3. In at least one embodiment, a compiler first performs coordinate inference of process 500 to determine a coordinate set for a final edge of a graph representing data flow to an output node of said graph. Using that coordinate set, in an embodiment, a compiler performs coordinate inference of process 500 for each intermediate node in a graph until an input node is reached.

In at least one embodiment, once a coordinate set is determined, by a compiler for each edge in a graph, a compiler annotates said graph 516 and generates one or more outputs, such as kernels, comprising data to be stored in one or more memory locations based on those coordinate sets. In at least one embodiment, a compiler annotates a graph 516 by indicating, on edges of said graph, one or more coordinate sets. In at least one embodiment, one or more coordinate sets indicated by one or more edges of a graph are to be usable, by a compiler, to generate one or more kernels. In at least one embodiment, coordinate sets indicate data or sets of data to be stored in one or more memory regions for use during execution of one or more kernels or other executable files. In at least one embodiment, coordinate sets indicate data or sets of data to be stored in one or more consecutive memory regions for use during execution of one or more kernels or other executable files. In at least one embodiment, coordinate sets indicate data or sets of data to be stored as vectorized data in one or more memory regions for use during execution of one or more kernels or other executable files, as described above in conjunction with FIG. 1.

In the following description, numerous specific details are set forth to provide a more thorough understanding of at least one embodiment. However, it will be apparent to one skilled in the art that the inventive concepts may be practiced without one or more of these specific details.

Data Center

Figure 6:
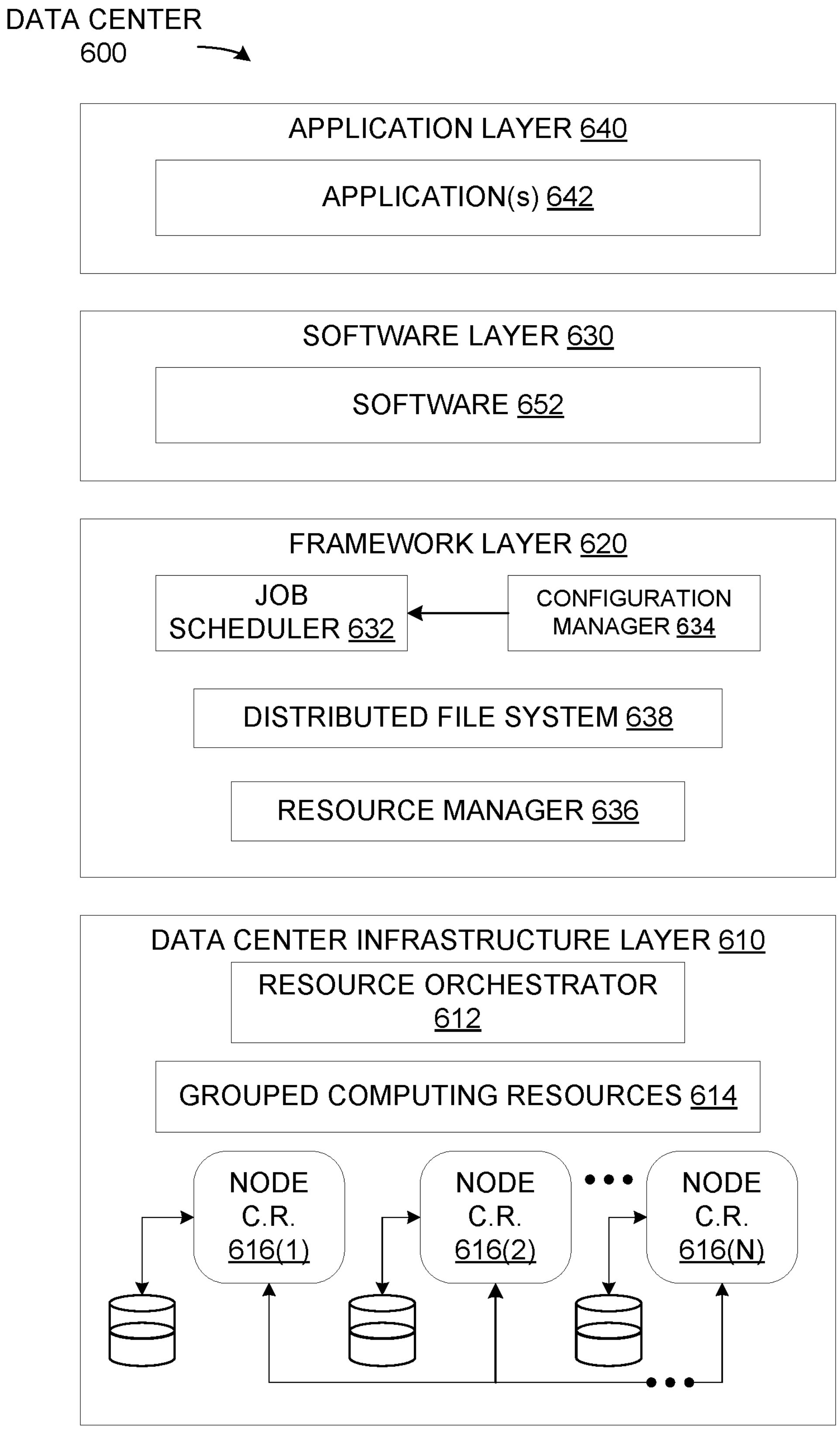
FIG. 6 illustrates an exemplary data center, in accordance with at least one embodiment.

FIG. 6 illustrates an exemplary data center 600, in accordance with at least one embodiment. In at least one embodiment, data center 600 includes, without limitation, a data center infrastructure layer 610, a framework layer 620, a software layer 630 and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator 612 may include hardware, software or some combination thereof.

In at least one embodiment, as shown in FIG. 6, framework layer 620 includes, without limitation, a job scheduler 632, a configuration manager 634, a resource manager 636 and a distributed file system 638. In at least one embodiment, framework layer 620 may include a framework to support software 652 of software layer 630 and/or one or more application(s) 642 of application layer 640. In at least one embodiment, software 652 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. In at least one embodiment, configuration manager 634 may be capable of configuring different layers such as software layer 630 and framework layer 620, including Spark and distributed file system 638 for supporting large-scale data processing. In at least one embodiment, resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. In at least one embodiment, resource manager 636 may coordinate with resource orchestrator 612 to manage these mapped or allocated computing resources.

In at least one embodiment, software 652 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. In at least one or more types of applications may include, without limitation, CUDA applications.

In at least one embodiment, any of configuration manager 634, resource manager 636, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

Computer-Based Systems

The following figures set forth, without limitation, exemplary computer-based systems that can be used to implement at least one embodiment.

Figure 7:
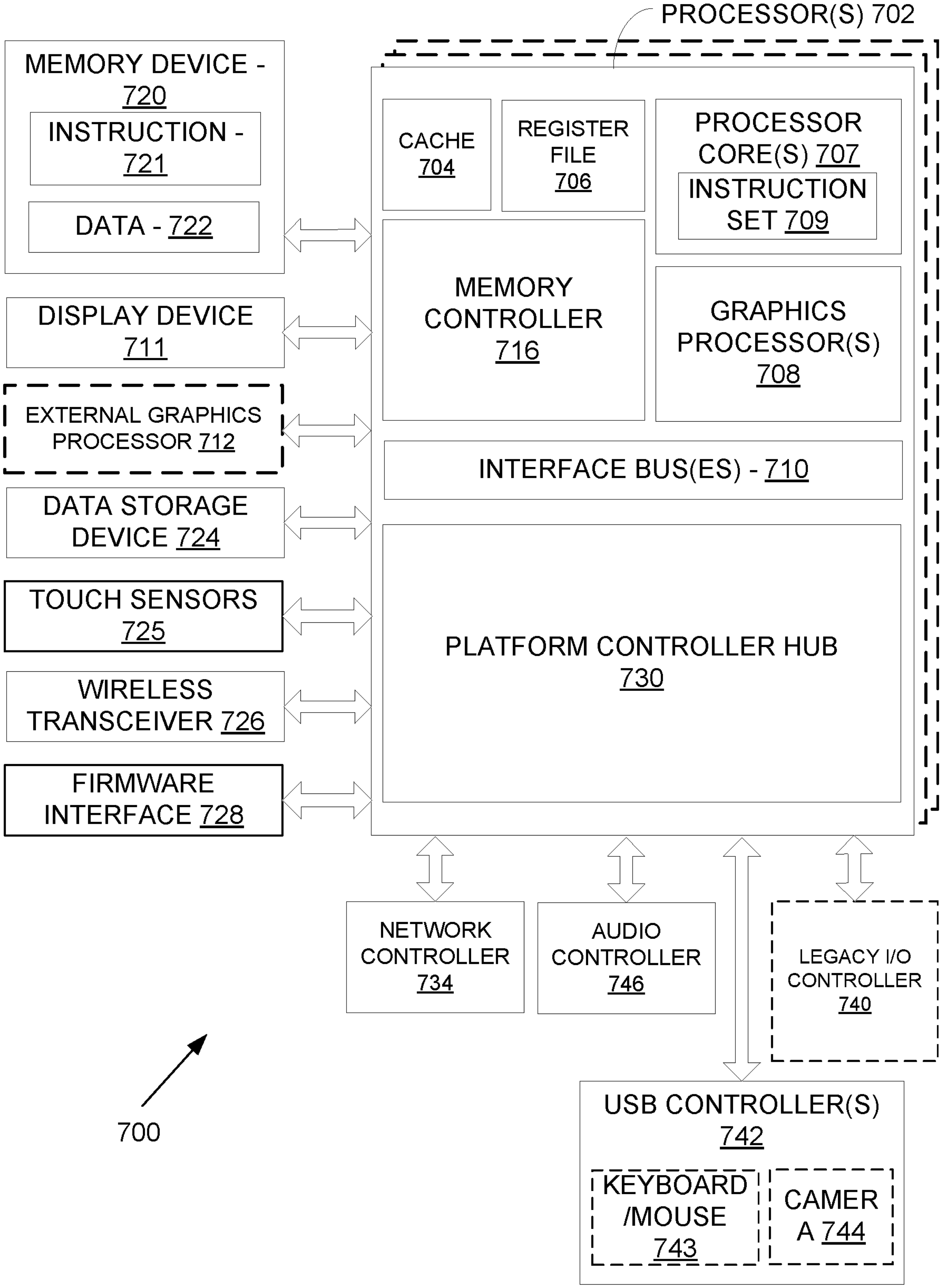
FIG. 7 illustrates a processing system, in accordance with at least one embodiment.

FIG. 7 illustrates a processing system 700, in accordance with at least one embodiment. In at least one embodiment, processing system 700 includes one or more processors 702 and one or more graphics processors 708, and may be a single processor desktop system, a multiprocessor workstation system, or a server system having a large number of processors 702 or processor cores 707. In at least one embodiment, processing system 700 is a processing platform incorporated within a system-on-a-chip ("SoC") integrated circuit for use in mobile, handheld, or embedded devices.

In at least one embodiment, a processing system 700, including one or more processors 702 and/or one or more graphics processors 708 comprises logic to cause information to be stored in one or more memory locations based, at least in part, on one or more graphs, and/or perform other operations to provide functionality described herein in conjunction with FIGS. 1-5.

In at least one embodiment, processing system 700 can include, or be incorporated within a server-based gaming platform, a game console, a media console, a mobile gaming console, a handheld game console, or an online game console. In at least one embodiment, processing system 700 is a mobile phone, smart phone, tablet computing device or mobile Internet device. In at least one embodiment, processing system 700 can also include, couple with, or be integrated within a wearable device, such as a smart watch wearable device, smart eyewear device, augmented reality device, or virtual reality device. In at least one embodiment, processing system 700 is a television or set top box device having one or more processors 702 and a graphical interface generated by one or more graphics processors 708.

In at least one embodiment, one or more processors 702 each include one or more processor cores 707 to process instructions which, when executed, perform operations for system and user software. In at least one embodiment, each of one or more processor cores 707 is configured to process a specific instruction set 709. In at least one embodiment, instruction set 709 may facilitate Complex Instruction Set Computing ("CISC"), Reduced Instruction Set Computing ("RISC"), or computing via a Very Long Instruction Word ("VLIW"). In at least one embodiment, processor cores 707 may each process a different instruction set 709, which may include instructions to facilitate emulation of other instruction sets. In at least one embodiment, processor core 707 may also include other processing devices, such as a digital signal processor ("DSP").

In at least one embodiment, processor 702 includes cache memory ("cache") 704. In at least one embodiment, processor 702 can have a single internal cache or multiple levels of internal cache. In at least one embodiment, cache memory is shared among various components of processor 702. In at least one embodiment, processor 702 also uses an external cache (e.g., a Level 3 ("L3") cache or Last Level Cache ("LLC")) (not shown), which may be shared among processor cores 707 using known cache coherency techniques. In at least one embodiment, register file 706 is additionally included in processor 702 which may include different types of registers for storing different types of data (e.g., integer registers, floating point registers, status registers, and an instruction pointer register). In at least one embodiment, register file 706 may include general-purpose registers or other registers.

In at least one embodiment, one or more processor(s) 702 are coupled with one or more interface bus(es) 710 to transmit communication signals such as address, data, or control signals between processor 702 and other components in processing system 700. In at least one embodiment interface bus 710, in one embodiment, can be a processor bus, such as a version of a Direct Media Interface ("DMI") bus. In at least one embodiment, interface bus 710 is not limited to a DMI bus, and may include one or more Peripheral Component Interconnect buses (e.g., "PCI," PCI Express ("PCIe")), memory buses, or other types of interface buses. In at least one embodiment processor(s) 702 include an integrated memory controller 716 and a platform controller hub 730. In at least one embodiment, memory controller 716 facilitates communication between a memory device and other components of processing system 700, while platform controller hub ("PCH") 730 provides connections to Input/Output ("I/O") devices via a local I/O bus.

In at least one embodiment, memory device 720 can be a dynamic random access memory ("DRAM") device, a static random access memory ("SRAM") device, flash memory device, phase-change memory device, or some other memory device having suitable performance to serve as processor memory. In at least one embodiment memory device 720 can operate as system memory for processing system 700, to store data 722 and instructions 721 for use when one or more processors 702 executes an application or process. In at least one embodiment, memory controller 716 also couples with an optional external graphics processor 712, which may communicate with one or more graphics processors 708 in processors 702 to perform graphics and media operations. In at least one embodiment, a display device 711 can connect to processor(s) 702. In at least one embodiment display device 711 can include one or more of an internal display device, as in a mobile electronic device or a laptop device or an external display device attached via a display interface (e.g., DisplayPort, etc.). In at least one embodiment, display device 711 can include a head mounted display ("HMD") such as a stereoscopic display device for use in virtual reality ("VR") applications or augmented reality ("AR") applications.

In at least one embodiment, platform controller hub 730 enables peripherals to connect to memory device 720 and processor 702 via a high-speed I/O bus. In at least one embodiment, I/O peripherals include, but are not limited to, an audio controller 746, a network controller 734, a firmware interface 728, a wireless transceiver 726, touch sensors 725, a data storage device 724 (e.g., hard disk drive, flash memory, etc.). In at least one embodiment, data storage device 724 can connect via a storage interface (e.g., SATA) or via a peripheral bus, such as PCI, or PCIe. In at least one embodiment, touch sensors 725 can include touch screen sensors, pressure sensors, or fingerprint sensors. In at least one embodiment, wireless transceiver 726 can be a Wi-Fi transceiver, a Bluetooth transceiver, or a mobile network transceiver such as a 3G, 4G, or Long Term Evolution ("LTE") transceiver. In at least one embodiment, firmware interface 728 enables communication with system firmware, and can be, for example, a unified extensible firmware interface ("UEFI"). In at least one embodiment, network controller 734 can enable a network connection to a wired network. In at least one embodiment, a high-performance network controller (not shown) couples with interface bus 710. In at least one embodiment, audio controller 746 is a multi-channel high definition audio controller. In at least one embodiment, processing system 700 includes an optional legacy I/O controller 740 for coupling legacy (e.g., Personal System 2 ("PS/2")) devices to processing system 700. In at least one embodiment, platform controller hub 730 can also connect to one or more Universal Serial Bus ("USB") controllers 742 connect input devices, such as keyboard and mouse 743 combinations, a camera 744, or other USB input devices.

In at least one embodiment, an instance of memory controller 716 and platform controller hub 730 may be integrated into a discreet external graphics processor, such as external graphics processor 712. In at least one embodiment, platform controller hub 730 and/or memory controller 716 may be external to one or more processor(s) 702. For example, in at least one embodiment, processing system 700 can include an external memory controller 716 and platform controller hub 730, which may be configured as a memory controller hub and peripheral controller hub within a system chipset that is in communication with processor(s) 702.

Figure 8:
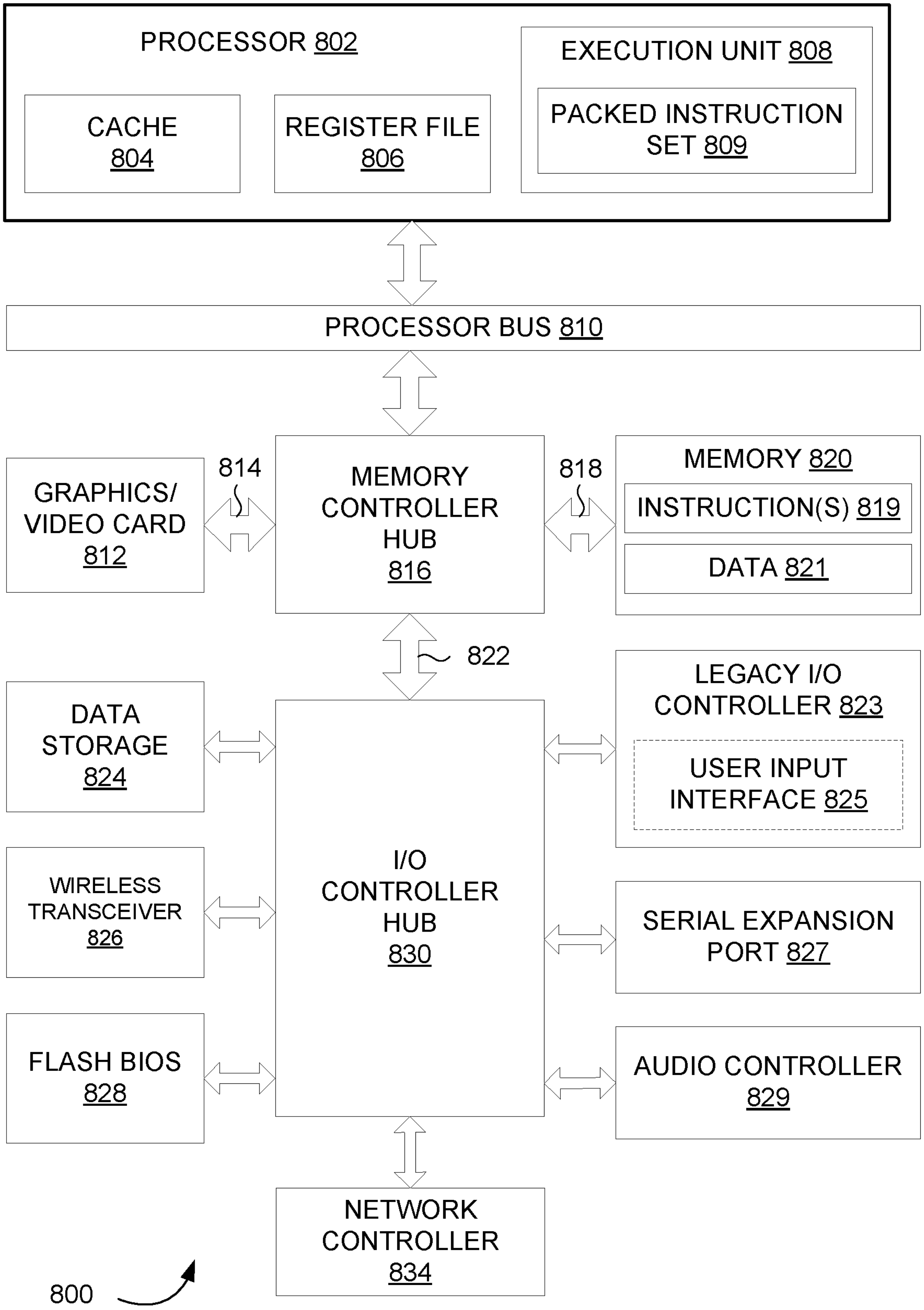
FIG. 8 illustrates a computer system, in accordance with at least one embodiment.

FIG. 8 illustrates a computer system 800, in accordance with at least one embodiment. In at least one embodiment, computer system 800 may be a system with interconnected devices and components, an SOC, or some combination. In at least on embodiment, computer system 800 is formed with a processor 802 that may include execution units to execute an instruction. In at least one embodiment, computer system 800 may include, without limitation, a component, such as processor 802 to employ execution units including logic to perform algorithms for processing data. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 800, including processor 802 comprises logic to cause information to be stored in one or more memory locations based, at least in part, on one or more graphs, and/or perform other operations to provide functionality described herein in conjunction with FIGS. 1-5.

In at least one embodiment, computer system 800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 800 may include, without limitation, processor 802 that may include, without limitation, one or more execution units 808 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 800 is a single processor desktop or server system. In at least one embodiment, computer system 800 may be a multiprocessor system. In at least one embodiment, processor 802 may include, without limitation, a CISC microprocessor, a RISC microprocessor, a VLIW microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. In at least one embodiment, processor 802 may also include a combination of both internal and external caches. In at least one embodiment, a register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. Processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a DRAM device, an SRAM device, flash memory device, or other memory device. Memory 820 may store instruction(s) 819 and/or data 821 represented by data signals that may be executed by processor 802.

In at least one embodiment, a system logic chip may be coupled to processor bus 810 and memory 820. In at least one embodiment, the system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing a user input interface 825 and a keyboard interface, a serial expansion port 827, such as a USB, and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips." In at least one embodiment, FIG. 8 may illustrate an exemplary SoC. In at least one embodiment, devices illustrated in FIG. 8 may be interconnected with proprietary interconnects, standardized interconnects (e.g., PCIe), or some combination thereof. In at least one embodiment, one or more components of system 800 are interconnected using compute express link ("CXL") interconnects.

Figure 9:
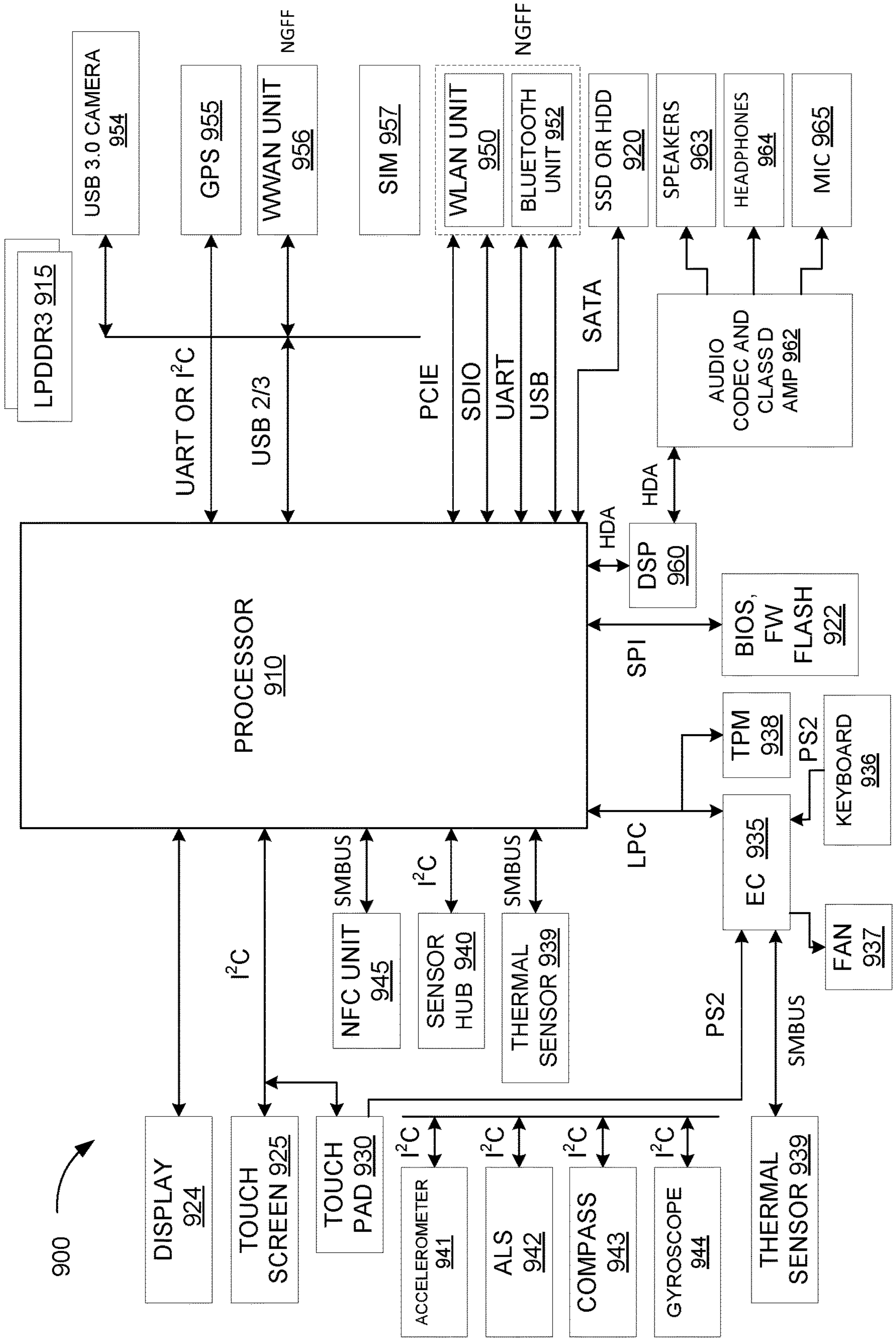
FIG. 9 illustrates a system, in accordance with at least one embodiment.

FIG. 9 illustrates a system 900, in accordance with at least one embodiment. In at least one embodiment, system 900 is an electronic device that utilizes a processor 910. In at least one embodiment, system 900 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 900 comprises logic to cause information to be stored in one or more memory locations based, at least in part, on one or more graphs, and/or perform other operations to provide functionality described herein in conjunction with FIGS. 1-5.

In at least one embodiment, system 900 may include, without limitation, processor 910 communicatively coupled to any suitable number or kind of components, peripherals, modules, or devices. In at least one embodiment, processor 910 is coupled using a bus or interface, such as an $I^2C$ bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 9 illustrates a system which includes interconnected hardware devices or "chips." In at least one embodiment, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using CXL interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a Solid State Disk ("SSD") or Hard Disk Drive ("HDD") 920, a wireless local area network unit ("WLAN") 950, a Bluetooth unit 952, a Wireless Wide Area Network unit ("WWAN") 956, a Global Positioning System ("GPS") 955, a camera ("USB 3.0 camera") 954 such as a USB 3.0 camera, or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, an Ambient Light Sensor ("ALS") 942, a compass 943, and a gyroscope 944 may be communicatively coupled to sensor hub 940. In at least one embodiment, a thermal sensor 939, a fan 937, a keyboard 936, and a touch pad 930 may be communicatively coupled to EC 935. In at least one embodiment, a speaker 963, a headphones 964, and a microphone ("mic") 965 may be communicatively coupled to an audio unit ("audio codec and class d amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Figure 10:
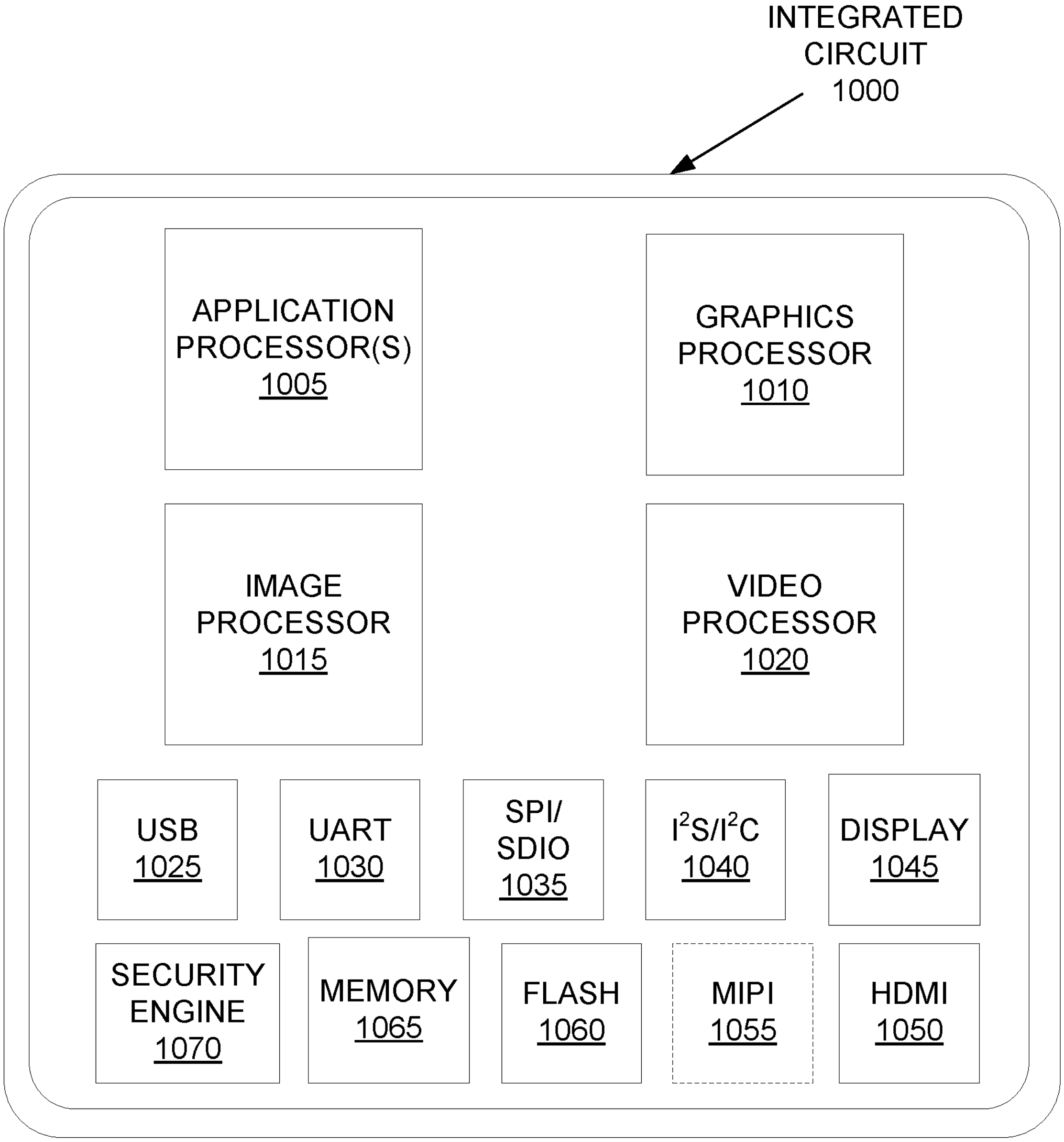
FIG. 10 illustrates an exemplary integrated circuit, in accordance with at least one embodiment.

FIG. 10 illustrates an exemplary integrated circuit 1000, in accordance with at least one embodiment. In at least one embodiment, exemplary integrated circuit 1000 is an SoC that may be fabricated using one or more IP cores. In at least one embodiment, integrated circuit 1000 includes one or more application processor(s) 1005 (e.g., CPUs, DPUs), at least one graphics processor 1010, and may additionally include an image processor 1015 and/or a video processor 1020, any of which may be a modular IP core. In at least one embodiment, integrated circuit 1000 includes peripheral or bus logic including a USB controller 1025, a UART controller 1030, an SPI/SDIO controller 1035, and an $I^2S/I^2C$ controller 1040. In at least one embodiment, integrated circuit 1000 can include a display device 1045 coupled to one or more of a high-definition multimedia interface ("HDMI") controller 1050 and a mobile industry processor interface ("MIPI") display interface 1055. In at least one embodiment, storage may be provided by a flash memory subsystem 1060 including flash memory and a flash memory controller. In at least one embodiment, a memory interface may be provided via a memory controller 1065 for access to SDRAM or SRAM memory devices. In at least one embodiment, some integrated circuits additionally include an embedded security engine 1070.

In at least one embodiment, integrated circuit 1000 comprises logic to cause information to be stored in one or more memory locations based, at least in part, on one or more graphs, and/or perform other operations to provide functionality described herein in conjunction with FIGS. 1-5.

Figure 11:
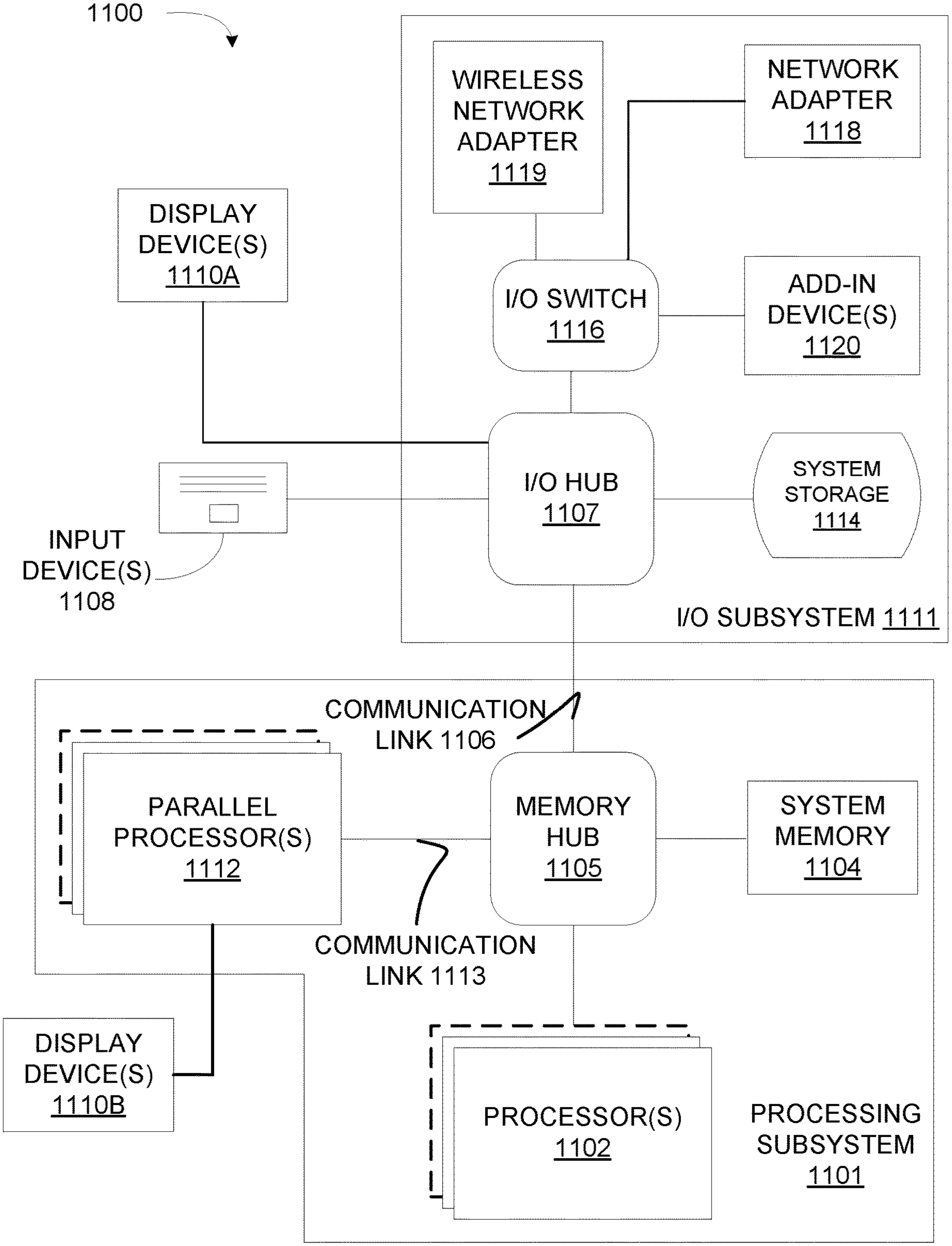
FIG. 11 illustrates a computing system, according to at least one embodiment.

FIG. 11 illustrates a computing system 1100, according to at least one embodiment; In at least one embodiment, computing system 1100 includes a processing subsystem 1101 having one or more processor(s) 1102 and a system memory 1104 communicating via an interconnection path that may include a memory hub 1105. In at least one embodiment, memory hub 1105 may be a separate component within a chipset component or may be integrated within one or more processor(s) 1102. In at least one embodiment, memory hub 1105 couples with an I/O subsystem 1111 via a communication link 1106. In at least one embodiment, I/O subsystem 1111 includes an I/O hub 1107 that can enable computing system 1100 to receive input from one or more input device(s) 1108. In at least one embodiment, I/O hub 1107 can enable a display controller, which may be included in one or more processor(s) 1102, to provide outputs to one or more display device(s) 1110A. In at least one embodiment, one or more display device(s) 1110A coupled with I/O hub 1107 can include a local, internal, or embedded display device.

In at least one embodiment, computing system 1100, including processing subsystem 1101, comprises logic to cause information to be stored in one or more memory locations based, at least in part, on one or more graphs, and/or perform other operations to provide functionality described herein in conjunction with FIGS. 1-5.

In at least one embodiment, processing subsystem 1101 includes one or more parallel processor(s) 1112 coupled to memory hub 1105 via a bus or other communication link 1113. In at least one embodiment, communication link 1113 may be one of any number of standards based communication link technologies or protocols, such as, but not limited to PCIe, or may be a vendor specific communications interface or communications fabric. In at least one embodiment, one or more parallel processor(s) 1112 form a computationally focused parallel or vector processing system that can include a large number of processing cores and/or processing clusters, such as a many integrated core processor. In at least one embodiment, one or more parallel processor(s) 1112 form a graphics processing subsystem that can output pixels to one of one or more display device(s) 1110A coupled via I/O Hub 1107. In at least one embodiment, one or more parallel processor(s) 1112 can also include a display controller and display interface (not shown) to enable a direct connection to one or more display device(s) 1110B.

In at least one embodiment, a system storage unit 1114 can connect to I/O hub 1107 to provide a storage mechanism for computing system 1100. In at least one embodiment, an I/O switch 1116 can be used to provide an interface mechanism to enable connections between I/O hub 1107 and other components, such as a network adapter 1118 and/or wireless network adapter 1119 that may be integrated into a platform, and various other devices that can be added via one or more add-in device(s) 1120. In at least one embodiment, network adapter 1118 can be an Ethernet adapter or another wired network adapter. In at least one embodiment, wireless network adapter 1119 can include one or more of a Wi-Fi, Bluetooth, NFC, or other network device that includes one or more wireless radios.

In at least one embodiment, computing system 1100 can include other components not explicitly shown, including USB or other port connections, optical storage drives, video capture devices, and the like, that may also be connected to I/O hub 1107. In at least one embodiment, communication paths interconnecting various components in FIG. 11 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1112 incorporate circuitry optimized for graphics and video processing, including, for example, video output circuitry, and constitutes a graphics processing unit ("GPU"). In at least one embodiment, one or more parallel processor(s) 1112 incorporate circuitry optimized for general purpose processing. In at least embodiment, components of computing system 1100 may be integrated with one or more other system elements on a single integrated circuit. For example, in at least one embodiment, one or more parallel processor(s) 1112, memory hub 1105, processor(s) 1102, and I/O hub 1107 can be integrated into an SoC integrated circuit. In at least one embodiment, components of computing system 1100 can be integrated into a single package to form a system in package ("SIP") configuration. In at least one embodiment, at least a portion of the components of computing system 1100 can be integrated into a multi-chip module ("MCM"), which can be interconnected with other multi-chip modules into a modular computing system. In at least one embodiment, I/O subsystem 1111 and display devices 1110B are omitted from computing system 1100.

Processing Systems

The following figures set forth, without limitation, exemplary processing systems that can be used to implement at least one embodiment.

Figure 12:
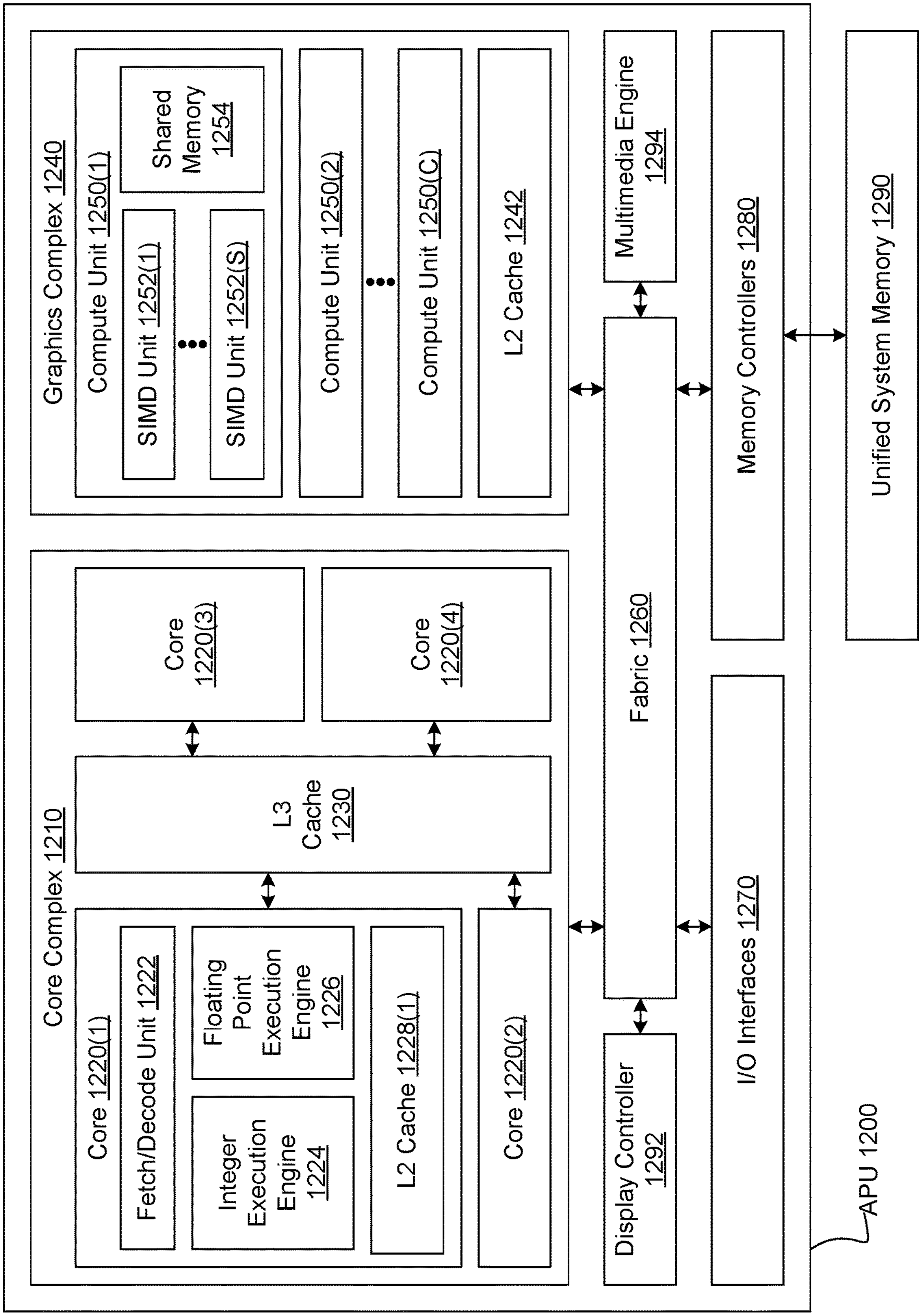
FIG. 12 illustrates an APU, in accordance with at least one embodiment.

FIG. 12 illustrates an accelerated processing unit ("APU") 1200, in accordance with at least one embodiment. In at least one embodiment, APU 1200 is developed by AMD Corporation of Santa Clara, CA. In at least one embodiment, APU 1200 can be configured to execute an application program, such as a CUDA program. In at least one embodiment, APU 1200 includes, without limitation, a core complex 1210, a graphics complex 1240, fabric 1260, I/O interfaces 1270, memory controllers 1280, a display controller 1292, and a multimedia engine 1294. In at least one embodiment, APU 1200 may include, without limitation, any number of core complexes 1210, any number of graphics complexes 1250, any number of display controllers 1292, and any number of multimedia engines 1294 in any combination. For explanatory purposes, multiple instances of like objects are denoted herein with reference numbers identifying the object and parenthetical numbers identifying the instance where needed.

In at least one embodiment, API 1200 comprises logic to cause information to be stored in one or more memory locations based, at least in part, on one or more graphs, and/or perform other operations to provide functionality described herein in conjunction with FIGS. 1-5.

In at least one embodiment, core complex 1210 is a CPU, graphics complex 1240 is a GPU, and APU 1200 is a processing unit that integrates, without limitation, 1210 and 1240 onto a single chip. In at least one embodiment, some tasks may be assigned to core complex 1210 and other tasks may be assigned to graphics complex 1240. In at least one embodiment, core complex 1210 is configured to execute main control software associated with APU 1200, such as an operating system. In at least one embodiment, core complex 1210 is the master processor of APU 1200, controlling and coordinating operations of other processors. In at least one embodiment, core complex 1210 issues commands that control the operation of graphics complex 1240. In at least one embodiment, core complex 1210 can be configured to execute host executable code derived from CUDA source code, and graphics complex 1240 can be configured to execute device executable code derived from CUDA source code.

In at least one embodiment, core complex 1210 includes, without limitation, cores 1220(1)-1220(4) and an L3 cache 1230. In at least one embodiment, core complex 1210 may include, without limitation, any number of cores 1220 and any number and type of caches in any combination. In at least one embodiment, cores 1220 are configured to execute instructions of a particular instruction set architecture ("ISA"). In at least one embodiment, each core 1220 is a CPU core.

In at least one embodiment, each core 1220 includes, without limitation, a fetch/decode unit 1222, an integer execution engine 1224, a floating point execution engine 1226, and an L2 cache 1228. In at least one embodiment, fetch/decode unit 1222 fetches instructions, decodes such instructions, generates micro-operations, and dispatches separate micro-instructions to integer execution engine 1224 and floating point execution engine 1226. In at least one embodiment, fetch/decode unit 1222 can concurrently dispatch one micro-instruction to integer execution engine 1224 and another micro-instruction to floating point execution engine 1226. In at least one embodiment, integer execution engine 1224 executes, without limitation, integer and memory operations. In at least one embodiment, floating point engine 1226 executes, without limitation, floating point and vector operations. In at least one embodiment, fetch-decode unit 1222 dispatches micro-instructions to a single execution engine that replaces both integer execution engine 1224 and floating point execution engine 1226.

In at least one embodiment, each core 1220(*i*), where i is an integer representing a particular instance of core 1220, may access L2 cache 1228(*i*) included in core 1220(*i*). In at least one embodiment, each core 1220 included in core complex 1210(*j*), where j is an integer representing a particular instance of core complex 1210, is connected to other cores 1220 included in core complex 1210(*j*) via L3 cache 1230(*j*) included in core complex 1210(*j*). In at least one embodiment, cores 1220 included in core complex 1210(*j*), where j is an integer representing a particular instance of core complex 1210, can access all of L3 cache 1230(*j*) included in core complex 1210(*j*). In at least one embodiment, L3 cache 1230 may include, without limitation, any number of slices.

In at least one embodiment, graphics complex 1240 can be configured to perform compute operations in a highly-parallel fashion. In at least one embodiment, graphics complex 1240 is configured to execute graphics pipeline operations such as draw commands, pixel operations, geometric computations, and other operations associated with rendering an image to a display. In at least one embodiment, graphics complex 1240 is configured to execute operations unrelated to graphics. In at least one embodiment, graphics complex 1240 is configured to execute both operations related to graphics and operations unrelated to graphics.

In at least one embodiment, graphics complex 1240 includes, without limitation, any number of compute units 1250 and an L2 cache 1242. In at least one embodiment, compute units 1250 share L2 cache 1242. In at least one embodiment, L2 cache 1242 is partitioned. In at least one embodiment, graphics complex 1240 includes, without limitation, any number of compute units 1250 and any number (including zero) and type of caches. In at least one embodiment, graphics complex 1240 includes, without limitation, any amount of dedicated graphics hardware.

In at least one embodiment, each compute unit 1250 includes, without limitation, any number of SIMD units 1252 and a shared memory 1254. In at least one embodiment, each SIMD unit 1252 implements a SIMD architecture and is configured to perform operations in parallel. In at least one embodiment, each compute unit 1250 may execute any number of thread blocks, but each thread block executes on a single compute unit 1250. In at least one embodiment, a thread block includes, without limitation, any number of threads of execution. In at least one embodiment, a workgroup is a thread block. In at least one embodiment, each SIMD unit 1252 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1254.

In at least one embodiment, fabric 1260 is a system interconnect that facilitates data and control transmissions across core complex 1210, graphics complex 1240, I/O interfaces 1270, memory controllers 1280, display controller 1292, and multimedia engine 1294. In at least one embodiment, APU 1200 may include, without limitation, any amount and type of system interconnect in addition to or instead of fabric 1260 that facilitates data and control transmissions across any number and type of directly or indirectly linked components that may be internal or external to APU 1200. In at least one embodiment, I/O interfaces 1270 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1270 In at least one embodiment, peripheral devices that are coupled to I/O interfaces 1270 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 1294 includes, without limitation, any amount and type of circuitry that is related to multimedia, such as a video decoder, a video encoder, an image signal processor, etc. In at least one embodiment, memory controllers 1280 facilitate data transfers between APU 1200 and a unified system memory 1290. In at least one embodiment, core complex 1210 and graphics complex 1240 share unified system memory 1290.

In at least one embodiment, APU 1200 implements a memory subsystem that includes, without limitation, any amount and type of memory controllers 1280 and memory devices (e.g., shared memory 1254) that may be dedicated to one component or shared among multiple components. In at least one embodiment, APU 1200 implements a cache subsystem that includes, without limitation, one or more cache memories (e.g., L2 caches 1328, L3 cache 1230, and L2 cache 1242) that may each be private to or shared between any number of components (e.g., cores 1220, core complex 1210, SIMD units 1252, compute units 1250, and graphics complex 1240).

Figure 13:
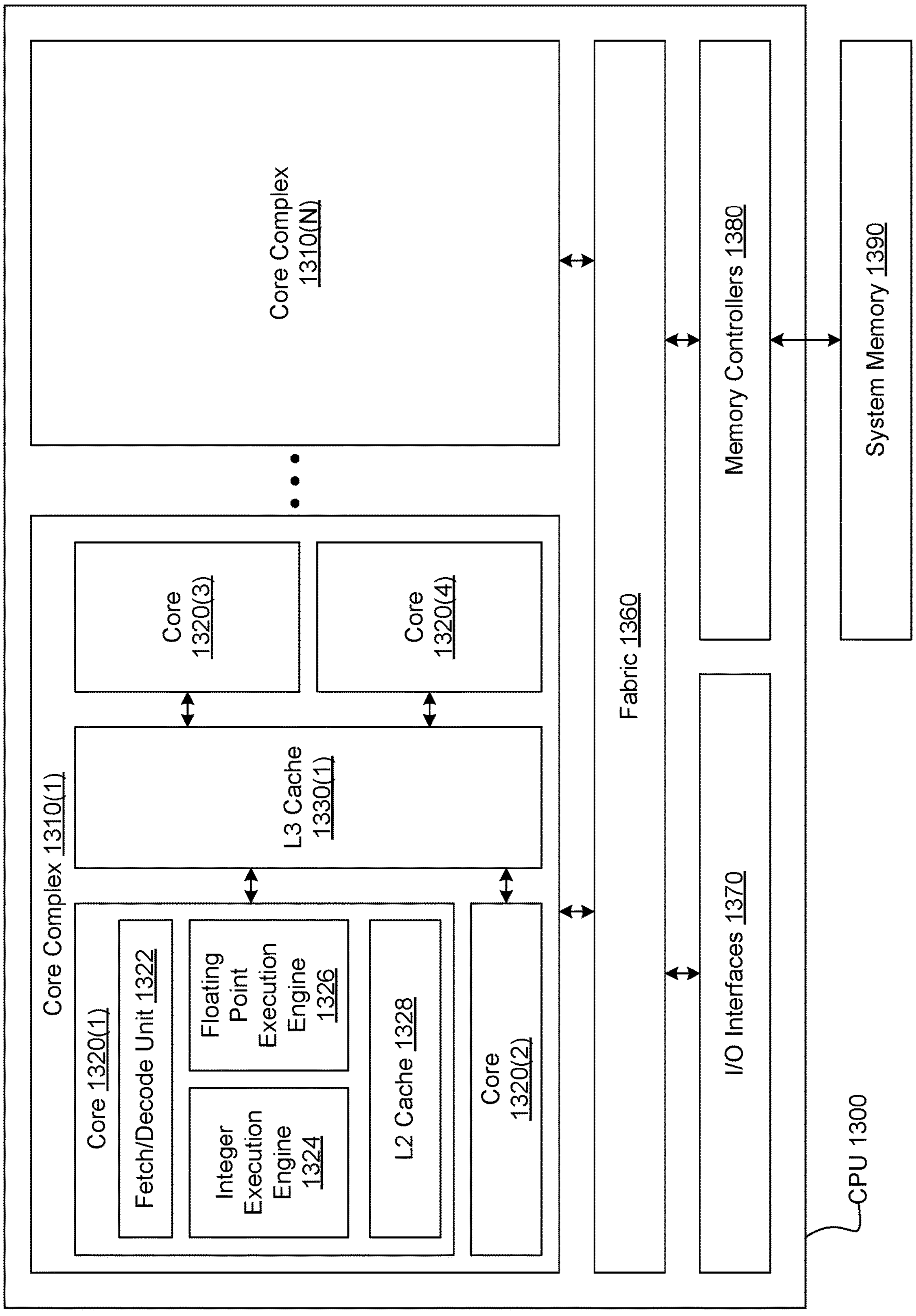
FIG. 13 illustrates a CPU, in accordance with at least one embodiment.

FIG. 13 illustrates a CPU 1300, in accordance with at least one embodiment. In at least one embodiment, CPU 1300 is developed by AMD Corporation of Santa Clara, CA. In at least one embodiment, CPU 1300 can be configured to execute an application program. In at least one embodiment, CPU 1300 is configured to execute main control software, such as an operating system. In at least one embodiment, CPU 1300 issues commands that control the operation of an external GPU (not shown). In at least one embodiment, CPU 1300 can be configured to execute host executable code derived from CUDA source code, and an external GPU can be configured to execute device executable code derived from such CUDA source code. In at least one embodiment, CPU 1300 includes, without limitation, any number of core complexes 1310, fabric 1360, I/O interfaces 1370, and memory controllers 1380.

In at least one embodiment, CPU 1300 comprises logic to cause information to be stored in one or more memory locations based, at least in part, on one or more graphs, and/or perform other operations to provide functionality described herein in conjunction with FIGS. 1-5.

In at least one embodiment, core complex 1310 includes, without limitation, cores 1320(1)-1320(4) and an L3 cache 1330. In at least one embodiment, core complex 1310 may include, without limitation, any number of cores 1320 and any number and type of caches in any combination. In at least one embodiment, cores 1320 are configured to execute instructions of a particular ISA. In at least one embodiment, each core 1320 is a CPU core.

In at least one embodiment, each core 1320 includes, without limitation, a fetch/decode unit 1322, an integer execution engine 1324, a floating point execution engine 1326, and an L2 cache 1328. In at least one embodiment, fetch/decode unit 1322 fetches instructions, decodes such instructions, generates micro-operations, and dispatches separate micro-instructions to integer execution engine 1324 and floating point execution engine 1326. In at least one embodiment, fetch/decode unit 1322 can concurrently dispatch one micro-instruction to integer execution engine 1324 and another micro-instruction to floating point execution engine 1326. In at least one embodiment, integer execution engine 1324 executes, without limitation, integer and memory operations. In at least one embodiment, floating point engine 1326 executes, without limitation, floating point and vector operations. In at least one embodiment, fetch-decode unit 1322 dispatches micro-instructions to a single execution engine that replaces both integer execution engine 1324 and floating point execution engine 1326.

In at least one embodiment, each core 1320(*i*), where i is an integer representing a particular instance of core 1320, may access L2 cache 1328(*i*) included in core 1320(*i*). In at least one embodiment, each core 1320 included in core complex 1310(*j*), where j is an integer representing a particular instance of core complex 1310, is connected to other cores 1320 in core complex 1310(*j*) via L3 cache 1330(*j*) included in core complex 1310(*j*). In at least one embodiment, cores 1320 included in core complex 1310(*j*), where j is an integer representing a particular instance of core complex 1310, can access all of L3 cache 1330(*j*) included in core complex 1310(*j*). In at least one embodiment, L3 cache 1330 may include, without limitation, any number of slices.

In at least one embodiment, fabric 1360 is a system interconnect that facilitates data and control transmissions across core complexes 1310(1)-1310(N) (where N is an integer greater than zero), I/O interfaces 1370, and memory controllers 1380. In at least one embodiment, CPU 1300 may include, without limitation, any amount and type of system interconnect in addition to or instead of fabric 1360 that facilitates data and control transmissions across any number and type of directly or indirectly linked components that may be internal or external to CPU 1300. In at least one embodiment, I/O interfaces 1370 are representative of any number and type of I/O interfaces (e.g., PCI, PCI-X, PCIe, GBE, USB, etc.). In at least one embodiment, various types of peripheral devices are coupled to I/O interfaces 1370 In at least one embodiment, peripheral devices that are coupled to I/O interfaces 1370 may include, without limitation, displays, keyboards, mice, printers, scanners, joysticks or other types of game controllers, media recording devices, external storage devices, network interface cards, and so forth.

In at least one embodiment, memory controllers 1380 facilitate data transfers between CPU 1300 and a system memory 1390. In at least one embodiment, core complex 1310 and graphics complex 1340 share system memory 1390. In at least one embodiment, CPU 1300 implements a memory subsystem that includes, without limitation, any amount and type of memory controllers 1380 and memory devices that may be dedicated to one component or shared among multiple components. In at least one embodiment, CPU 1300 implements a cache subsystem that includes, without limitation, one or more cache memories (e.g., L2 caches 1328 and L3 caches 1330) that may each be private to or shared between any number of components (e.g., cores 1320 and core complexes 1310).

Figure 14:
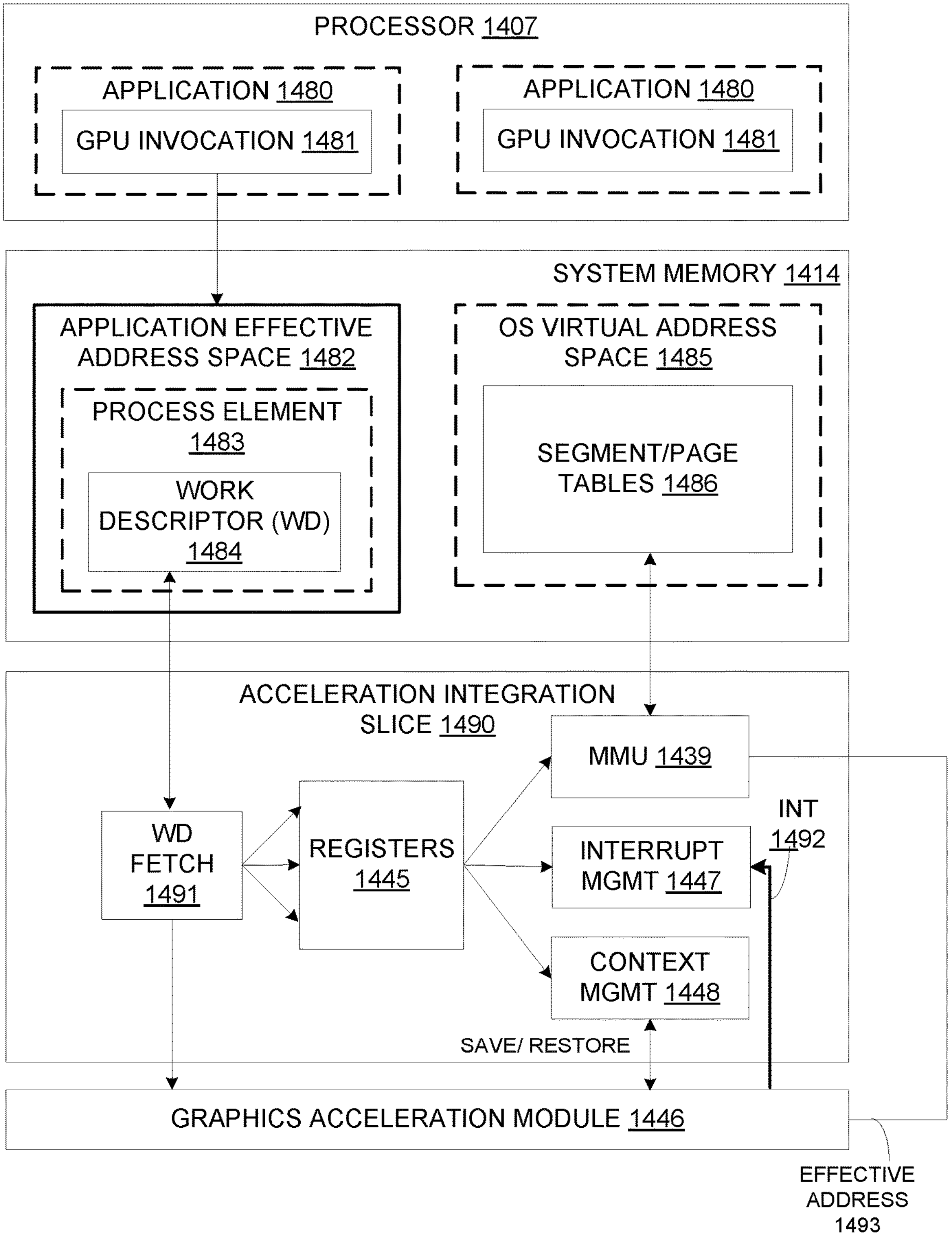
FIG. 14 illustrates an exemplary accelerator integration slice, in accordance with at least one embodiment.

FIG. 14 illustrates an exemplary accelerator integration slice 1490, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

In at least one embodiment, accelerator integration slice 1490 comprises logic to cause information to be stored in one or more memory locations based, at least in part, on one or more graphs, and/or perform other operations to provide functionality described herein in conjunction with FIGS. 1-5.

An application effective address space 1482 within system memory 1414 stores process elements 1483. In one embodiment, process elements 1483 are stored in response to GPU invocations 1481 from applications 1480 executed on processor 1407. A process element 1483 contains process state for corresponding application 1480. A work descriptor ("WD") 1484 contained in process element 1483 can be a single job requested by an application or may contain a pointer to a queue of jobs. In at least one embodiment, WD 1484 is a pointer to a job request queue in application effective address space 1482.

Graphics acceleration module 1446 and/or individual graphics processing engines can be shared by all or a subset of processes in a system. In at least one embodiment, an infrastructure for setting up process state and sending WD 1484 to graphics acceleration module 1446 to start a job in a virtualized environment may be included.

In at least one embodiment, a dedicated-process programming model is implementation-specific. In this model, a single process owns graphics acceleration module 1446 or an individual graphics processing engine. Because graphics acceleration module 1446 is owned by a single process, a hypervisor initializes an accelerator integration circuit for an owning partition and an operating system initializes accelerator integration circuit for an owning process when graphics acceleration module 1446 is assigned.

In operation, a WD fetch unit 1491 in accelerator integration slice 1490 fetches next WD 1484 which includes an indication of work to be done by one or more graphics processing engines of graphics acceleration module 1446. Data from WD 1484 may be stored in registers 1445 and used by a memory management unit ("MMU") 1439, interrupt management circuit 1447 and/or context management circuit 1448 as illustrated. For example, one embodiment of MMU 1439 includes segment/page walk circuitry for accessing segment/page tables 1486 within OS virtual address space 1485. Interrupt management circuit 1447 may process interrupt events ("INT") 1492 received from graphics acceleration module 1446. When performing graphics operations, an effective address 1493 generated by a graphics processing engine is translated to a real address by MMU 1439.

In one embodiment, a same set of registers 1445 are duplicated for each graphics processing engine and/or graphics acceleration module 1446 and may be initialized by a hypervisor or operating system. Each of these duplicated registers may be included in accelerator integration slice 1490. Exemplary registers that may be initialized by a hypervisor are shown in Table 1.

TABLE 1

| Hypervisor Initialized Registers | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 1484 is specific to a particular graphics acceleration module 1446 and/or a particular graphics processing engine. It contains all information required by a graphics processing engine to do work or it can be a pointer to a memory location where an application has set up a command queue of work to be completed.

Figure 15A:
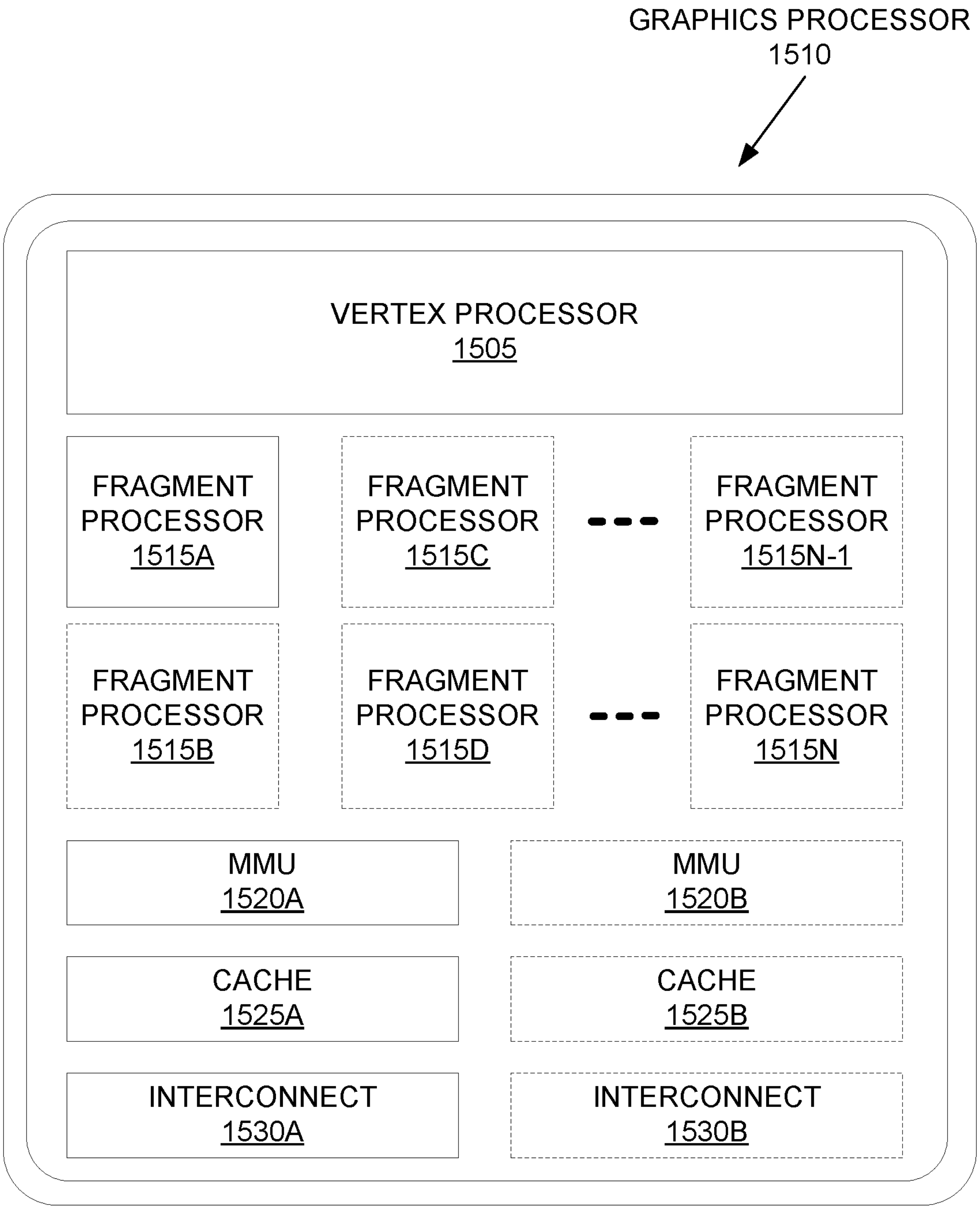
FIGS. 15A-15B illustrate exemplary graphics processors, in accordance with at least one embodiment.
Figure 15B:
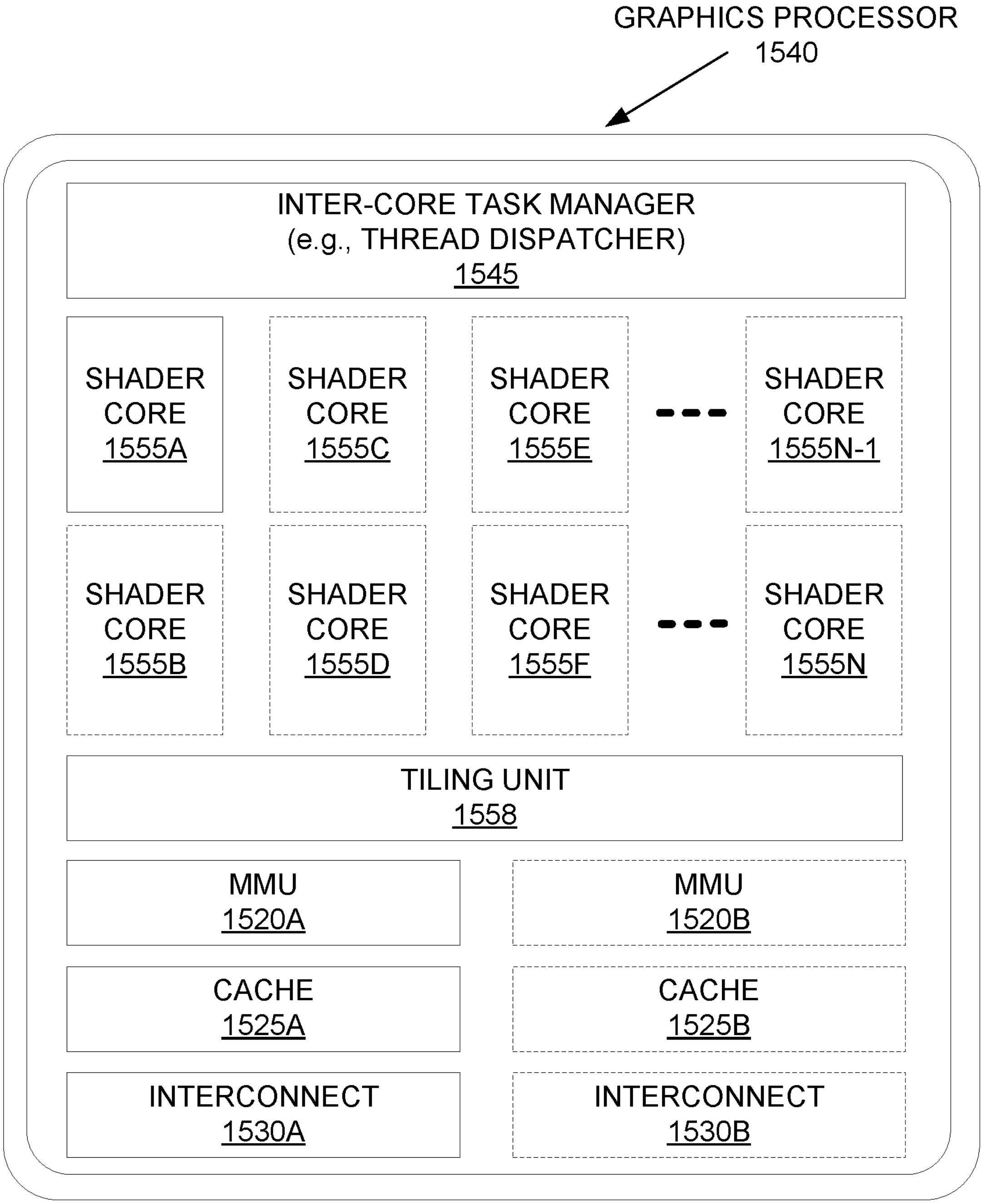

FIGS. 15A-15B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

In at least one embodiment, exemplary graphics processors of FIGS. 15A-15B comprise logic to cause information to be stored in one or more memory locations based, at least in part, on one or more graphs, and/or perform other operations to provide functionality described herein in conjunction with FIGS. 1-5.

FIG. 15A illustrates an exemplary graphics processor 1510 of an SoC integrated circuit that may be fabricated using one or more IP cores, in accordance with at least one embodiment. FIG. 15B illustrates an additional exemplary graphics processor 1540 of an SoC integrated circuit that may be fabricated using one or more IP cores, in accordance with at least one embodiment. In at least one embodiment, graphics processor 1510 of FIG. 15A is a low power graphics processor core. In at least one embodiment, graphics processor 1540 of FIG. 15B is a higher performance graphics processor core. In at least one embodiment, each of graphics processors 1510, 1540 can be variants of graphics processor 1010 of FIG. 10.

In at least one embodiment, graphics processor 1510 includes a vertex processor 1505 and one or more fragment processor(s) 1515A-1515N (e.g., 1515A, 1515B, 1515C, 1515D, through 1515N−1, and 1515N). In at least one embodiment, graphics processor 1510 can execute different shader programs via separate logic, such that vertex processor 1505 is optimized to execute operations for vertex shader programs, while one or more fragment processor(s) 1515A-1515N execute fragment (e.g., pixel) shading operations for fragment or pixel shader programs. In at least one embodiment, vertex processor 1505 performs a vertex processing stage of a 3D graphics pipeline and generates primitives and vertex data. In at least one embodiment, fragment processor(s) 1515A-1515N use primitive and vertex data generated by vertex processor 1505 to produce a framebuffer that is displayed on a display device. In at least one embodiment, fragment processor(s) 1515A-1515N are optimized to execute fragment shader programs as provided for in an OpenGL API, which may be used to perform similar operations as a pixel shader program as provided for in a Direct 3D API.

In at least one embodiment, graphics processor 1510 additionally includes one or more MMU(s) 1520A-1520B, cache(s) 1525A-1525B, and circuit interconnect(s) 1530A-1530B. In at least one embodiment, one or more MMU(s) 1520A-1520B provide for virtual to physical address mapping for graphics processor 1510, including for vertex processor 1505 and/or fragment processor(s) 1515A-1515N, which may reference vertex or image/texture data stored in memory, in addition to vertex or image/texture data stored in one or more cache(s) 1525A-1525B. In at least one embodiment, one or more MMU(s) 1520A-1520B may be synchronized with other MMUs within a system, including one or more MMUs associated with one or more application processor(s) 1005, image processors 1015, and/or video processors 1020 of FIG. 10, such that each processor 1005-1020 can participate in a shared or unified virtual memory system. In at least one embodiment, one or more circuit interconnect(s) 1530A-1530B enable graphics processor 1510 to interface with other IP cores within an SoC, either via an internal bus of the SoC or via a direct connection.

In at least one embodiment, graphics processor 1540 includes one or more MMU(s) 1520A-1520B, caches 1525A-1525B, and circuit interconnects 1530A-1530B of graphics processor 1510 of FIG. 15A. In at least one embodiment, graphics processor 1540 includes one or more shader core(s) 1555A-1555N (e.g., 1555A, 1555B, 1555C, 1555D, 1555E, 1555F, through 1555N-1, and 1555N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1540 includes an inter-core task manager 1545, which acts as a thread dispatcher to dispatch execution threads to one or more shader cores 1555A-1555N and a tiling unit 1558 to accelerate tiling operations for tile-based rendering, in which rendering operations for a scene are subdivided in image space, for example to exploit local spatial coherence within a scene or to optimize use of internal caches.

Figure 16A:
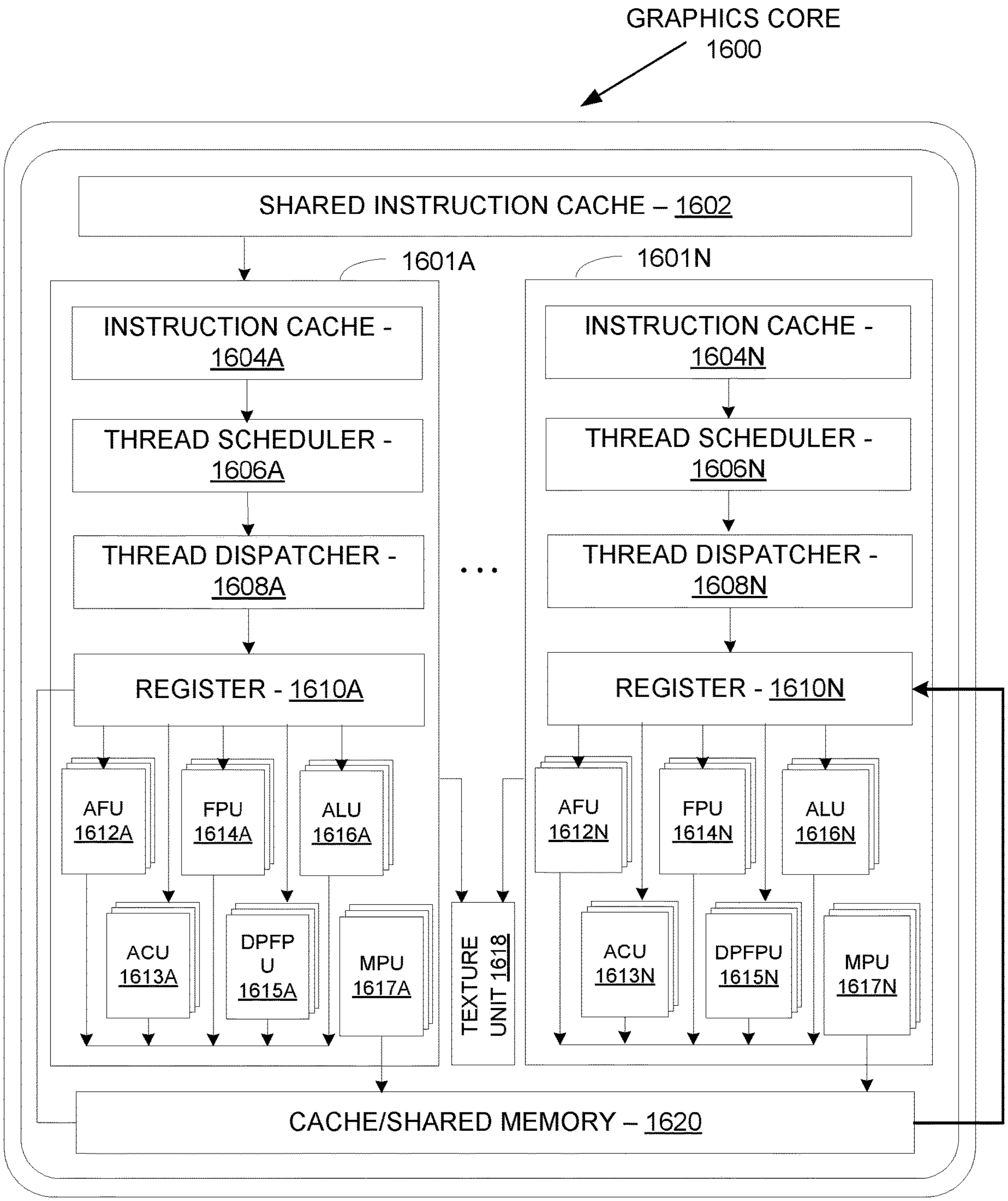
FIG. 16A illustrates a graphics core, in accordance with at least one embodiment.

FIG. 16A illustrates a graphics core 1600, in accordance with at least one embodiment. In at least one embodiment, graphics core 1600 may be included within graphics processor 1010 of FIG. 10. In at least one embodiment, graphics core 1600 may be a unified shader core 1555A-1555N as in FIG. 15B. In at least one embodiment, graphics core 1600 includes a shared instruction cache 1602, a texture unit 1618, and a cache/shared memory 1620 that are common to execution resources within graphics core 1600. In at least one embodiment, graphics core 1600 can include multiple slices 1601A-1601N or partition for each core, and a graphics processor can include multiple instances of graphics core 1600. Slices 1601A-1601N can include support logic including a local instruction cache 1604A-1604N, a thread scheduler 1606A-1606N, a thread dispatcher 1608A-1608N, and a set of registers 1610A-1610N. In at least one embodiment, slices 1601A-1601N can include a set of additional function units ("AFUs") 1612A-1612N, floating-point units ("FPUs") 1614A-1614N, integer arithmetic logic units ("ALUs") 1616-1616N, address computational units ("ACUs") 1613A-1613N, double-precision floating-point units ("DPFPUs") 1615A-1615N, and matrix processing units ("MPUs") 1617A-1617N.

In at least one embodiment, graphics core 1600 comprises logic to cause information to be stored in one or more memory locations based, at least in part, on one or more graphs, and/or perform other operations to provide functionality described herein in conjunction with FIGS. 1-5.

In at least one embodiment, FPUs 1614A-1614N can perform single-precision (32-bit) and half-precision (16-bit) floating point operations, while DPFPUs 1615A-1615N perform double precision (64-bit) floating point operations. In at least one embodiment, ALUs 1616A-1616N can perform variable precision integer operations at 8-bit, 16-bit, and 32-bit precision, and can be configured for mixed precision operations. In at least one embodiment, MPUs 1617A-1617N can also be configured for mixed precision matrix operations, including half-precision floating point and 8-bit integer operations. In at least one embodiment, MPUs 1617-1617N can perform a variety of matrix operations to accelerate CUDA programs, including enabling support for accelerated general matrix to matrix multiplication ("GEMM"). In at least one embodiment, AFUs 1612A-1612N can perform additional logic operations not supported by floating-point or integer units, including trigonometric operations (e.g., Sine, Cosine, etc.).

Figure 16B:
FIG. 16B illustrates a GPGPU, in accordance with at least one embodiment.

FIG. 16B illustrates a general-purpose graphics processing unit ("GPGPU") 1630, in accordance with at least one embodiment. In at least one embodiment, GPGPU 1630 is highly-parallel and suitable for deployment on a multi-chip module. In at least one embodiment, GPGPU 1630 can be configured to enable highly-parallel compute operations to be performed by an array of GPUs. In at least one embodiment, GPGPU 1630 can be linked directly to other instances of GPGPU 1630 to create a multi-GPU cluster to improve execution time for CUDA programs. In at least one embodiment, GPGPU 1630 includes a host interface 1632 to enable a connection with a host processor. In at least one embodiment, host interface 1632 is a PCIe interface. In at least one embodiment, host interface 1632 can be a vendor specific communications interface or communications fabric. In at least one embodiment, GPGPU 1630 receives commands from a host processor and uses a global scheduler 1634 to distribute execution threads associated with those commands to a set of compute clusters 1636A-1636H. In at least one embodiment, compute clusters 1636A-1636H share a cache memory 1638. In at least one embodiment, cache memory 1638 can serve as a higher-level cache for cache memories within compute clusters 1636A-1636H.

In at least one embodiment, GPGPU 1630 comprises logic to cause information to be stored in one or more memory locations based, at least in part, on one or more graphs, and/or perform other operations to provide functionality described herein in conjunction with FIGS. 1-5.

In at least one embodiment, GPGPU 1630 includes memory 1644A-1644B coupled with compute clusters 1636A-1636H via a set of memory controllers 1642A-1642B. In at least one embodiment, memory 1644A-1644B can include various types of memory devices including DRAM or graphics random access memory, such as synchronous graphics random access memory ("SGRAM"), including graphics double data rate ("GDDR") memory.

In at least one embodiment, compute clusters 1636A-1636H each include a set of graphics cores, such as graphics core 1600 of FIG. 16A, which can include multiple types of integer and floating point logic units that can perform computational operations at a range of precisions including suited for computations associated with CUDA programs. For example, in at least one embodiment, at least a subset of floating point units in each of compute clusters 1636A-1636H can be configured to perform 16-bit or 32-bit floating point operations, while a different subset of floating point units can be configured to perform 64-bit floating point operations.

In at least one embodiment, multiple instances of GPGPU 1630 can be configured to operate as a compute cluster. Compute clusters 1636A-1636H may implement any technically feasible communication techniques for synchronization and data exchange. In at least one embodiment, multiple instances of GPGPU 1630 communicate over host interface 1632. In at least one embodiment, GPGPU 1630 includes an I/O hub 1639 that couples GPGPU 1630 with a GPU link 1640 that enables a direct connection to other instances of GPGPU 1630. In at least one embodiment, GPU link 1640 is coupled to a dedicated GPU-to-GPU bridge that enables communication and synchronization between multiple instances of GPGPU 1630. In at least one embodiment GPU link 1640 couples with a high speed interconnect to transmit and receive data to other GPGPUs 1630 or parallel processors. In at least one embodiment, multiple instances of GPGPU 1630 are located in separate data processing systems and communicate via a network device that is accessible via host interface 1632. In at least one embodiment GPU link 1640 can be configured to enable a connection to a host processor in addition to or as an alternative to host interface 1632. In at least one embodiment, GPGPU 1630 can be configured to execute a CUDA program.

Figure 17A:
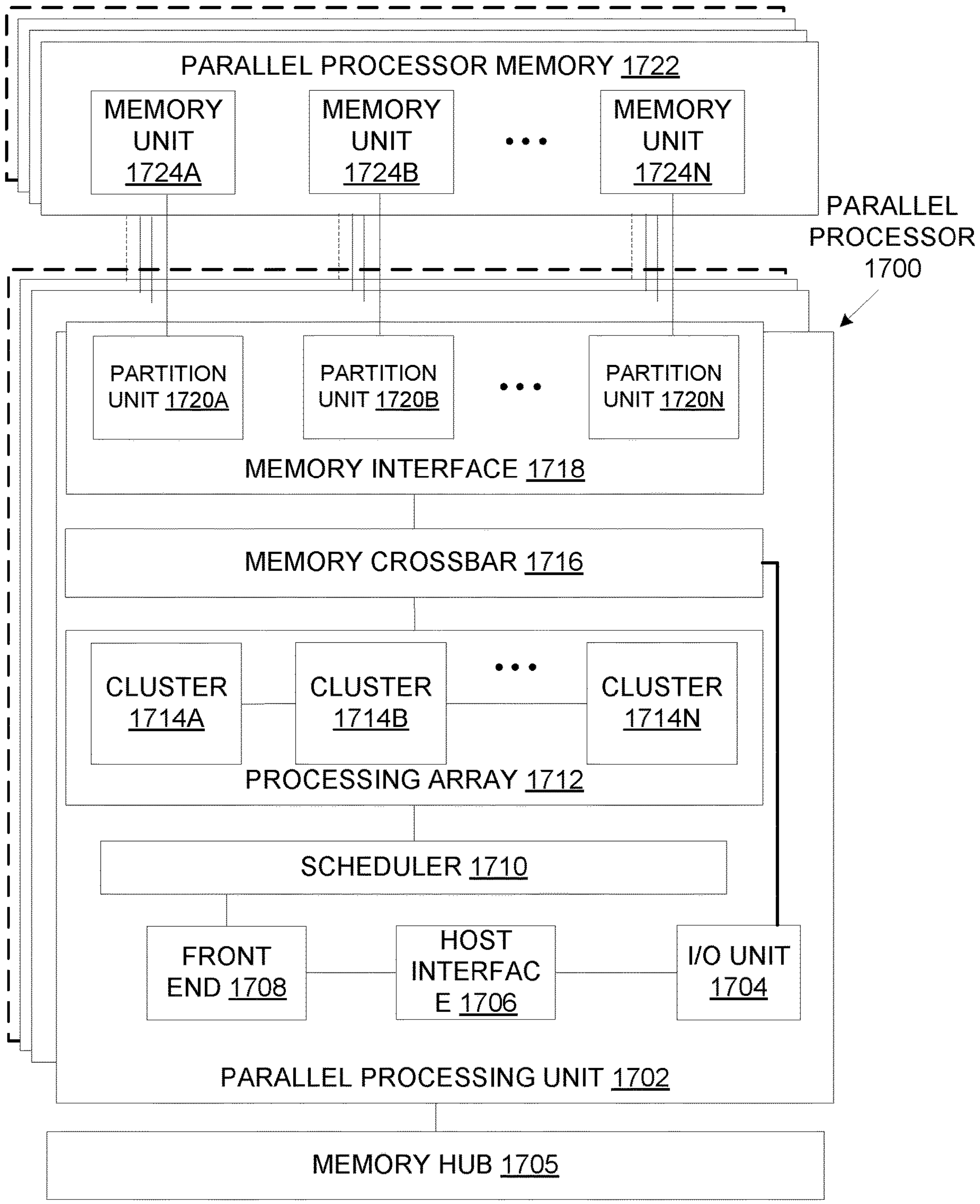
FIG. 17A illustrates a parallel processor, in accordance with at least one embodiment.

FIG. 17A illustrates a parallel processor 1700, in accordance with at least one embodiment. In at least one embodiment, various components of parallel processor 1700 may be implemented using one or more integrated circuit devices, such as programmable processors, application specific integrated circuits ("ASICs"), or FPGAs.

In at least one embodiment, parallel processor 1700 comprises logic to cause information to be stored in one or more memory locations based, at least in part, on one or more graphs, and/or perform other operations to provide functionality described herein in conjunction with FIGS. 1-5.

In at least one embodiment, parallel processor 1700 includes a parallel processing unit 1702. In at least one embodiment, parallel processing unit 1702 includes an I/O unit 1704 that enables communication with other devices, including other instances of parallel processing unit 1702. In at least one embodiment, I/O unit 1704 may be directly connected to other devices. In at least one embodiment, I/O unit 1704 connects with other devices via use of a hub or switch interface, such as memory hub 1705. In at least one embodiment, connections between memory hub 1705 and I/O unit 1704 form a communication link. In at least one embodiment, I/O unit 1704 connects with a host interface 1706 and a memory crossbar 1716, where host interface 1706 receives commands directed to performing processing operations and memory crossbar 1716 receives commands directed to performing memory operations.

In at least one embodiment, when host interface 1706 receives a command buffer via I/O unit 1704, host interface 1706 can direct work operations to perform those commands to a front end 1708. In at least one embodiment, front end 1708 couples with a scheduler 1710, which is configured to distribute commands or other work items to a processing array 1712. In at least one embodiment, scheduler 1710 ensures that processing array 1712 is properly configured and in a valid state before tasks are distributed to processing array 1712. In at least one embodiment, scheduler 1710 is implemented via firmware logic executing on a microcontroller. In at least one embodiment, microcontroller implemented scheduler 1710 is configurable to perform complex scheduling and work distribution operations at coarse and fine granularity, enabling rapid preemption and context switching of threads executing on processing array 1712. In at least one embodiment, host software can prove workloads for scheduling on processing array 1712 via one of multiple graphics processing doorbells. In at least one embodiment, workloads can then be automatically distributed across processing array 1712 by scheduler 1710 logic within a microcontroller including scheduler 1710.

In at least one embodiment, processing array 1712 can include up to "N" clusters (e.g., cluster 1714A, cluster 1714B, through cluster 1714N). In at least one embodiment, each cluster 1714A-1714N of processing array 1712 can execute a large number of concurrent threads. In at least one embodiment, scheduler 1710 can allocate work to clusters 1714A-1714N of processing array 1712 using various scheduling and/or work distribution algorithms, which may vary depending on the workload arising for each type of program or computation. In at least one embodiment, scheduling can be handled dynamically by scheduler 1710, or can be assisted in part by compiler logic during compilation of program logic configured for execution by processing array 1712. In at least one embodiment, different clusters 1714A-1714N of processing array 1712 can be allocated for processing different types of programs or for performing different types of computations.

In at least one embodiment, processing array 1712 can be configured to perform various types of parallel processing operations. In at least one embodiment, processing array 1712 is configured to perform general-purpose parallel compute operations. For example, in at least one embodiment, processing array 1712 can include logic to execute processing tasks including filtering of video and/or audio data, performing modeling operations, including physics operations, and performing data transformations.

In at least one embodiment, processing array 1712 is configured to perform parallel graphics processing operations. In at least one embodiment, processing array 1712 can include additional logic to support execution of such graphics processing operations, including, but not limited to texture sampling logic to perform texture operations, as well as tessellation logic and other vertex processing logic. In at least one embodiment, processing array 1712 can be configured to execute graphics processing related shader programs such as, but not limited to vertex shaders, tessellation shaders, geometry shaders, and pixel shaders. In at least one embodiment, parallel processing unit 1702 can transfer data from system memory via I/O unit 1704 for processing. In at least one embodiment, during processing, transferred data can be stored to on-chip memory (e.g., a parallel processor memory 1722) during processing, then written back to system memory.

In at least one embodiment, when parallel processing unit 1702 is used to perform graphics processing, scheduler 1710 can be configured to divide a processing workload into approximately equal sized tasks, to better enable distribution of graphics processing operations to multiple clusters 1714A-1714N of processing array 1712. In at least one embodiment, portions of processing array 1712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1714A-1714N may be stored in buffers to allow intermediate data to be transmitted between clusters 1714A-1714N for further processing.

In at least one embodiment, processing array 1712 can receive processing tasks to be executed via scheduler 1710, which receives commands defining processing tasks from front end 1708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1710 may be configured to fetch indices corresponding to tasks or may receive indices from front end 1708. In at least one embodiment, front end 1708 can be configured to ensure processing array 1712 is configured to a valid state before a workload specified by incoming command buffers (e.g., batch-buffers, push buffers, etc.) is initiated.

In at least one embodiment, each of one or more instances of parallel processing unit 1702 can couple with parallel processor memory 1722. In at least one embodiment, parallel processor memory 1722 can be accessed via memory crossbar 1716, which can receive memory requests from processing array 1712 as well as I/O unit 1704. In at least one embodiment, memory crossbar 1716 can access parallel processor memory 1722 via a memory interface 1718. In at least one embodiment, memory interface 1718 can include multiple partition units (e.g., a partition unit 1720A, partition unit 1720B, through partition unit 1720N) that can each couple to a portion (e.g., memory unit) of parallel processor memory 1722. In at least one embodiment, a number of partition units 1720A-1720N is configured to be equal to a number of memory units, such that a first partition unit 1720A has a corresponding first memory unit 1724A, a second partition unit 1720B has a corresponding memory unit 1724B, and an Nth partition unit 1720N has a corresponding Nth memory unit 1724N. In at least one embodiment, a number of partition units 1720A-1720N may not be equal to a number of memory devices.

In at least one embodiment, memory units 1724A-1724N can include various types of memory devices, including DRAM or graphics random access memory, such as SGRAM, including GDDR memory. In at least one embodiment, memory units 1724A-1724N may also include 3D stacked memory, including but not limited to high bandwidth memory ("HBM"). In at least one embodiment, render targets, such as frame buffers or texture maps may be stored across memory units 1724A-1724N, allowing partition units 1720A-1720N to write portions of each render target in parallel to efficiently use available bandwidth of parallel processor memory 1722. In at least one embodiment, a local instance of parallel processor memory 1722 may be excluded in favor of a unified memory design that utilizes system memory in conjunction with local cache memory.

In at least one embodiment, any one of clusters 1714A-1714N of processing array 1712 can process data that will be written to any of memory units 1724A-1724N within parallel processor memory 1722. In at least one embodiment, memory crossbar 1716 can be configured to transfer an output of each cluster 1714A-1714N to any partition unit 1720A-1720N or to another cluster 1714A-1714N, which can perform additional processing operations on an output. In at least one embodiment, each cluster 1714A-1714N can communicate with memory interface 1718 through memory crossbar 1716 to read from or write to various external memory devices. In at least one embodiment, memory crossbar 1716 has a connection to memory interface 1718 to communicate with I/O unit 1704, as well as a connection to a local instance of parallel processor memory 1722, enabling processing units within different clusters 1714A-1714N to communicate with system memory or other memory that is not local to parallel processing unit 1702. In at least one embodiment, memory crossbar 1716 can use virtual channels to separate traffic streams between clusters 1714A-1714N and partition units 1720A-1720N.

In at least one embodiment, multiple instances of parallel processing unit 1702 can be provided on a single add-in card, or multiple add-in cards can be interconnected. In at least one embodiment, different instances of parallel processing unit 1702 can be configured to interoperate even if different instances have different numbers of processing cores, different amounts of local parallel processor memory, and/or other configuration differences. For example, in at least one embodiment, some instances of parallel processing unit 1702 can include higher precision floating point units relative to other instances. In at least one embodiment, systems incorporating one or more instances of parallel processing unit 1702 or parallel processor 1700 can be implemented in a variety of configurations and form factors, including but not limited to desktop, laptop, or handheld personal computers, servers, workstations, game consoles, and/or embedded systems.

Figure 17B:
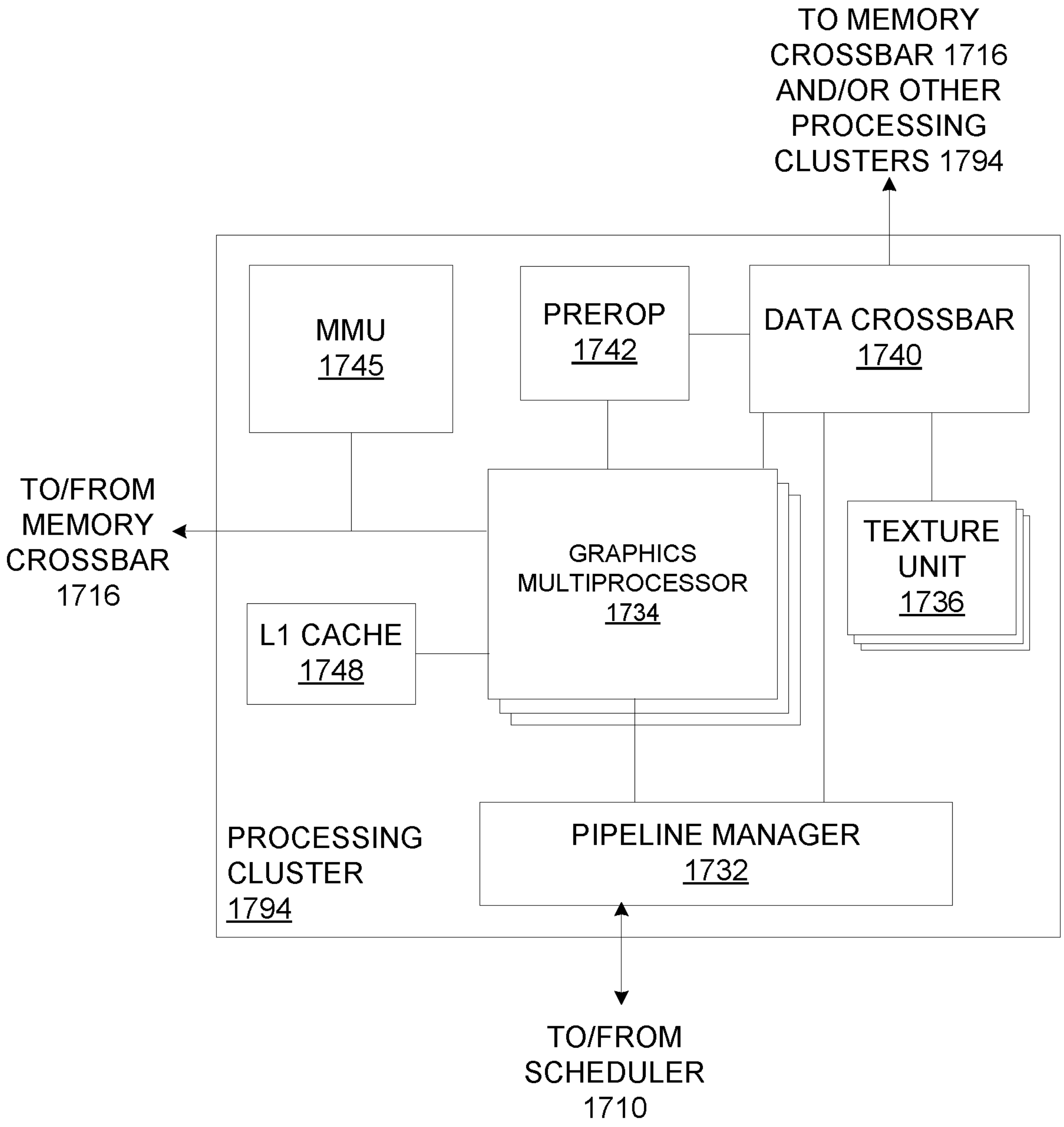
FIG. 17B illustrates a processing cluster, in accordance with at least one embodiment.

FIG. 17B illustrates a processing cluster 1794, in accordance with at least one embodiment. In at least one embodiment, processing cluster 1794 is included within a parallel processing unit. In at least one embodiment, processing cluster 1794 is one of processing clusters 1714A-1714N of FIG. 17. In at least one embodiment, processing cluster 1794 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 1794.

In at least one embodiment, processing cluster 1794 comprises logic to cause information to be stored in one or more memory locations based, at least in part, on one or more graphs, and/or perform other operations to provide functionality described herein in conjunction with FIGS. 1-5.

In at least one embodiment, operation of processing cluster 1794 can be controlled via a pipeline manager 1732 that distributes processing tasks to SIMT parallel processors. In at least one embodiment, pipeline manager 1732 receives instructions from scheduler 1710 of FIG. 17 and manages execution of those instructions via a graphics multiprocessor 1734 and/or a texture unit 1736. In at least one embodiment, graphics multiprocessor 1734 is an exemplary instance of a SIMT parallel processor. However, in at least one embodiment, various types of SIMT parallel processors of differing architectures may be included within processing cluster 1794. In at least one embodiment, one or more instances of graphics multiprocessor 1734 can be included within processing cluster 1794. In at least one embodiment, graphics multiprocessor 1734 can process data and a data crossbar 1740 can be used to distribute processed data to one of multiple possible destinations, including other shader units. In at least one embodiment, pipeline manager 1732 can facilitate distribution of processed data by specifying destinations for processed data to be distributed via data crossbar 1740.

In at least one embodiment, each graphics multiprocessor 1734 within processing cluster 1794 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1794 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 1734. In at least one embodiment, a thread group may include fewer threads than a number of processing engines within graphics multiprocessor 1734. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 1734. In at least one embodiment, when a thread group includes more threads than the number of processing engines within graphics multiprocessor 1734, processing can be performed over consecutive clock cycles. In at least one embodiment, multiple thread groups can be executed concurrently on graphics multiprocessor 1734.

In at least one embodiment, graphics multiprocessor 1734 includes an internal cache memory to perform load and store operations. In at least one embodiment, graphics multiprocessor 1734 can forego an internal cache and use a cache memory (e.g., L1 cache 1748) within processing cluster 1794. In at least one embodiment, each graphics multiprocessor 1734 also has access to Level 2 ("L2") caches within partition units (e.g., partition units 1720A-1720N of FIG. 17A) that are shared among all processing clusters 1794 and may be used to transfer data between threads. In at least one embodiment, graphics multiprocessor 1734 may also access off-chip global memory, which can include one or more of local parallel processor memory and/or system memory. In at least one embodiment, any memory external to parallel processing unit 1702 may be used as global memory. In at least one embodiment, processing cluster 1794 includes multiple instances of graphics multiprocessor 1734 that can share common instructions and data, which may be stored in L1 cache 1748.

In at least one embodiment, each processing cluster 1794 may include an MMU 1745 that is configured to map virtual addresses into physical addresses. In at least one embodiment, one or more instances of MMU 1745 may reside within memory interface 1718 of FIG. 17. In at least one embodiment, MMU 1745 includes a set of page table entries ("PTEs") used to map a virtual address to a physical address of a tile and optionally a cache line index. In at least one embodiment, MMU 1745 may include address translation lookaside buffers ("TLBs") or caches that may reside within graphics multiprocessor 1734 or L1 cache 1748 or processing cluster 1794. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 1794 may be configured such that each graphics multiprocessor 1734 is coupled to a texture unit 1736 for performing texture mapping operations, e.g., determining texture sample positions, reading texture data, and filtering texture data. In at least one embodiment, texture data is read from an internal texture L1 cache (not shown) or from an L1 cache within graphics multiprocessor 1734 and is fetched from an L2 cache, local parallel processor memory, or system memory, as needed. In at least one embodiment, each graphics multiprocessor 1734 outputs a processed task to data crossbar 1740 to provide the processed task to another processing cluster 1794 for further processing or to store the processed task in an L2 cache, a local parallel processor memory, or a system memory via memory crossbar 1716. In at least one embodiment, a pre-raster operations unit ("preROP") 1742 is configured to receive data from graphics multiprocessor 1734, direct data to ROP units, which may be located with partition units as described herein (e.g., partition units 1720A-1720N of FIG. 17). In at least one embodiment, PreROP 1742 can perform optimizations for color blending, organize pixel color data, and perform address translations.

Figure 17C:
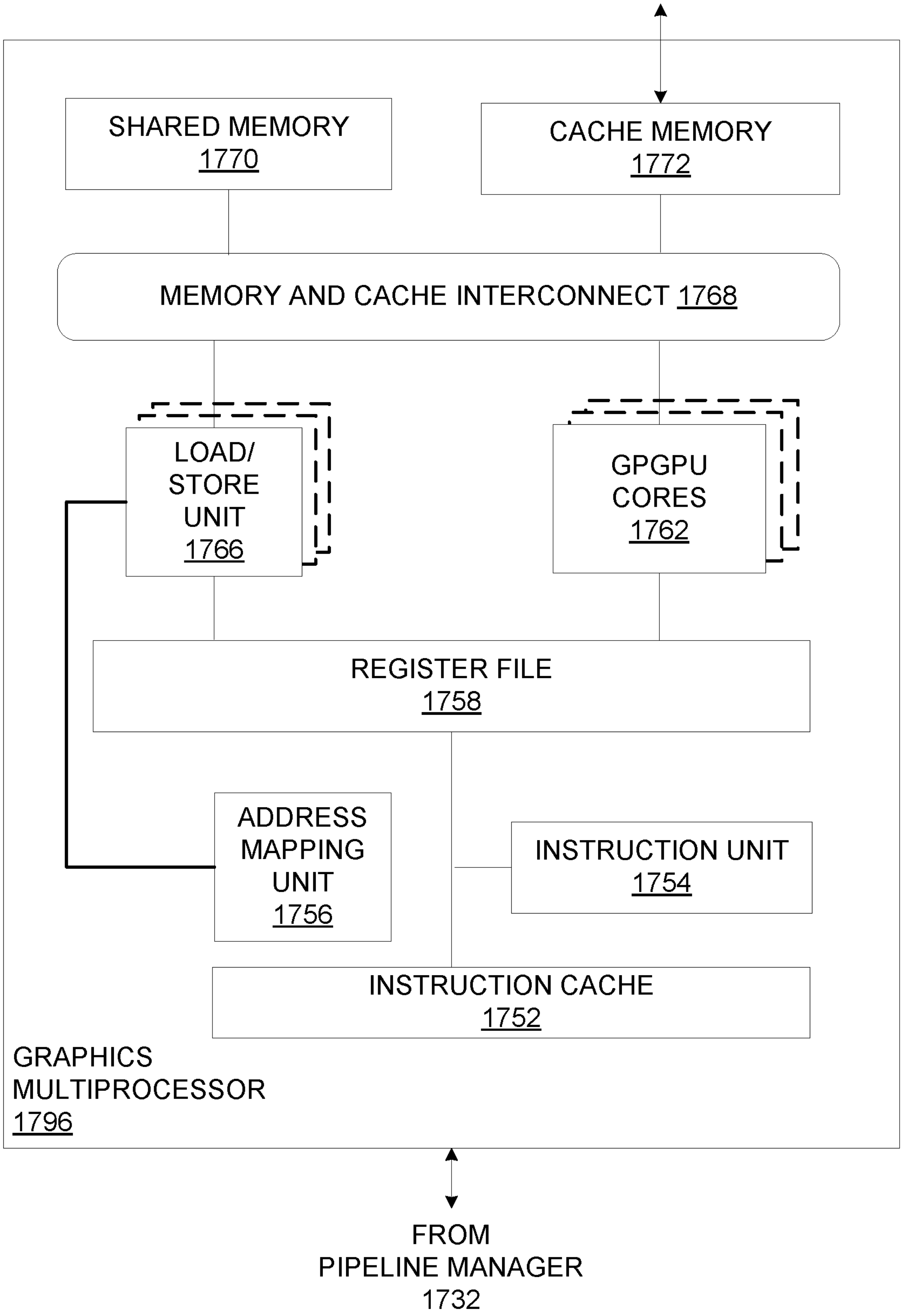
FIG. 17C illustrates a graphics multiprocessor, in accordance with at least one embodiment.

FIG. 17C illustrates a graphics multiprocessor 1796, in accordance with at least one embodiment. In at least one embodiment, graphics multiprocessor 1796 is graphics multiprocessor 1734 of FIG. 17B. In at least one embodiment, graphics multiprocessor 1796 couples with pipeline manager 1732 of processing cluster 1794. In at least one embodiment, graphics multiprocessor 1796 has an execution pipeline including but not limited to an instruction cache 1752, an instruction unit 1754, an address mapping unit 1756, a register file 1758, one or more GPGPU cores 1762, and one or more LSUs 1766. GPGPU cores 1762 and LSUs 1766 are coupled with cache memory 1772 and shared memory 1770 via a memory and cache interconnect 1768.

In at least one embodiment, graphics multiprocessor 1796 comprises logic to cause information to be stored in one or more memory locations based, at least in part, on one or more graphs, and/or perform other operations to provide functionality described herein in conjunction with FIGS. 1-5.

In at least one embodiment, instruction cache 1752 receives a stream of instructions to execute from pipeline manager 1732. In at least one embodiment, instructions are cached in instruction cache 1752 and dispatched for execution by instruction unit 1754. In at least one embodiment, instruction unit 1754 can dispatch instructions as thread groups (e.g., warps), with each thread of a thread group assigned to a different execution unit within GPGPU core 1762. In at least one embodiment, an instruction can access any of a local, shared, or global address space by specifying an address within a unified address space. In at least one embodiment, address mapping unit 1756 can be used to translate addresses in a unified address space into a distinct memory address that can be accessed by LSUs 1766.

In at least one embodiment, register file 1758 provides a set of registers for functional units of graphics multiprocessor 1796. In at least one embodiment, register file 1758 provides temporary storage for operands connected to data paths of functional units (e.g., GPGPU cores 1762, LSUs 1766) of graphics multiprocessor 1796. In at least one embodiment, register file 1758 is divided between each of functional units such that each functional unit is allocated a dedicated portion of register file 1758. In at least one embodiment, register file 1758 is divided between different thread groups being executed by graphics multiprocessor 1796.

In at least one embodiment, GPGPU cores 1762 can each include FPUs and/or integer ALUs that are used to execute instructions of graphics multiprocessor 1796. GPGPU cores 1762 can be similar in architecture or can differ in architecture. In at least one embodiment, a first portion of GPGPU cores 1762 include a single precision FPU and an integer ALU while a second portion of GPGPU cores 1762 include a double precision FPU. In at least one embodiment, FPUs can implement IEEE 754-2008 standard for floating point arithmetic or enable variable precision floating point arithmetic. In at least one embodiment, graphics multiprocessor 1796 can additionally include one or more fixed function or special function units to perform specific functions such as copy rectangle or pixel blending operations. In at least one embodiment one or more of GPGPU cores 1762 can also include fixed or special function logic.

In at least one embodiment, GPGPU cores 1762 include SIMD logic capable of performing a single instruction on multiple sets of data. In at least one embodiment GPGPU cores 1762 can physically execute SIMD4, SIMD8, and SIMD16 instructions and logically execute SIMD1, SIMD2, and SIMD32 instructions. In at least one embodiment, SIMD instructions for GPGPU cores 1762 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 1768 is an interconnect network that connects each functional unit of graphics multiprocessor 1796 to register file 1758 and to shared memory 1770. In at least one embodiment, memory and cache interconnect 1768 is a crossbar interconnect that allows LSU 1766 to implement load and store operations between shared memory 1770 and register file 1758. In at least one embodiment, register file 1758 can operate at a same frequency as GPGPU cores 1762, thus data transfer between GPGPU cores 1762 and register file 1758 is very low latency. In at least one embodiment, shared memory 1770 can be used to enable communication between threads that execute on functional units within graphics multiprocessor 1796. In at least one embodiment, cache memory 1772 can be used as a data cache for example, to cache texture data communicated between functional units and texture unit 1736. In at least one embodiment, shared memory 1770 can also be used as a program managed cached. In at least one embodiment, threads executing on GPGPU cores 1762 can programmatically store data within shared memory in addition to automatically cached data that is stored within cache memory 1772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 18:
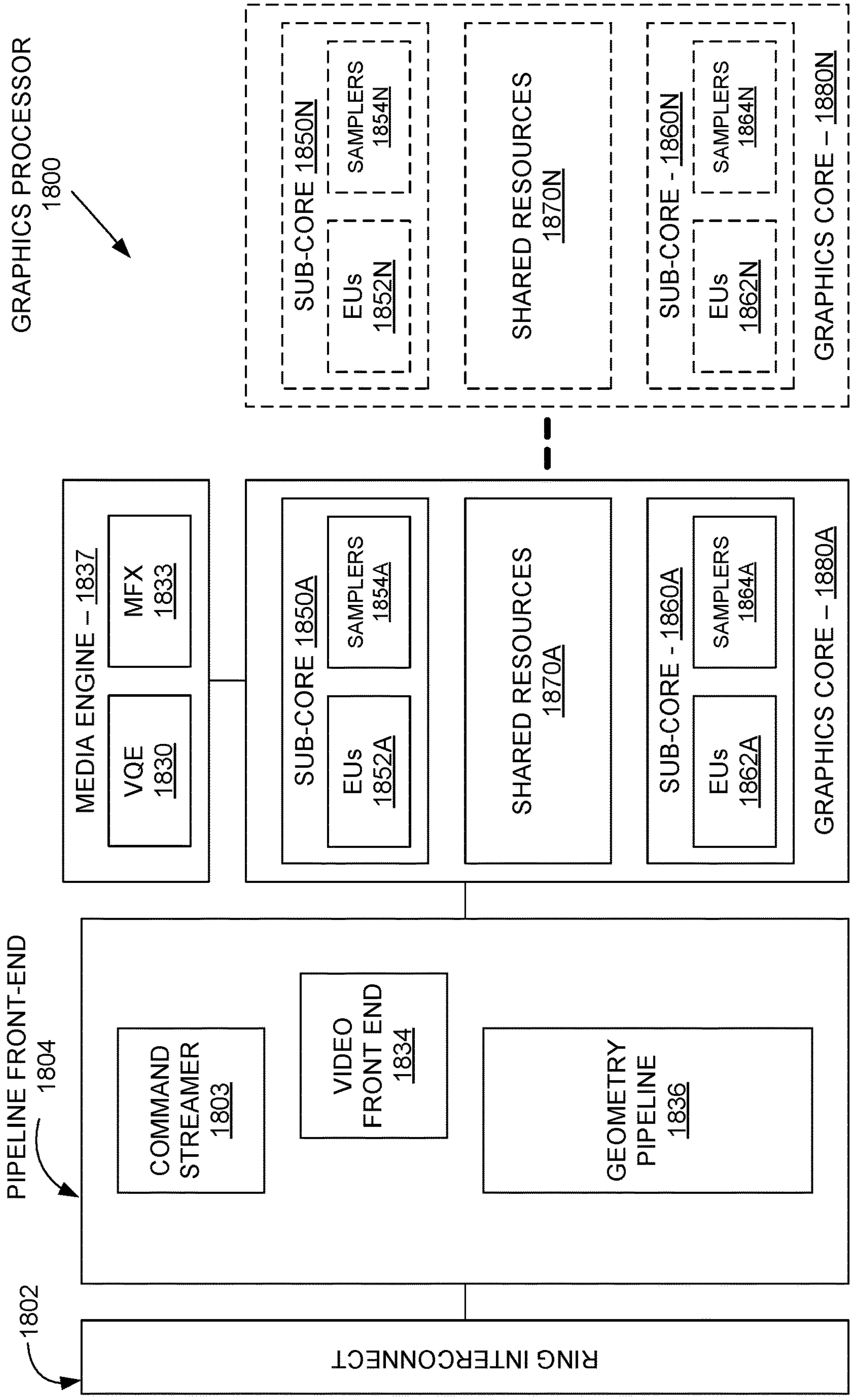
FIG. 18 illustrates a graphics processor, in accordance with at least one embodiment.

FIG. 18 illustrates a graphics processor 1800, in accordance with at least one embodiment. In at least one embodiment, graphics processor 1800 includes a ring interconnect 1802, a pipeline front-end 1804, a media engine 1837, and graphics cores 1880A-1880N. In at least one embodiment, ring interconnect 1802 couples graphics processor 1800 to other processing units, including other graphics processors or one or more general-purpose processor cores. In at least one embodiment, graphics processor 1800 is one of many processors integrated within a multi-core processing system.

In at least one embodiment, graphics processor 1800 comprises logic to cause information to be stored in one or more memory locations based, at least in part, on one or more graphs, and/or perform other operations to provide functionality described herein in conjunction with FIGS. 1-5.

In at least one embodiment, graphics processor 1800 receives batches of commands via ring interconnect 1802. In at least one embodiment, incoming commands are interpreted by a command streamer 1803 in pipeline front-end 1804. In at least one embodiment, graphics processor 1800 includes scalable execution logic to perform 3D geometry processing and media processing via graphics core(s) 1880A-1880N. In at least one embodiment, for 3D geometry processing commands, command streamer 1803 supplies commands to geometry pipeline 1836. In at least one embodiment, for at least some media processing commands, command streamer 1803 supplies commands to a video front end 1834, which couples with a media engine 1837. In at least one embodiment, media engine 1837 includes a Video Quality Engine ("VQE") 1830 for video and image post-processing and a multi-format encode/decode ("MFX") engine 1833 to provide hardware-accelerated media data encode and decode. In at least one embodiment, geometry pipeline 1836 and media engine 1837 each generate execution threads for thread execution resources provided by at least one graphics core 1880A.

In at least one embodiment, graphics processor 1800 includes scalable thread execution resources featuring modular graphics cores 1880A-1880N (sometimes referred to as core slices), each having multiple sub-cores 1850A-550N, 1860A-1860N (sometimes referred to as core sub-slices). In at least one embodiment, graphics processor 1800 can have any number of graphics cores 1880A through 1880N. In at least one embodiment, graphics processor 1800 includes a graphics core 1880A having at least a first sub-core 1850A and a second sub-core 1860A. In at least one embodiment, graphics processor 1800 is a low power processor with a single sub-core (e.g., sub-core 1850A). In at least one embodiment, graphics processor 1800 includes multiple graphics cores 1880A-1880N, each including a set of first sub-cores 1850A-1850N and a set of second sub-cores 1860A-1860N. In at least one embodiment, each sub-core in first sub-cores 1850A-1850N includes at least a first set of execution units ("EUs") 1852A-1852N and media/texture samplers 1854A-1854N. In at least one embodiment, each sub-core in second sub-cores 1860A-1860N includes at least a second set of execution units 1862A-1862N and samplers 1864A-1864N. In at least one embodiment, each sub-core 1850A-1850N, 1860A-1860N shares a set of shared resources 1870A-1870N. In at least one embodiment, shared resources 1870 include shared cache memory and pixel operation logic.

Figure 19:
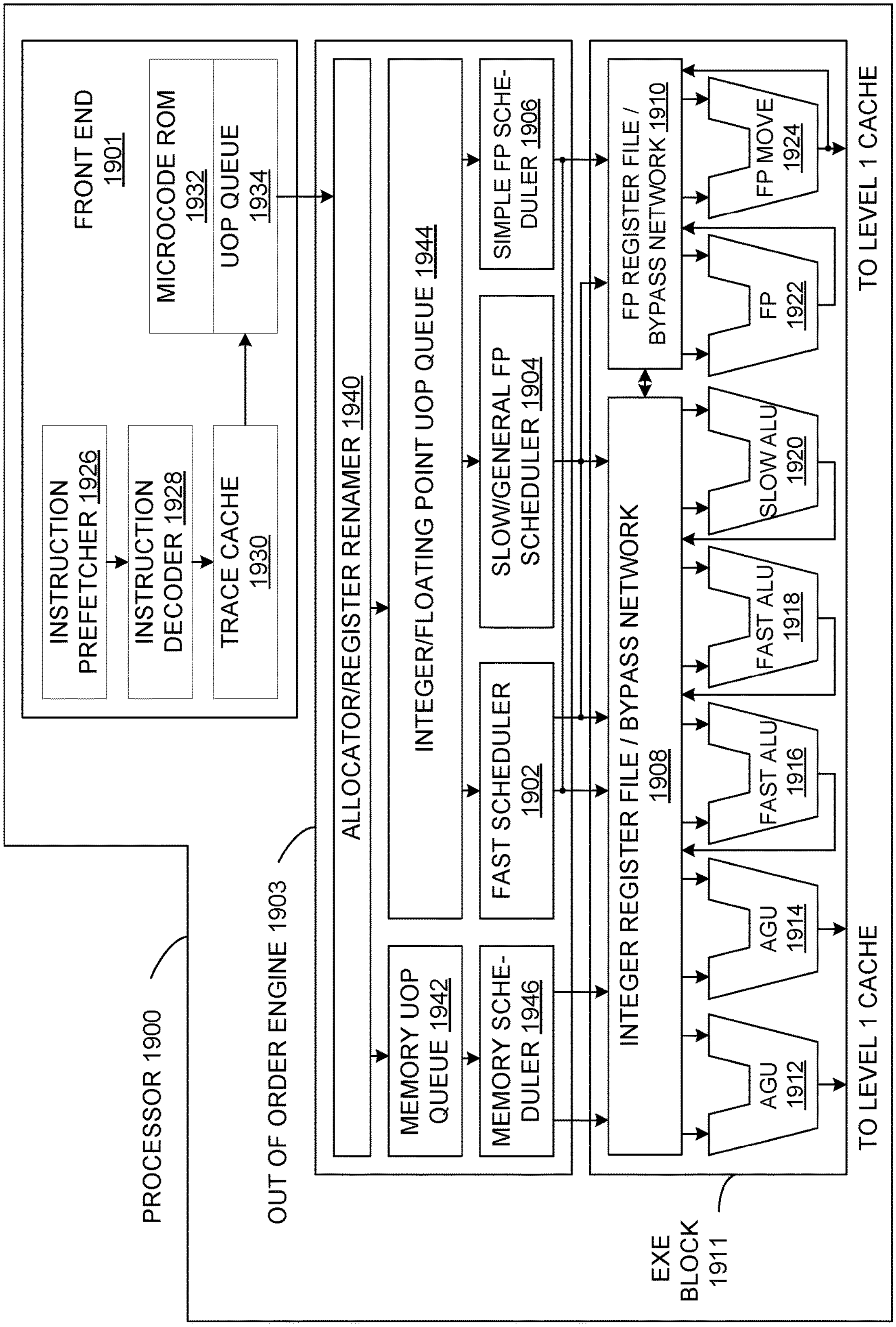
FIG. 19 illustrates a processor, in accordance with at least one embodiment.

FIG. 19 illustrates a processor 1900, in accordance with at least one embodiment. In at least one embodiment, processor 1900 may include, without limitation, logic circuits to perform instructions. In at least one embodiment, processor 1900 may perform instructions, including x86 instructions, ARM instructions, specialized instructions for ASICs, etc. In at least one embodiment, processor 1910 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 1910 may perform instructions to accelerate CUDA programs.

In at least one embodiment, processor 1900 comprises logic to cause information to be stored in one or more memory locations based, at least in part, on one or more graphs, and/or perform other operations to provide functionality described herein in conjunction with FIGS. 1-5.

In at least one embodiment, processor 1900 includes an in-order front end ("front end") 1901 to fetch instructions to be executed and prepare instructions to be used later in processor pipeline. In at least one embodiment, front end 1901 may include several units. In at least one embodiment, an instruction prefetcher 1926 fetches instructions from memory and feeds instructions to an instruction decoder 1928 which in turn decodes or interprets instructions. For example, in at least one embodiment, instruction decoder 1928 decodes a received instruction into one or more operations called "micro-instructions" or "micro-operations" (also called "micro ops" or "uops") for execution. In at least one embodiment, instruction decoder 1928 parses instruction into an opcode and corresponding data and control fields that may be used by micro-architecture to perform operations. In at least one embodiment, a trace cache 1930 may assemble decoded uops into program ordered sequences or traces in a uop queue 1934 for execution. In at least one embodiment, when trace cache 1930 encounters a complex instruction, a microcode ROM 1932 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 1928 may access microcode ROM 1932 to perform instruction. In at least one embodiment, an instruction may be decoded into a small number of micro-ops for processing at instruction decoder 1928. In at least one embodiment, an instruction may be stored within microcode ROM 1932 should a number of micro-ops be needed to accomplish operation. In at least one embodiment, trace cache 1930 refers to an entry point programmable logic array ("PLA") to determine a correct micro-instruction pointer for reading microcode sequences to complete one or more instructions from microcode ROM 1932. In at least one embodiment, after microcode ROM 1932 finishes sequencing micro-ops for an instruction, front end 1901 of machine may resume fetching micro-ops from trace cache 1930.

In at least one embodiment, out-of-order execution engine ("out of order engine") 1903 may prepare instructions for execution. In at least one embodiment, out-of-order execution logic has a number of buffers to smooth out and re-order the flow of instructions to optimize performance as they go down a pipeline and get scheduled for execution. Out-of-order execution engine 1903 includes, without limitation, an allocator/register renamer 1940, a memory uop queue 1942, an integer/floating point uop queue 1944, a memory scheduler 1946, a fast scheduler 1902, a slow/general floating point scheduler ("slow/general FP scheduler") 1904, and a simple floating point scheduler ("simple FP scheduler") 1906. In at least one embodiment, fast schedule 1902, slow/general floating point scheduler 1904, and simple floating point scheduler 1906 are also collectively referred to herein as "uop schedulers 1902, 1904, 1906." Allocator/register renamer 1940 allocates machine buffers and resources that each uop needs in order to execute. In at least one embodiment, allocator/register renamer 1940 renames logic registers onto entries in a register file. In at least one embodiment, allocator/register renamer 1940 also allocates an entry for each uop in one of two uop queues, memory uop queue 1942 for memory operations and integer/floating point uop queue 1944 for non-memory operations, in front of memory scheduler 1946 and uop schedulers 1902, 1904, 1906. In at least one embodiment, uop schedulers 1902, 1904, 1906, determine when a uop is ready to execute based on readiness of their dependent input register operand sources and availability of execution resources uops need to complete their operation. In at least one embodiment, fast scheduler 1902 of at least one embodiment may schedule on each half of main clock cycle while slow/general floating point scheduler 1904 and simple floating point scheduler 1906 may schedule once per main processor clock cycle. In at least one embodiment, uop schedulers 1902, 1904, 1906 arbitrate for dispatch ports to schedule uops for execution.

In at least one embodiment, execution block 1911 includes, without limitation, an integer register file/bypass network 1908, a floating point register file/bypass network ("FP register file/bypass network") 1910, address generation units ("AGUs") 1912 and 1914, fast ALUs 1916 and 1918, a slow ALU 1920, a floating point ALU ("FP") 1922, and a floating point move unit ("FP move") 1924. In at least one embodiment, integer register file/bypass network 1908 and floating point register file/bypass network 1910 are also referred to herein as "register files 1908, 1910." In at least one embodiment, AGUSs 1912 and 1914, fast ALUs 1916 and 1918, slow ALU 1920, floating point ALU 1922, and floating point move unit 1924 are also referred to herein as "execution units 1912, 1914, 1916, 1918, 1920, 1922, and 1924." In at least one embodiment, an execution block may include, without limitation, any number (including zero) and type of register files, bypass networks, address generation units, and execution units, in any combination.

In at least one embodiment, register files 1908, 1910 may be arranged between uop schedulers 1902, 1904, 1906, and execution units 1912, 1914, 1916, 1918, 1920, 1922, and 1924. In at least one embodiment, integer register file/bypass network 1908 performs integer operations. In at least one embodiment, floating point register file/bypass network 1910 performs floating point operations. In at least one embodiment, each of register files 1908, 1910 may include, without limitation, a bypass network that may bypass or forward just completed results that have not yet been written into register file to new dependent uops. In at least one embodiment, register files 1908, 1910 may communicate data with each other. In at least one embodiment, integer register file/bypass network 1908 may include, without limitation, two separate register files, one register file for low-order thirty-two bits of data and a second register file for high order thirty-two bits of data. In at least one embodiment, floating point register file/bypass network 1910 may include, without limitation, 128-bit wide entries because floating point instructions typically have operands from 64 to 128 bits in width.

In at least one embodiment, execution units 1912, 1914, 1916, 1918, 1920, 1922, 1924 may execute instructions. In at least one embodiment, register files 1908, 1910 store integer and floating point data operand values that micro-instructions need to execute. In at least one embodiment, processor 1900 may include, without limitation, any number and combination of execution units 1912, 1914, 1916, 1918, 1920, 1922, 1924. In at least one embodiment, floating point ALU 1922 and floating point move unit 1924 may execute floating point, MMX, SIMD, AVX and SSE, or other operations. In at least one embodiment, floating point ALU 1922 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 1916, 1918. In at least one embodiment, fast ALUS 1916, 1918 may execute fast operations with an effective latency of half a clock cycle. In at least one embodiment, most complex integer operations go to slow ALU 1920 as slow ALU 1920 may include, without limitation, integer execution hardware for long-latency type of operations, such as a multiplier, shifts, flag logic, and branch processing. In at least one embodiment, memory load/store operations may be executed by AGUs 1912, 1914. In at least one embodiment, fast ALU 1916, fast ALU 1918, and slow ALU 1920 may perform integer operations on 64-bit data operands. In at least one embodiment, fast ALU 1916, fast ALU 1918, and slow ALU 1920 may be implemented to support a variety of data bit sizes including sixteen, thirty-two, 128, 256, etc. In at least one embodiment, floating point ALU 1922 and floating point move unit 1924 may be implemented to support a range of operands having bits of various widths. In at least one embodiment, floating point ALU 1922 and floating point move unit 1924 may operate on 128-bit wide packed data operands in conjunction with SIMD and multimedia instructions.

In at least one embodiment, uop schedulers 1902, 1904, 1906 dispatch dependent operations before parent load has finished executing. In at least one embodiment, as uops may be speculatively scheduled and executed in processor 1900, processor 1900 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 20:
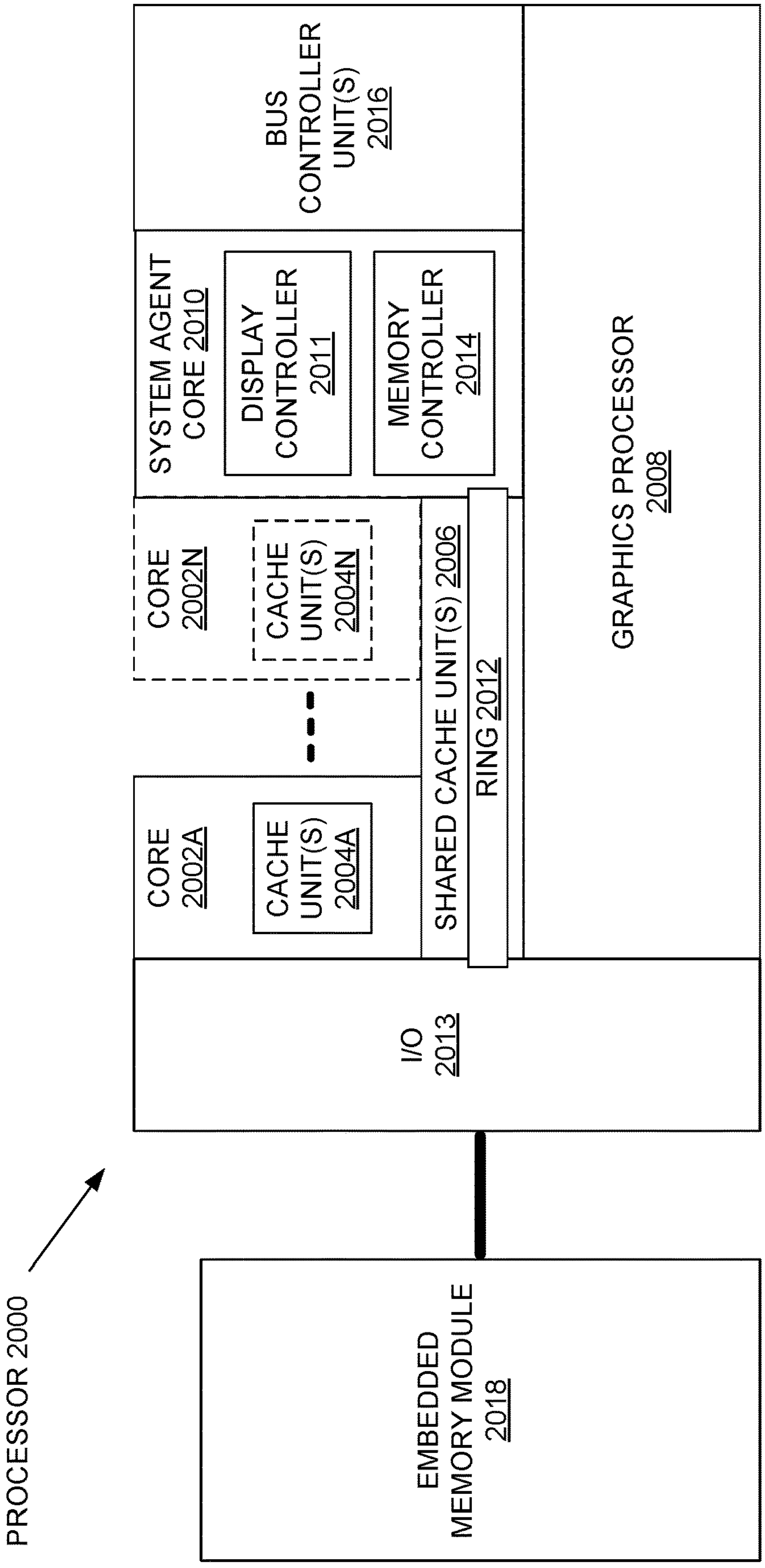
FIG. 20 illustrates a processor, in accordance with at least one embodiment.

FIG. 20 illustrates a processor 2000, in accordance with at least one embodiment. In at least one embodiment, processor 2000 includes, without limitation, one or more processor cores ("cores") 2002A-2002N, an integrated memory controller 2014, and an integrated graphics processor 2008. In at least one embodiment, processor 2000 can include additional cores up to and including additional processor core 2002N represented by dashed lined boxes. In at least one embodiment, each of processor cores 2002A-2002N includes one or more internal cache units 2004A-2004N. In at least one embodiment, each processor core also has access to one or more shared cached units 2006.

In at least one embodiment, processor 2000 comprises logic to cause information to be stored in one or more memory locations based, at least in part, on one or more graphs, and/or perform other operations to provide functionality described herein in conjunction with FIGS. 1-5.

In at least one embodiment, internal cache units 2004A-2004N and shared cache units 2006 represent a cache memory hierarchy within processor 2000. In at least one embodiment, cache memory units 2004A-2004N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2006 and 2004A-2004N.

In at least one embodiment, processor 2000 may also include a set of one or more bus controller units 2016 and a system agent core 2010. In at least one embodiment, one or more bus controller units 2016 manage a set of peripheral buses, such as one or more PCI or PCI express buses. In at least one embodiment, system agent core 2010 provides management functionality for various processor components. In at least one embodiment, system agent core 2010 includes one or more integrated memory controllers 2014 to manage access to various external memory devices (not shown).

In at least one embodiment, one or more of processor cores 2002A-2002N include support for simultaneous multi-threading. In at least one embodiment, system agent core 2010 includes components for coordinating and operating processor cores 2002A-2002N during multi-threaded processing. In at least one embodiment, system agent core 2010 may additionally include a power control unit ("PCU"), which includes logic and components to regulate one or more power states of processor cores 2002A-2002N and graphics processor 2008.

In at least one embodiment, processor 2000 additionally includes graphics processor 2008 to execute graphics processing operations. In at least one embodiment, graphics processor 2008 couples with shared cache units 2006, and system agent core 2010, including one or more integrated memory controllers 2014. In at least one embodiment, system agent core 2010 also includes a display controller 2011 to drive graphics processor output to one or more coupled displays. In at least one embodiment, display controller 2011 may also be a separate module coupled with graphics processor 2008 via at least one interconnect, or may be integrated within graphics processor 2008.

In at least one embodiment, a ring based interconnect unit 2012 is used to couple internal components of processor 2000. In at least one embodiment, an alternative interconnect unit may be used, such as a point-to-point interconnect, a switched interconnect, or other techniques. In at least one embodiment, graphics processor 2008 couples with ring interconnect 2012 via an I/O link 2013.

In at least one embodiment, I/O link 2013 represents at least one of multiple varieties of I/O interconnects, including an on package I/O interconnect which facilitates communication between various processor components and a high-performance embedded memory module 2018, such as an eDRAM module. In at least one embodiment, each of processor cores 2002A-2002N and graphics processor 2008 use embedded memory modules 2018 as a shared LLC.

In at least one embodiment, processor cores 2002A-2002N are homogeneous cores executing a common instruction set architecture. In at least one embodiment, processor cores 2002A-2002N are heterogeneous in terms of ISA, where one or more of processor cores 2002A-2002N execute a common instruction set, while one or more other cores of processor cores 2002A-20-02N executes a subset of a common instruction set or a different instruction set. In at least one embodiment, processor cores 2002A-2002N are heterogeneous in terms of microarchitecture, where one or more cores having a relatively higher power consumption couple with one or more cores having a lower power consumption. In at least one embodiment, processor 2000 can be implemented on one or more chips or as an SoC integrated circuit.

Figure 21:
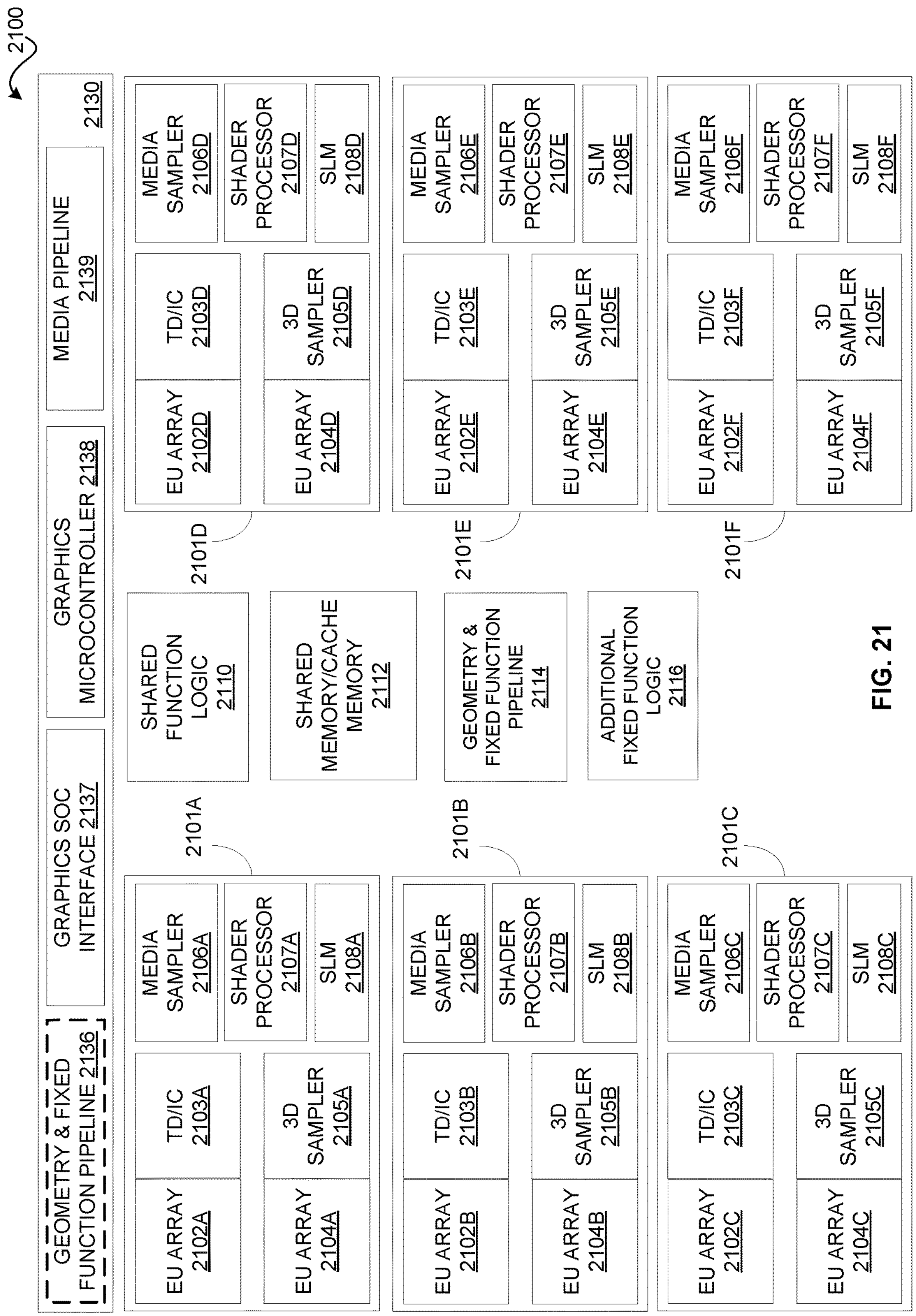
FIG. 21 illustrates a graphics processor core, in accordance with at least one embodiment.

FIG. 21 illustrates a graphics processor core 2100, in accordance with at least one embodiment described. In at least one embodiment, graphics processor core 2100 is included within a graphics core array. In at least one embodiment, graphics processor core 2100, sometimes referred to as a core slice, can be one or multiple graphics cores within a modular graphics processor. In at least one embodiment, graphics processor core 2100 is exemplary of one graphics core slice, and a graphics processor as described herein may include multiple graphics core slices based on target power and performance envelopes. In at least one embodiment, each graphics core 2100 can include a fixed function block 2130 coupled with multiple sub-cores 2101A-2101F, also referred to as sub-slices, that include modular blocks of general-purpose and fixed function logic.

In at least one embodiment, graphics processor core 2100 comprises logic to cause information to be stored in one or more memory locations based, at least in part, on one or more graphs, and/or perform other operations to provide functionality described herein in conjunction with FIGS. 1-5.

In at least one embodiment, fixed function block 2130 includes a geometry/fixed function pipeline 2136 that can be shared by all sub-cores in graphics processor 2100, for example, in lower performance and/or lower power graphics processor implementations. In at least one embodiment, geometry/fixed function pipeline 2136 includes a 3D fixed function pipeline, a video front-end unit, a thread spawner and thread dispatcher, and a unified return buffer manager, which manages unified return buffers.

In at least one embodiment, fixed function block 2130 also includes a graphics SoC interface 2137, a graphics microcontroller 2138, and a media pipeline 2139. Graphics SoC interface 2137 provides an interface between graphics core 2100 and other processor cores within an SoC integrated circuit. In at least one embodiment, graphics microcontroller 2138 is a programmable sub-processor that is configurable to manage various functions of graphics processor 2100, including thread dispatch, scheduling, and pre-emption. In at least one embodiment, media pipeline 2139 includes logic to facilitate decoding, encoding, preprocessing, and/or post-processing of multimedia data, including image and video data. In at least one embodiment, media pipeline 2139 implements media operations via requests to compute or sampling logic within sub-cores 2101-2101F.

In at least one embodiment, SoC interface 2137 enables graphics core 2100 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 2137 can also enable communication with fixed function devices within an SoC, such as camera imaging pipelines, and enables use of and/or implements global memory atomics that may be shared between graphics core 2100 and CPUs within an SoC. In at least one embodiment, SoC interface 2137 can also implement power management controls for graphics core 2100 and enable an interface between a clock domain of graphic core 2100 and other clock domains within an SoC. In at least one embodiment, SoC interface 2137 enables receipt of command buffers from a command streamer and global thread dispatcher that are configured to provide commands and instructions to each of one or more graphics cores within a graphics processor. In at least one embodiment, commands and instructions can be dispatched to media pipeline 2139, when media operations are to be performed, or a geometry and fixed function pipeline (e.g., geometry and fixed function pipeline 2136, geometry and fixed function pipeline 2114) when graphics processing operations are to be performed.

In at least one embodiment, graphics microcontroller 2138 can be configured to perform various scheduling and management tasks for graphics core 2100. In at least one embodiment, graphics microcontroller 2138 can perform graphics and/or compute workload scheduling on various graphics parallel engines within execution unit (EU) arrays 2102A-2102F, 2104A-2104F within sub-cores 2101A-2101F. In at least one embodiment, host software executing on a CPU core of an SoC including graphics core 2100 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 2138 can also facilitate low-power or idle states for graphics core 2100, providing graphics core 2100 with an ability to save and restore registers within graphics core 2100 across low-power state transitions independently from an operating system and/or graphics driver software on a system.

In at least one embodiment, graphics core 2100 may have greater than or fewer than illustrated sub-cores 2101A-2101F, up to N modular sub-cores. For each set of N sub-cores, in at least one embodiment, graphics core 2100 can also include shared function logic 2110, shared and/or cache memory 2112, a geometry/fixed function pipeline 2114, as well as additional fixed function logic 2116 to accelerate various graphics and compute processing operations. In at least one embodiment, shared function logic 2110 can include logic units (e.g., sampler, math, and/or inter-thread communication logic) that can be shared by each N sub-cores within graphics core 2100. Shared and/or cache memory 2112 can be an LLC for N sub-cores 2101A-2101F within graphics core 2100 and can also serve as shared memory that is accessible by multiple sub-cores. In at least one embodiment, geometry/fixed function pipeline 2114 can be included instead of geometry/fixed function pipeline 2136 within fixed function block 2130 and can include same or similar logic units.

In at least one embodiment, graphics core 2100 includes additional fixed function logic 2116 that can include various fixed function acceleration logic for use by graphics core 2100. In at least one embodiment, additional fixed function logic 2116 includes an additional geometry pipeline for use in position only shading. In position-only shading, at least two geometry pipelines exist, whereas in a full geometry pipeline within geometry/fixed function pipeline 2116, 2136, and a cull pipeline, which is an additional geometry pipeline which may be included within additional fixed function logic 2116. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2116 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2116 can also include general purpose processing acceleration logic, such as fixed function matrix multiplication logic, for accelerating CUDA programs.

In at least one embodiment, each graphics sub-core 2101A-2101F includes a set of execution resources that may be used to perform graphics, media, and compute operations in response to requests by graphics pipeline, media pipeline, or shader programs. In at least one embodiment, graphics sub-cores 2101A-2101F include multiple EU arrays 2102A-2102F, 2104A-2104F, thread dispatch and inter-thread communication ("TD/IC") logic 2103A-2103F, a 3D (e.g., texture) sampler 2105A-2105F, a media sampler 2106A-2106F, a shader processor 2107A-2107F, and shared local memory ("SLM") 2108A-2108F. EU arrays 2102A-2102F, 2104A-2104F each include multiple execution units, which are GPGPUs capable of performing floating-point and integer/fixed-point logic operations in service of a graphics, media, or compute operation, including graphics, media, or compute shader programs. In at least one embodiment, TD/IC logic 2103A-2103F performs local thread dispatch and thread control operations for execution units within a sub-core and facilitate communication between threads executing on execution units of a sub-core. In at least one embodiment, 3D sampler 2105A-2105F can read texture or other 3D graphics related data into memory. In at least one embodiment, 3D sampler can read texture data differently based on a configured sample state and texture format associated with a given texture. In at least one embodiment, media sampler 2106A-2106F can perform similar read operations based on a type and format associated with media data. In at least one embodiment, each graphics sub-core 2101A-2101F can alternately include a unified 3D and media sampler. In at least one embodiment, threads executing on execution units within each of sub-cores 2101A-2101F can make use of shared local memory 2108A-2108F within each sub-core, to enable threads executing within a thread group to execute using a common pool of on-chip memory.

Figure 22:
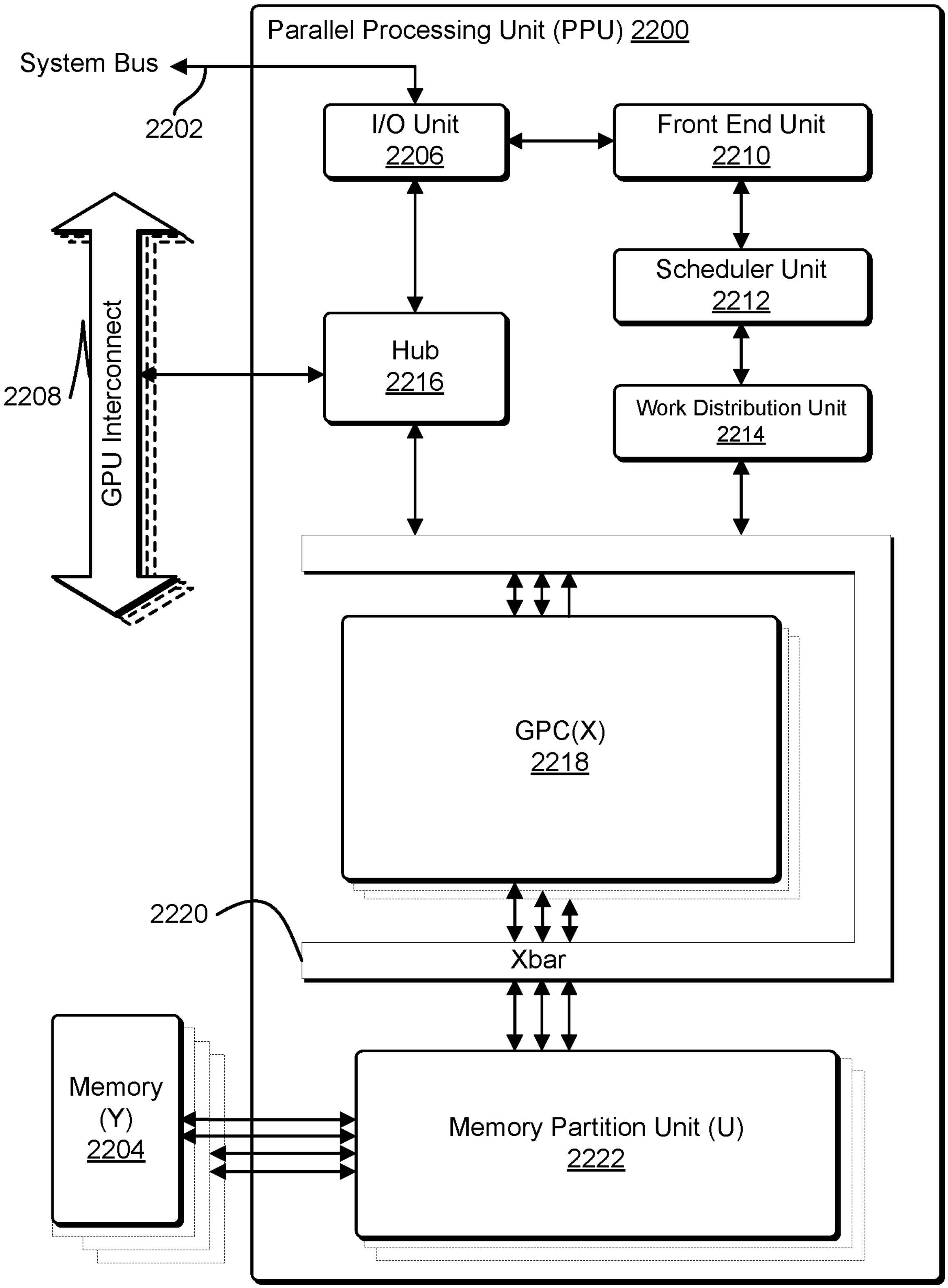
FIG. 22 illustrates a PPU, in accordance with at least one embodiment.

FIG. 22 illustrates a parallel processing unit ("PPU") 2200, in accordance with at least one embodiment. In at least one embodiment, PPU 2200 is configured with machine-readable code that, if executed by PPU 2200, causes PPU 2200 to perform some or all of processes and techniques described herein. In at least one embodiment, PPU 2200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2200. In at least one embodiment, PPU 2200 is a GPU configured to implement a graphics rendering pipeline for processing three-dimensional ("3D") graphics data in order to generate two-dimensional ("2D") image data for display on a display device such as an LCD device. In at least one embodiment, PPU 2200 is utilized to perform computations such as linear algebra operations and machine-learning operations. FIG. 22 illustrates an example parallel processor for illustrative purposes only and should be construed as a non-limiting example of a processor architecture that may be implemented in at least one embodiment.

In at least one embodiment, PPU 2200 comprises logic to cause information to be stored in one or more memory locations based, at least in part, on one or more graphs, and/or perform other operations to provide functionality described herein in conjunction with FIGS. 1-5.

In at least one embodiment, one or more PPUs 2200 are configured to accelerate High Performance Computing ("HPC"), data center, and machine learning applications. In at least one embodiment, one or more PPUs 2200 are configured to accelerate CUDA programs. In at least one embodiment, PPU 2200 includes, without limitation, an I/O unit 2206, a front-end unit 2210, a scheduler unit 2212, a work distribution unit 2214, a hub 2216, a crossbar ("Xbar") 2220, one or more general processing clusters ("GPCs") 2218, and one or more partition units ("memory partition units") 2222. In at least one embodiment, PPU 2200 is connected to a host processor or other PPUs 2200 via one or more high-speed GPU interconnects ("GPU interconnects") 2208. In at least one embodiment, PPU 2200 is connected to a host processor or other peripheral devices via a system bus or interconnect 2202. In at least one embodiment, PPU 2200 is connected to a local memory comprising one or more memory devices ("memory") 2204. In at least one embodiment, memory devices 2204 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2208 may refer to a wire-based multi-lane communications link that is used by systems to scale and include one or more PPUs 2200 combined with one or more CPUs, supports cache coherence between PPUs 2200 and CPUs, and CPU mastering. In at least one embodiment, data and/or commands are transmitted by high-speed GPU interconnect 2208 through hub 2216 to/from other units of PPU 2200 such as one or more copy engines, video encoders, video decoders, power management units, and other components which may not be explicitly illustrated in FIG. 22.

In at least one embodiment, I/O unit 2206 is configured to transmit and receive communications (e.g., commands, data) from a host processor (not illustrated in FIG. 22) over system bus 2202. In at least one embodiment, I/O unit 2206 communicates with host processor directly via system bus 2202 or through one or more intermediate devices such as a memory bridge. In at least one embodiment, I/O unit 2206 may communicate with one or more other processors, such as one or more of PPUs 2200 via system bus 2202. In at least one embodiment, I/O unit 2206 implements a PCIe interface for communications over a PCIe bus. In at least one embodiment, I/O unit 2206 implements interfaces for communicating with external devices.

In at least one embodiment, I/O unit 2206 decodes packets received via system bus 2202. In at least one embodiment, at least some packets represent commands configured to cause PPU 2200 to perform various operations. In at least one embodiment, I/O unit 2206 transmits decoded commands to various other units of PPU 2200 as specified by commands. In at least one embodiment, commands are transmitted to front-end unit 2210 and/or transmitted to hub 2216 or other units of PPU 2200 such as one or more copy engines, a video encoder, a video decoder, a power management unit, etc. (not explicitly illustrated in FIG. 22). In at least one embodiment, I/O unit 2206 is configured to route communications between and among various logical units of PPU 2200.

In at least one embodiment, a program executed by host processor encodes a command stream in a buffer that provides workloads to PPU 2200 for processing. In at least one embodiment, a workload comprises instructions and data to be processed by those instructions. In at least one embodiment, buffer is a region in a memory that is accessible (e.g., read/write) by both a host processor and PPU 2200—a host interface unit may be configured to access buffer in a system memory connected to system bus 2202 via memory requests transmitted over system bus 2202 by I/O unit 2206. In at least one embodiment, a host processor writes a command stream to a buffer and then transmits a pointer to the start of the command stream to PPU 2200 such that front-end unit 2210 receives pointers to one or more command streams and manages one or more command streams, reading commands from command streams and forwarding commands to various units of PPU 2200.

In at least one embodiment, front-end unit 2210 is coupled to scheduler unit 2212 that configures various GPCs 2218 to process tasks defined by one or more command streams. In at least one embodiment, scheduler unit 2212 is configured to track state information related to various tasks managed by scheduler unit 2212 where state information may indicate which of GPCs 2218 a task is assigned to, whether task is active or inactive, a priority level associated with task, and so forth. In at least one embodiment, scheduler unit 2212 manages execution of a plurality of tasks on one or more of GPCs 2218.

In at least one embodiment, scheduler unit 2212 is coupled to work distribution unit 2214 that is configured to dispatch tasks for execution on GPCs 2218. In at least one embodiment, work distribution unit 2214 tracks a number of scheduled tasks received from scheduler unit 2212 and work distribution unit 2214 manages a pending task pool and an active task pool for each of GPCs 2218. In at least one embodiment, pending task pool comprises a number of slots (e.g., 32 slots) that contain tasks assigned to be processed by a particular GPC 2218; active task pool may comprise a number of slots (e.g., 4 slots) for tasks that are actively being processed by GPCs 2218 such that as one of GPCs 2218 completes execution of a task, that task is evicted from active task pool for GPC 2218 and one of other tasks from pending task pool is selected and scheduled for execution on GPC 2218. In at least one embodiment, if an active task is idle on GPC 2218, such as while waiting for a data dependency to be resolved, then the active task is evicted from GPC 2218 and returned to a pending task pool while another task in the pending task pool is selected and scheduled for execution on GPC 2218.

In at least one embodiment, work distribution unit 2214 communicates with one or more GPCs 2218 via XBar 2220. In at least one embodiment, XBar 2220 is an interconnect network that couples many units of PPU 2200 to other units of PPU 2200 and can be configured to couple work distribution unit 2214 to a particular GPC 2218. In at least one embodiment, one or more other units of PPU 2200 may also be connected to XBar 2220 via hub 2216.

In at least one embodiment, tasks are managed by scheduler unit 2212 and dispatched to one of GPCs 2218 by work distribution unit 2214. GPC 2218 is configured to process task and generate results. In at least one embodiment, results may be consumed by other tasks within GPC 2218, routed to a different GPC 2218 via XBar 2220, or stored in memory 2204. In at least one embodiment, results can be written to memory 2204 via partition units 2222, which implement a memory interface for reading and writing data to/from memory 2204. In at least one embodiment, results can be transmitted to another PPU 2204 or CPU via high-speed GPU interconnect 2208. In at least one embodiment, PPU 2200 includes, without limitation, a number U of partition units 2222 that is equal to number of separate and distinct memory devices 2204 coupled to PPU 2200.

In at least one embodiment, a host processor executes a driver kernel that implements an application programming interface ("API") that enables one or more applications executing on host processor to schedule operations for execution on PPU 2200. In at least one embodiment, multiple compute applications are simultaneously executed by PPU 2200 and PPU 2200 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2200 and the driver kernel outputs tasks to one or more streams being processed by PPU 2200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 23:
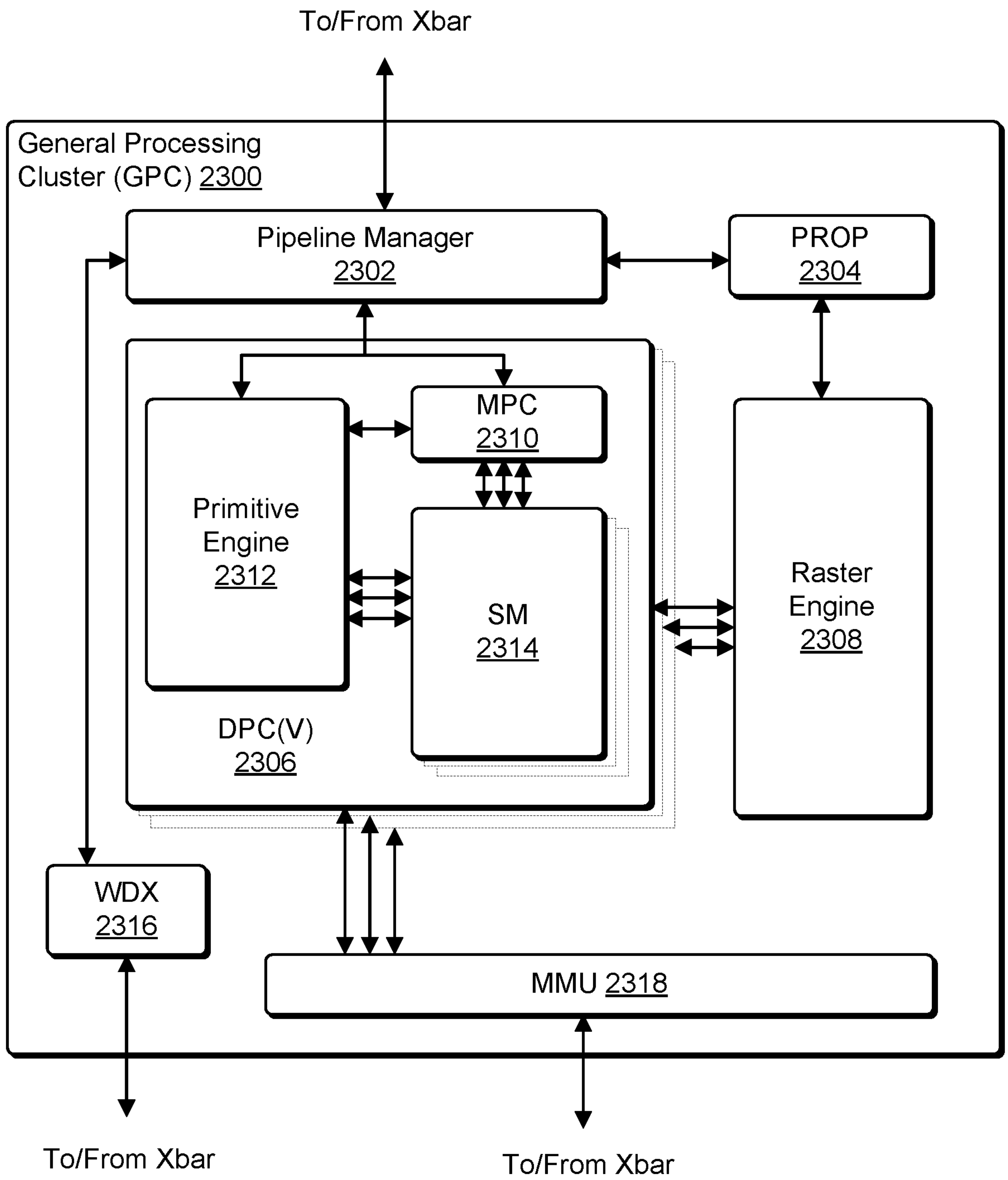
FIG. 23 illustrates a GPC, in accordance with at least one embodiment.

FIG. 23 illustrates a GPC 2300, in accordance with at least one embodiment. In at least one embodiment, GPC 2300 is GPC 2218 of FIG. 22. In at least one embodiment, each GPC 2300 includes, without limitation, a number of hardware units for processing tasks and each GPC 2300 includes, without limitation, a pipeline manager 2302, a pre-raster operations unit ("PROP") 2304, a raster engine 2308, a work distribution crossbar ("WDX") 2316, an MMU 2318, one or more Data Processing Clusters ("DPCs") 2306, and any suitable combination of parts.

In at least one embodiment, GPC 2300 comprises logic to cause information to be stored in one or more memory locations based, at least in part, on one or more graphs, and/or perform other operations to provide functionality described herein in conjunction with FIGS. 1-5.

In at least one embodiment, operation of GPC 2300 is controlled by pipeline manager 2302. In at least one embodiment, pipeline manager 2302 manages configuration of one or more DPCs 2306 for processing tasks allocated to GPC 2300. In at least one embodiment, pipeline manager 2302 configures at least one of one or more DPCs 2306 to implement at least a portion of a graphics rendering pipeline. In at least one embodiment, DPC 2306 is configured to execute a vertex shader program on a programmable streaming multiprocessor ("SM") 2314. In at least one embodiment, pipeline manager 2302 is configured to route packets received from a work distribution unit to appropriate logical units within GPC 2300 and, in at least one embodiment, some packets may be routed to fixed function hardware units in PROP 2304 and/or raster engine 2308 while other packets may be routed to DPCs 2306 for processing by a primitive engine 2312 or SM 2314. In at least one embodiment, pipeline manager 2302 configures at least one of DPCs 2306 to implement a computing pipeline. In at least one embodiment, pipeline manager 2302 configures at least one of DPCs 2306 to execute at least a portion of a CUDA program.

In at least one embodiment, PROP unit 2304 is configured to route data generated by raster engine 2308 and DPCs 2306 to a Raster Operations ("ROP") unit in a partition unit, such as memory partition unit 2222 described in more detail above in conjunction with FIG. 22. In at least one embodiment, PROP unit 2304 is configured to perform optimizations for color blending, organize pixel data, perform address translations, and more. In at least one embodiment, raster engine 2308 includes, without limitation, a number of fixed function hardware units configured to perform various raster operations and, in at least one embodiment, raster engine 2308 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 2308 comprises fragments to be processed by any suitable entity such as by a fragment shader implemented within DPC 2306.

In at least one embodiment, each DPC 2306 included in GPC 2300 comprise, without limitation, an M-Pipe Controller ("MPC") 2310; primitive engine 2312; one or more SMs 2314; and any suitable combination thereof. In at least one embodiment, MPC 2310 controls operation of DPC 2306, routing packets received from pipeline manager 2302 to appropriate units in DPC 2306. In at least one embodiment, packets associated with a vertex are routed to primitive engine 2312, which is configured to fetch vertex attributes associated with vertex from memory; in contrast, packets associated with a shader program may be transmitted to SM 2314.

In at least one embodiment, SM 2314 comprises, without limitation, a programmable streaming processor that is configured to process tasks represented by a number of threads. In at least one embodiment, SM 2314 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 2314 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 2314 is described in more detail in conjunction with FIG. 24.

In at least one embodiment, MMU 2318 provides an interface between GPC 2300 and a memory partition unit (e.g., partition unit 2222 of FIG. 22) and MMU 2318 provides translation of virtual addresses into physical addresses, memory protection, and arbitration of memory requests. In at least one embodiment, MMU 2318 provides one or more translation lookaside buffers (TLBs) for performing translation of virtual addresses into physical addresses in memory.

Figure 24:
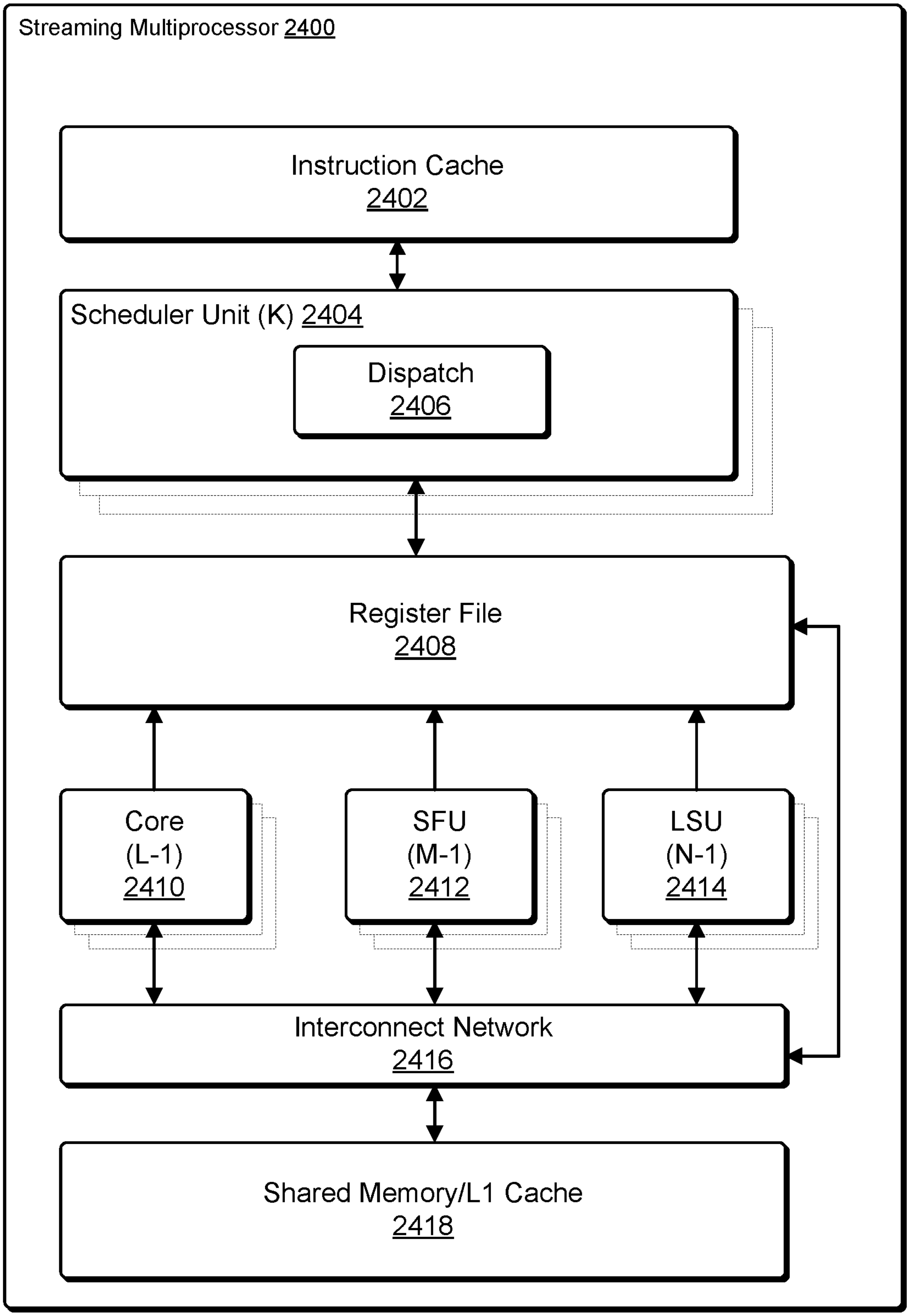
FIG. 24 illustrates a streaming multiprocessor, in accordance with at least one embodiment.

FIG. 24 illustrates a streaming multiprocessor ("SM") 2400, in accordance with at least one embodiment. In at least one embodiment, SM 2400 is SM 2314 of FIG. 23. In at least one embodiment, SM 2400 includes, without limitation, an instruction cache 2402; one or more scheduler units 2404; a register file 2408; one or more processing cores ("cores") 2410; one or more special function units ("SFUs") 2412; one or more LSUs 2414; an interconnect network 2416; a shared memory/L1 cache 2418; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 2400. In at least one embodiment, scheduler unit 2404 receives tasks from a work distribution unit and manages instruction scheduling for one or more thread blocks assigned to SM 2400. In at least one embodiment, scheduler unit 2404 schedules thread blocks for execution as warps of parallel threads, wherein each thread block is allocated at least one warp. In at least one embodiment, each warp executes threads. In at least one embodiment, scheduler unit 2404 manages a plurality of different thread blocks, allocating warps to different thread blocks and then dispatching instructions from a plurality of different cooperative groups to various functional units (e.g., processing cores 2410, SFUs 2412, and LSUs 2414) during each clock cycle.

In at least one embodiment, SM 2400 comprises logic to cause information to be stored in one or more memory locations based, at least in part, on one or more graphs, and/or perform other operations to provide functionality described herein in conjunction with FIGS. 1-5.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 2406 is configured to transmit instructions to one or more of functional units and scheduler unit 2404 includes, without limitation, two dispatch units 2406 that enable two different instructions from same warp to be dispatched during each clock cycle. In at least one embodiment, each scheduler unit 2404 includes a single dispatch unit 2406 or additional dispatch units 2406.

In at least one embodiment, each SM 2400, in at least one embodiment, includes, without limitation, register file 2408 that provides a set of registers for functional units of SM 2400. In at least one embodiment, register file 2408 is divided between each of the functional units such that each functional unit is allocated a dedicated portion of register file 2408. In at least one embodiment, register file 2408 is divided between different warps being executed by SM 2400 and register file 2408 provides temporary storage for operands connected to data paths of functional units. In at least one embodiment, each SM 2400 comprises, without limitation, a plurality of L processing cores 2410. In at least one embodiment, SM 2400 includes, without limitation, a large number (e.g., 128 or more) of distinct processing cores 2410. In at least one embodiment, each processing core 2410 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2410 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 2410. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point a24ition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 2400 comprises, without limitation, M SFUs 2412 that perform special functions (e.g., attribute evaluation, reciprocal square root, and like). In at least one embodiment, SFUs 2412 include, without limitation, a tree traversal unit configured to traverse a hierarchical tree data structure. In at least one embodiment, SFUs 2412 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2400. In at least one embodiment, texture maps are stored in shared memory/L1 cache 2418. In at least one embodiment, texture units implement texture operations such as filtering operations using mip-maps (e.g., texture maps of varying levels of detail). In at least one embodiment, each SM 2400 includes, without limitation, two texture units.

In at least one embodiment, each SM 2400 comprises, without limitation, N LSUs 2414 that implement load and store operations between shared memory/L1 cache 2418 and register file 2408. In at least one embodiment, each SM 2400 includes, without limitation, interconnect network 2416 that connects each of the functional units to register file 2408 and LSU 2414 to register file 2408 and shared memory/L1 cache 2418. In at least one embodiment, interconnect network 2416 is a crossbar that can be configured to connect any of the functional units to any of the registers in register file 2408 and connect LSUs 2414 to register file 2408 and memory locations in shared memory/L1 cache 2418.

In at least one embodiment, shared memory/L1 cache 2418 is an array of on-chip memory that allows for data storage and communication between SM 2400 and a primitive engine and between threads in SM 2400. In at least one embodiment, shared memory/L1 cache 2418 comprises, without limitation, 128 KB of storage capacity and is in a path from SM 2400 to a partition unit. In at least one embodiment, shared memory/L1 cache 2418 is used to cache reads and writes. In at least one embodiment, one or more of shared memory/L1 cache 2418, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 2418 enables shared memory/L1 cache 2418 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 2400 to execute a program and perform calculations, shared memory/L1 cache 2418 to communicate between threads, and LSU 2414 to read and write global memory through shared memory/L1 cache 2418 and a memory partition unit. In at least one embodiment, when configured for general purpose parallel computation, SM 2400 writes commands that scheduler unit 2404 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, exemplary software constructs for implementing at least one embodiment.

Figure 25:
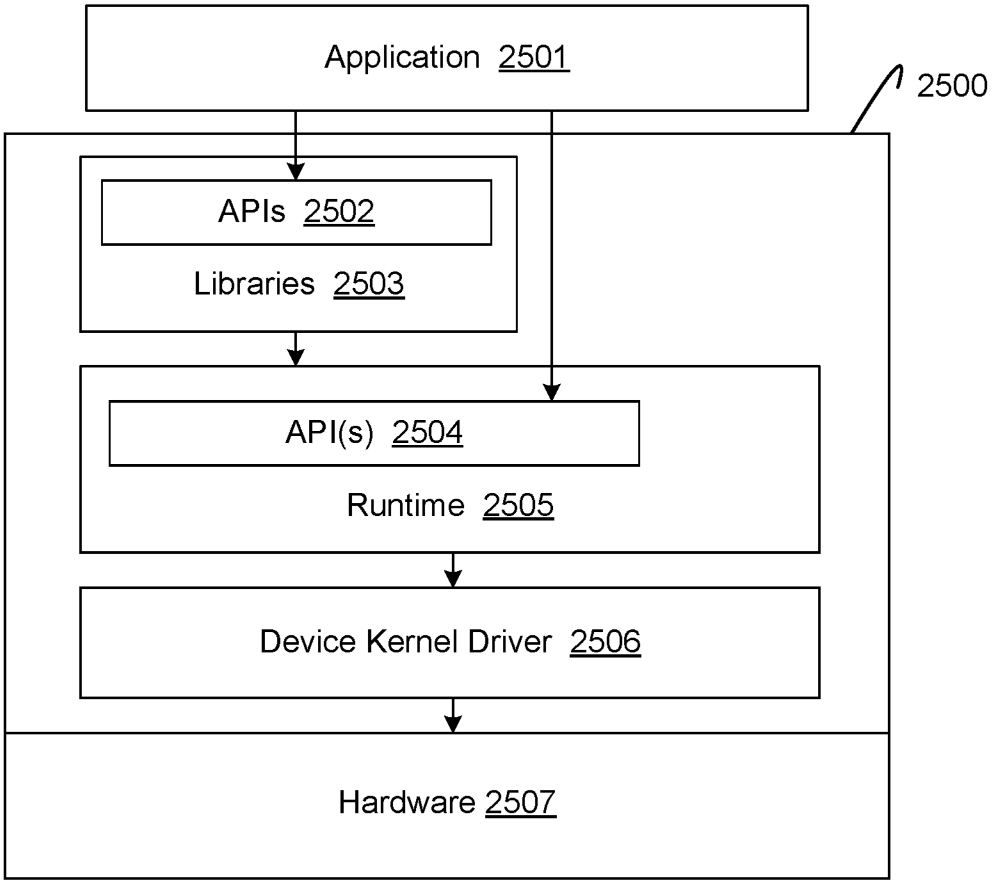
FIG. 25 illustrates a software stack of a programming platform, in accordance with at least one embodiment.

FIG. 25 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, software stack of FIG. 25 comprises logic and/or instructions that, when executed, cause information to be stored in one or more memory locations based, at least in part, on one or more graphs, and/or perform other operations to provide functionality described herein in conjunction with FIGS. 1-5.

In at least one embodiment, a software stack 2500 of a programming platform provides an execution environment for an application 2501. In at least one embodiment, application 2501 may include any computer software capable of being launched on software stack 2500. In at least one embodiment, application 2501 may include, but is not limited to, an artificial intelligence ("AI")/machine learning ("ML") application, a high performance computing ("HPC") application, a virtual desktop infrastructure ("VDI"), or a data center workload.

In at least one embodiment, application 2501 and software stack 2500 run on hardware 2507. Hardware 2507 may include one or more GPUs, CPUs, FPGAs, AI engines, and/or other types of compute devices that support a programming platform, in at least one embodiment. In at least one embodiment, such as with CUDA, software stack 2500 may be vendor specific and compatible with only devices from particular vendor(s). In at least one embodiment, such as in with OpenCL, software stack 2500 may be used with devices from different vendors. In at least one embodiment, hardware 2507 includes a host connected to one more devices that can be accessed to perform computational tasks via application programming interface ("API") calls. A device within hardware 2507 may include, but is not limited to, a GPU, FPGA, AI engine, or other compute device (but may also include a CPU) and its memory, as opposed to a host within hardware 2507 that may include, but is not limited to, a CPU (but may also include a compute device) and its memory, in at least one embodiment.

In at least one embodiment, software stack 2500 of a programming platform includes, without limitation, a number of libraries 2503, a runtime 2505, and a device kernel driver 2506. Each of libraries 2503 may include data and programming code that can be used by computer programs and leveraged during software development, in at least one embodiment. In at least one embodiment, libraries 2503 may include, but are not limited to, pre-written code and subroutines, classes, values, type specifications, configuration data, documentation, help data, and/or message templates. In at least one embodiment, libraries 2503 include functions that are optimized for execution on one or more types of devices. In at least one embodiment, libraries 2503 may include, but are not limited to, functions for performing mathematical, deep learning, and/or other types of operations on devices. In at least one embodiment, libraries 2503 are associated with corresponding APIs 2502, which may include one or more APIs, that expose functions implemented in libraries 2503.

In at least one embodiment, application 2501 is written as source code that is compiled into executable code, as discussed in greater detail below in conjunction with FIGS. 30-32. Executable code of application 2501 may run, at least in part, on an execution environment provided by software stack 2500, in at least one embodiment. In at least one embodiment, during execution of application 2501, code may be reached that needs to run on a device, as opposed to a host. In such a case, runtime 2505 may be called to load and launch requisite code on the device, in at least one embodiment. In at least one embodiment, runtime 2505 may include any technically feasible runtime system that is able to support execution of application S01.

In at least one embodiment, runtime 2505 is implemented as one or more runtime libraries associated with corresponding APIs, which are shown as API(s) 2504. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 2504 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 2506 is configured to facilitate communication with an underlying device. In at least one embodiment, device kernel driver 2506 may provide low-level functionalities upon which APIs, such as API(s) 2504, and/or other software relies. In at least one embodiment, device kernel driver 2506 may be configured to compile intermediate representation ("IR") code into binary code at runtime. For CUDA, device kernel driver 2506 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 2506 to compile IR code at runtime.

Figure 26:
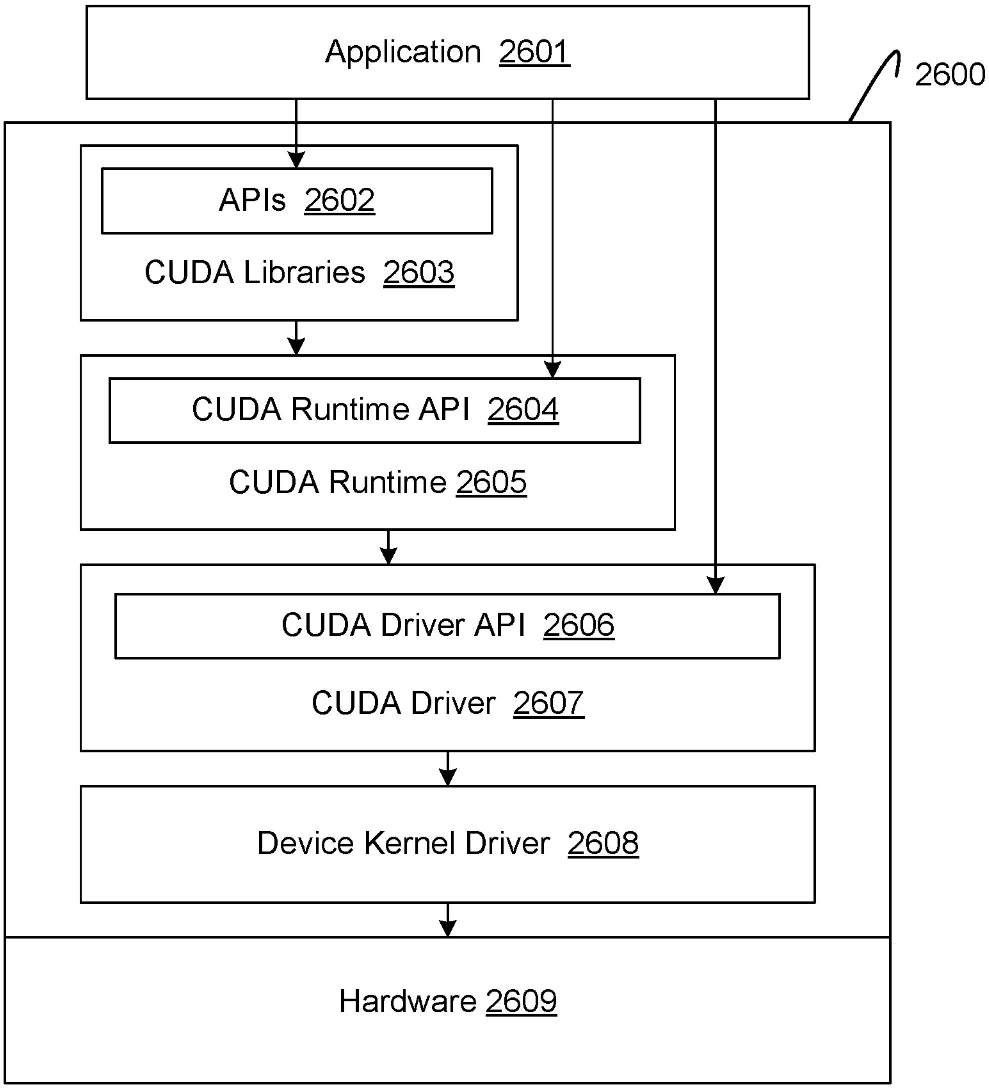
FIG. 26 illustrates a CUDA implementation of a software stack of FIG. 25, in accordance with at least one embodiment.

FIG. 26 illustrates a CUDA implementation of software stack 2500 of FIG. 25, in accordance with at least one embodiment. In at least one embodiment, a CUDA software stack 2600, on which an application 2601 may be launched, includes CUDA libraries 2603, a CUDA runtime 2605, a CUDA driver 2607, and a device kernel driver 2608. In at least one embodiment, CUDA software stack 2600 executes on hardware 2609, which may include a GPU that supports CUDA and is developed by NVIDIA Corporation of Santa Clara, CA.

In at least one embodiment, application 2601, CUDA runtime 2605, and device kernel driver 2608 may perform similar functionalities as application 2501, runtime 2505, and device kernel driver 2506, respectively, which are described above in conjunction with FIG. 25. In at least one embodiment, CUDA driver 2607 includes a library (libcuda.so) that implements a CUDA driver API 2606. Similar to a CUDA runtime API 2604 implemented by a CUDA runtime library (cudart), CUDA driver API 2606 may, without limitation, expose functions for memory management, execution control, device management, error handling, synchronization, and/or graphics interoperability, among other things, in at least one embodiment. In at least one embodiment, CUDA driver API 2606 differs from CUDA runtime API 2604 in that CUDA runtime API 2604 simplifies device code management by providing implicit initialization, context (analogous to a process) management, and module (analogous to dynamically loaded libraries) management. In contrast to high-level CUDA runtime API 2604, CUDA driver API 2606 is a low-level API providing more fine-grained control of the device, particularly with respect to contexts and module loading, in at least one embodiment. In at least one embodiment, CUDA driver API 2606 may expose functions for context management that are not exposed by CUDA runtime API 2604. In at least one embodiment, CUDA driver API 2606 is also language-independent and supports, e.g., OpenCL in addition to CUDA runtime API 2604. Further, in at least one embodiment, development libraries, including CUDA runtime 2605, may be considered as separate from driver components, including user-mode CUDA driver 2607 and kernel-mode device driver 2608 (also sometimes referred to as a "display" driver).

In at least one embodiment, CUDA libraries 2603 may include, but are not limited to, mathematical libraries, deep learning libraries, parallel algorithm libraries, and/or signal/image/video processing libraries, which parallel computing applications such as application 2601 may utilize. In at least one embodiment, CUDA libraries 2603 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 2603 may include deep learning libraries such as a cuDNN library of primitives for deep neural networks and a TensorRT platform for high-performance deep learning inference, among others.

Figure 27:
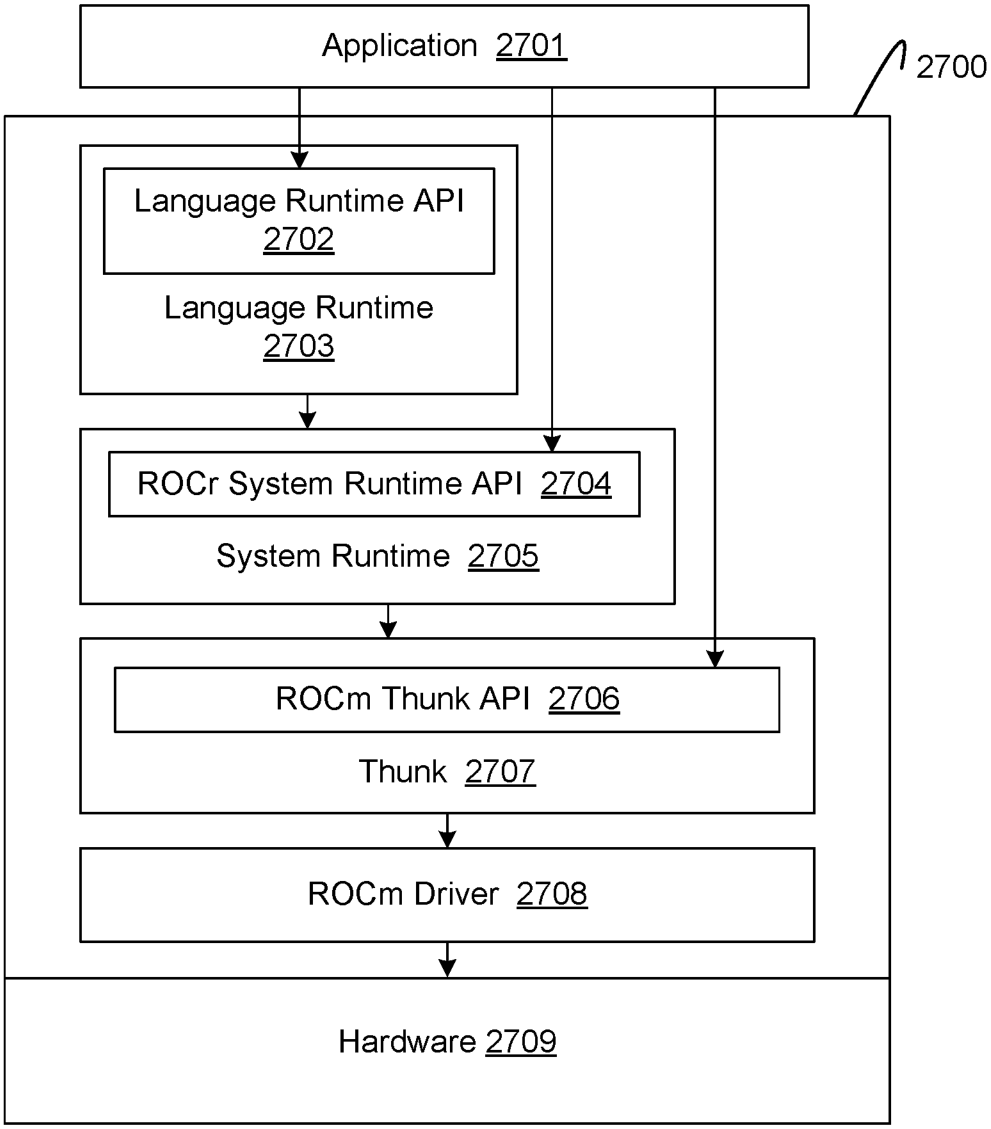
FIG. 27 illustrates a ROCm implementation of a software stack of FIG. 25, in accordance with at least one embodiment.

FIG. 27 illustrates a ROCm implementation of software stack 2500 of FIG. 25, in accordance with at least one embodiment. In at least one embodiment, a ROCm software stack 2700, on which an application 2701 may be launched, includes a language runtime 2703, a system runtime 2705, a thunk 2707, and a ROCm kernel driver 2708. In at least one embodiment, ROCm software stack 2700 executes on hardware 2709, which may include a GPU that supports ROCm and is developed by AMD Corporation of Santa Clara, CA.

In at least one embodiment, application 2701 may perform similar functionalities as application 2501 discussed above in conjunction with FIG. 25. In addition, language runtime 2703 and system runtime 2705 may perform similar functionalities as runtime 2505 discussed above in conjunction with FIG. 25, in at least one embodiment. In at least one embodiment, language runtime 2703 and system runtime 2705 differ in that system runtime 2705 is a language-independent runtime that implements a ROCr system runtime API 2704 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 2705, language runtime 2703 is an implementation of a language-specific runtime API 2702 layered on top of ROCr system runtime API 2704, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 2604 discussed above in conjunction with FIG. 26, such as functions for memory management, execution control, device management, error handling, and synchronization, among other things.

In at least one embodiment, thunk (ROCt) 2707 is an interface 2706 that can be used to interact with underlying ROCm driver 2708. In at least one embodiment, ROCm driver 2708 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 2506 discussed above in conjunction with FIG. 25. In at least one embodiment, HSA kernel driver is a driver permitting different types of processors to share system resources more effectively via hardware features.

In at least one embodiment, various libraries (not shown) may be included in ROCm software stack 2700 above language runtime 2703 and provide functionality similarity to CUDA libraries 2603, discussed above in conjunction with FIG. 26. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 28:
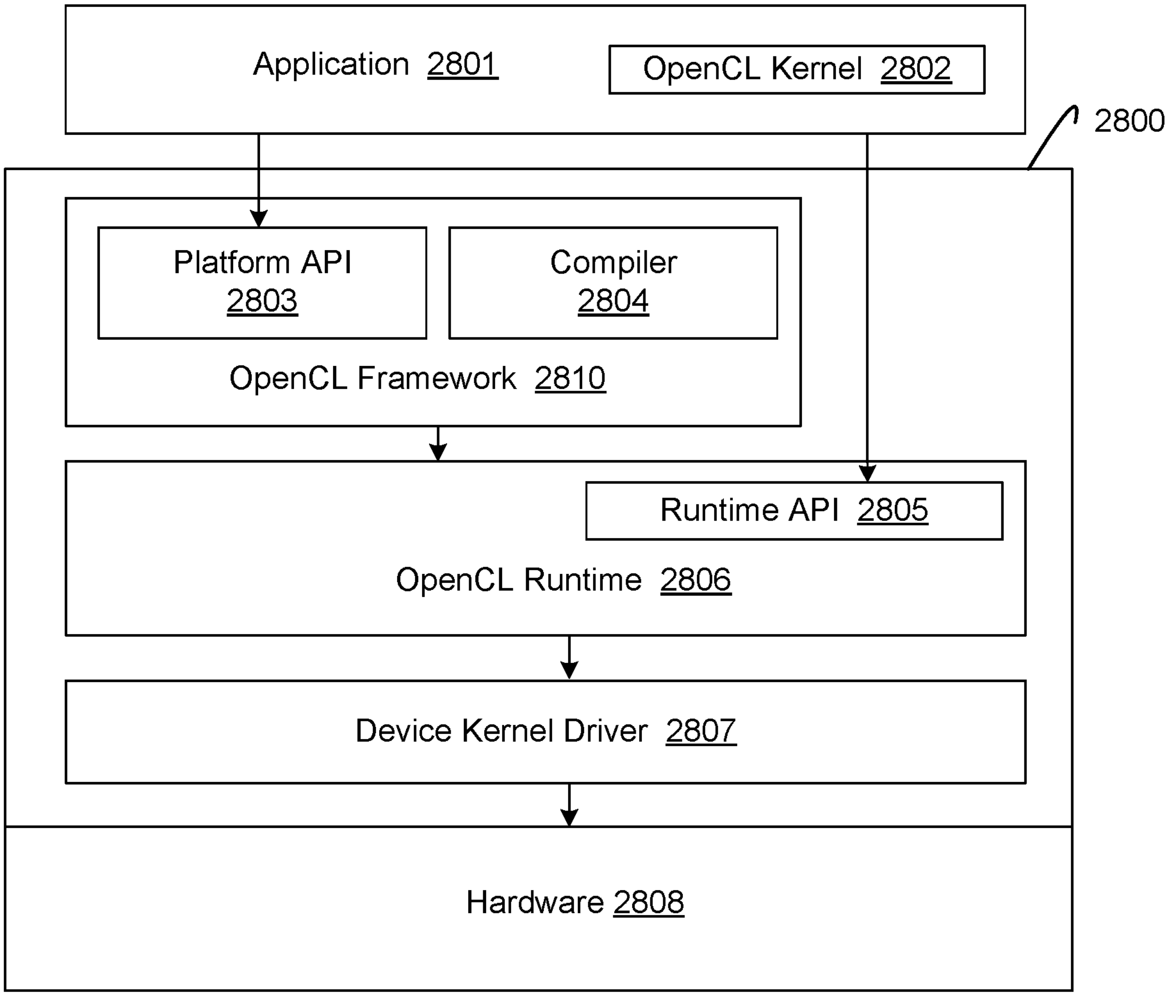
FIG. 28 illustrates an OpenCL implementation of a software stack of FIG. 25, in accordance with at least one embodiment.

FIG. 28 illustrates an OpenCL implementation of software stack 2500 of FIG. 25, in accordance with at least one embodiment. In at least one embodiment, an OpenCL software stack 2800, on which an application 2801 may be launched, includes an OpenCL framework 2810, an OpenCL runtime 2806, and a driver 2807. In at least one embodiment, OpenCL software stack 2800 executes on hardware 2609 that is not vendor-specific. As OpenCL is supported by devices developed by different vendors, specific OpenCL drivers may be required to interoperate with hardware from such vendors, in at least one embodiment.

In at least one embodiment, application 2801, OpenCL runtime 2806, device kernel driver 2807, and hardware 2808 may perform similar functionalities as application 2501, runtime 2505, device kernel driver 2506, and hardware 2507, respectively, that are discussed above in conjunction with FIG. 25. In at least one embodiment, application 2801 further includes an OpenCL kernel 2802 with code that is to be executed on a device.

In at least one embodiment, OpenCL defines a "platform" that allows a host to control devices connected to the host. In at least one embodiment, an OpenCL framework provides a platform layer API and a runtime API, shown as platform API 2803 and runtime API 2805. In at least one embodiment, runtime API 2805 uses contexts to manage execution of kernels on devices. In at least one embodiment, each identified device may be associated with a respective context, which runtime API 2805 may use to manage command queues, program objects, and kernel objects, share memory objects, among other things, for that device. In at least one embodiment, platform API 2803 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 2804 is also included in OpenCL frame-work 2810. Source code may be compiled offline prior to executing an application or online during execution of an application, in at least one embodiment. In contrast to CUDA and ROCm, OpenCL applications in at least one embodiment may be compiled online by compiler 2804, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 29:
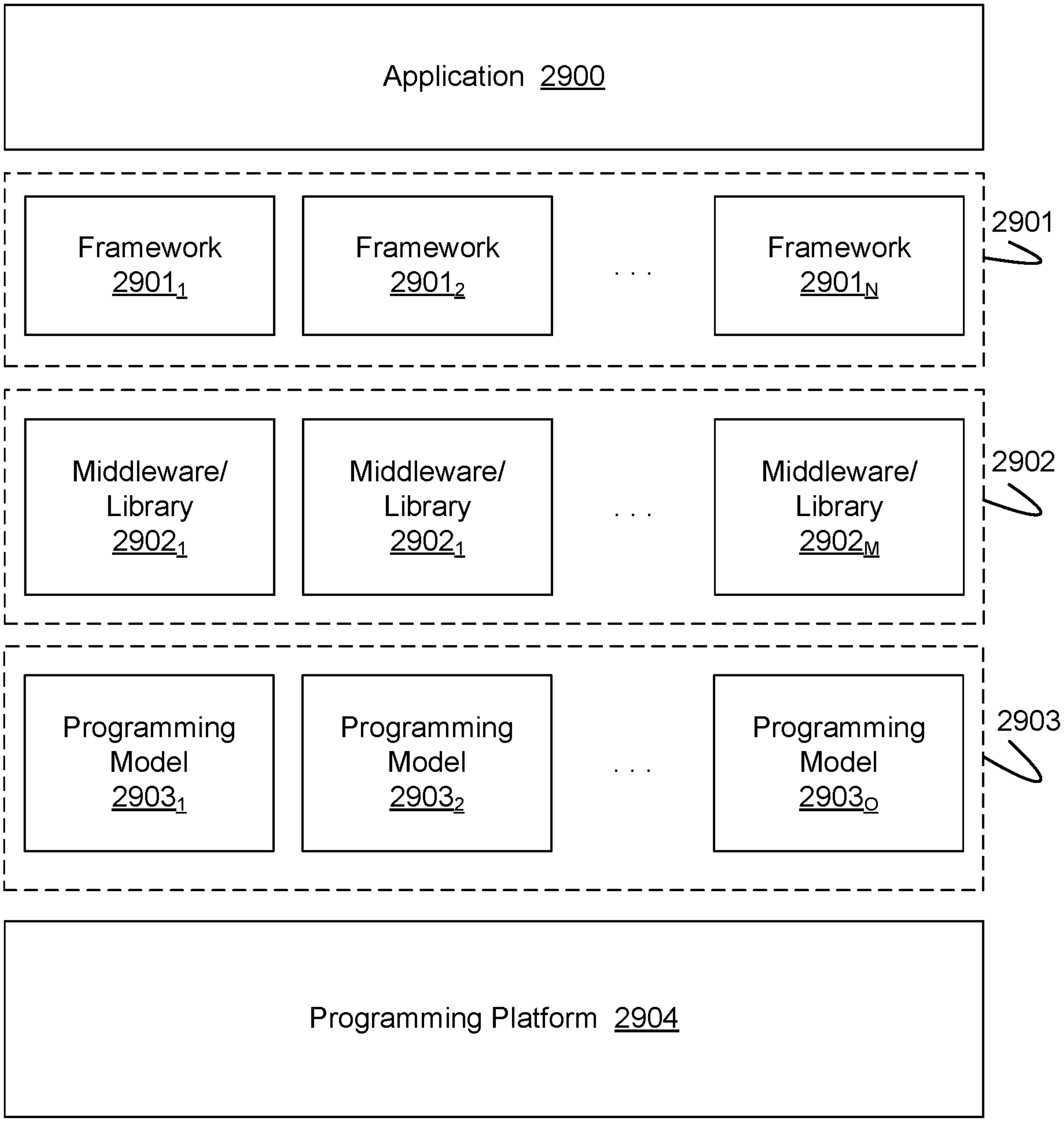
FIG. 29 illustrates software that is supported by a programming platform, in accordance with at least one embodiment.

FIG. 29 illustrates software that is supported by a programming platform, in accordance with at least one embodiment. In at least one embodiment, a programming platform 2904 is configured to support various programming models 2903, middlewares and/or libraries 2902, and frameworks 2901 that an application 2900 may rely upon. In at least one embodiment, application 2900 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 2904 may be one of a CUDA, ROCm, or OpenCL platform described above in conjunction with FIG. 26, FIG. 27, and FIG. 28, respectively. In at least one embodiment, programming platform 2904 supports multiple programming models 2903, which are abstractions of an underlying computing system permitting expressions of algorithms and data structures. Programming models 2903 may expose features of underlying hardware in order to improve performance, in at least one embodiment. In at least one embodiment, programming models 2903 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 2902 provide implementations of abstractions of programming models 2904. In at least one embodiment, such libraries include data and programming code that may be used by computer programs and leveraged during software development. In at least one embodiment, such middlewares include software that provides services to applications beyond those available from programming platform 2904. In at least one embodiment, libraries and/or middlewares 2902 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 2902 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 2901 depend on libraries and/or middlewares 2902. In at least one embodiment, each of application frameworks 2901 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 30:
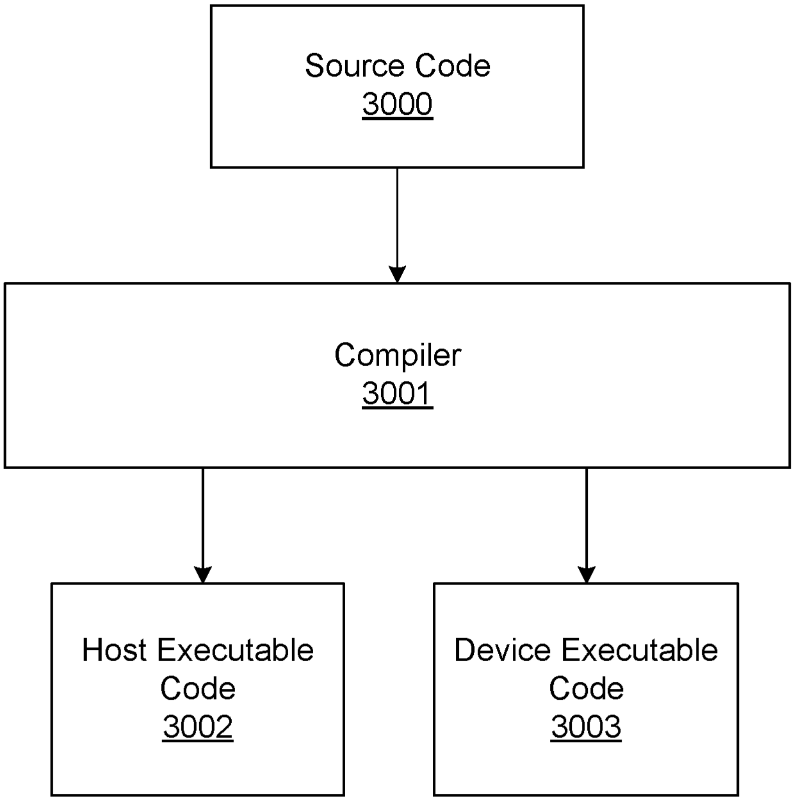
FIG. 30 illustrates compiling code to execute on programming platforms of FIGS. 25-28, in accordance with at least one embodiment.

FIG. 30 illustrates compiling code to execute on one of programming platforms of FIGS. 25-28, in accordance with at least one embodiment. In at least one embodiment, a compiler 3001 receives source code 3000 that includes both host code as well as device code. In at least one embodiment, compiler 3001 is configured to convert source code 3000 into host executable code 3002 for execution on a host and device executable code 3003 for execution on a device. In at least one embodiment, source code 3000 may either be compiled offline prior to execution of an application, or online during execution of an application.

In at least one embodiment, source code 3000 may include code in any programming language supported by compiler 3001, such as C++, C, Fortran, etc. In at least one embodiment, source code 3000 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3000 may include multiple source code files, rather than a single-source file, into which host code and device code are separated.

In at least one embodiment, compiler 3001 is configured to compile source code 3000 into host executable code 3002 for execution on a host and device executable code 3003 for execution on a device. In at least one embodiment, compiler 3001 performs operations including parsing source code 3000 into an abstract system tree (AST), performing optimizations, and generating executable code. In at least one embodiment in which source code 3000 includes a single-source file, compiler 3001 may separate device code from host code in such a single-source file, compile device code and host code into device executable code 3003 and host executable code 3002, respectively, and link device executable code 3003 and host executable code 3002 together in a single file, as discussed in greater detail below with respect to FIG. 31.

In at least one embodiment, host executable code 3002 and device executable code 3003 may be in any suitable format, such as binary code and/or IR code. In the case of CUDA, host executable code 3002 may include native object code and device executable code 3003 may include code in PTX intermediate representation, in at least one embodiment. In the case of ROCm, both host executable code 3002 and device executable code 3003 may include target binary code, in at least one embodiment.

Figure 31:
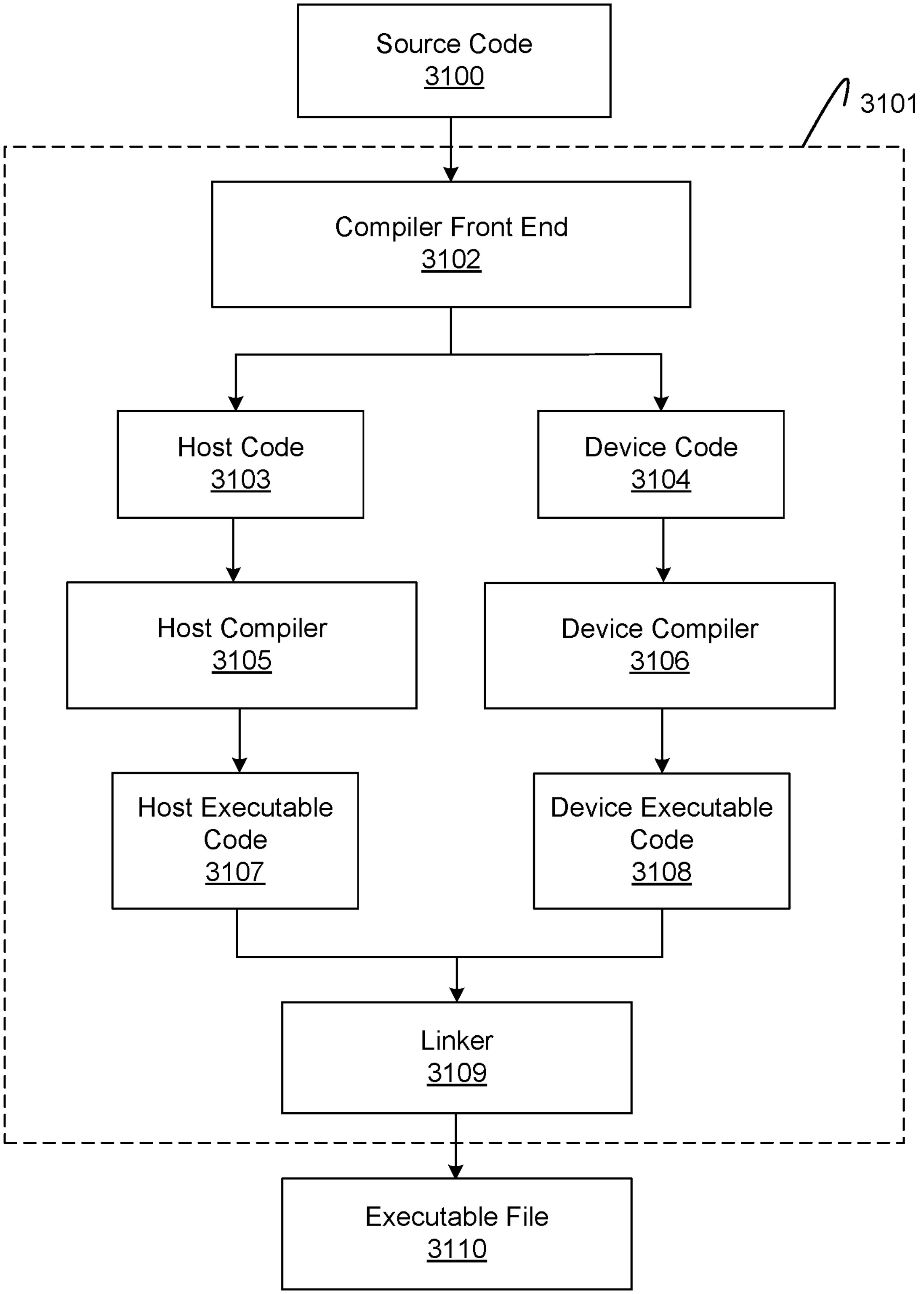
FIG. 31 illustrates in greater detail compiling code to execute on programming platforms of FIGS. 25-28, in accordance with at least one embodiment.

FIG. 31 is a more detailed illustration of compiling code to execute on one of programming platforms of FIGS. 25-28, in accordance with at least one embodiment. In at least one embodiment, a compiler 3101 is configured to receive source code 3100, compile source code 3100, and output an executable file 3110. In at least one embodiment, source code 3100 is a single-source file, such as a .cu file, a .hip.cpp file, or a file in another format, that includes both host and device code. In at least one embodiment, compiler 3101 may be, but is not limited to, an NVIDIA CUDA compiler ("NVCC") for compiling CUDA code in .cu files, or a HCC compiler for compiling HIP code in .hip.cpp files.

In at least one embodiment, compiler 3101 includes a compiler front end 3102, a host compiler 3105, a device compiler 3106, and a linker 3109. In at least one embodiment, compiler front end 3102 is configured to separate device code 3104 from host code 3103 in source code 3100. Device code 3104 is compiled by device compiler 3106 into device executable code 3108, which as described may include binary code or IR code, in at least one embodiment. Separately, host code 3103 is compiled by host compiler 3105 into host executable code 3107, in at least one embodiment. For NVCC, host compiler 3105 may be, but is not limited to, a general purpose C/C++ compiler that outputs native object code, while device compiler 3106 may be, but is not limited to, a Low Level Virtual Machine ("LLVM")-based compiler that forks a LLVM compiler infrastructure and outputs PTX code or binary code, in at least one embodiment. For HCC, both host compiler 3105 and device compiler 3106 may be, but are not limited to, LLVM-based compilers that output target binary code, in at least one embodiment.

Subsequent to compiling source code 3100 into host executable code 3107 and device executable code 3108, linker 3109 links host and device executable code 3107 and 3108 together in executable file 3110, in at least one embodiment. In at least one embodiment, native object code for a host and PTX or binary code for a device may be linked together in an Executable and Linkable Format ("ELF") file, which is a container format used to store object code.

Figure 32:
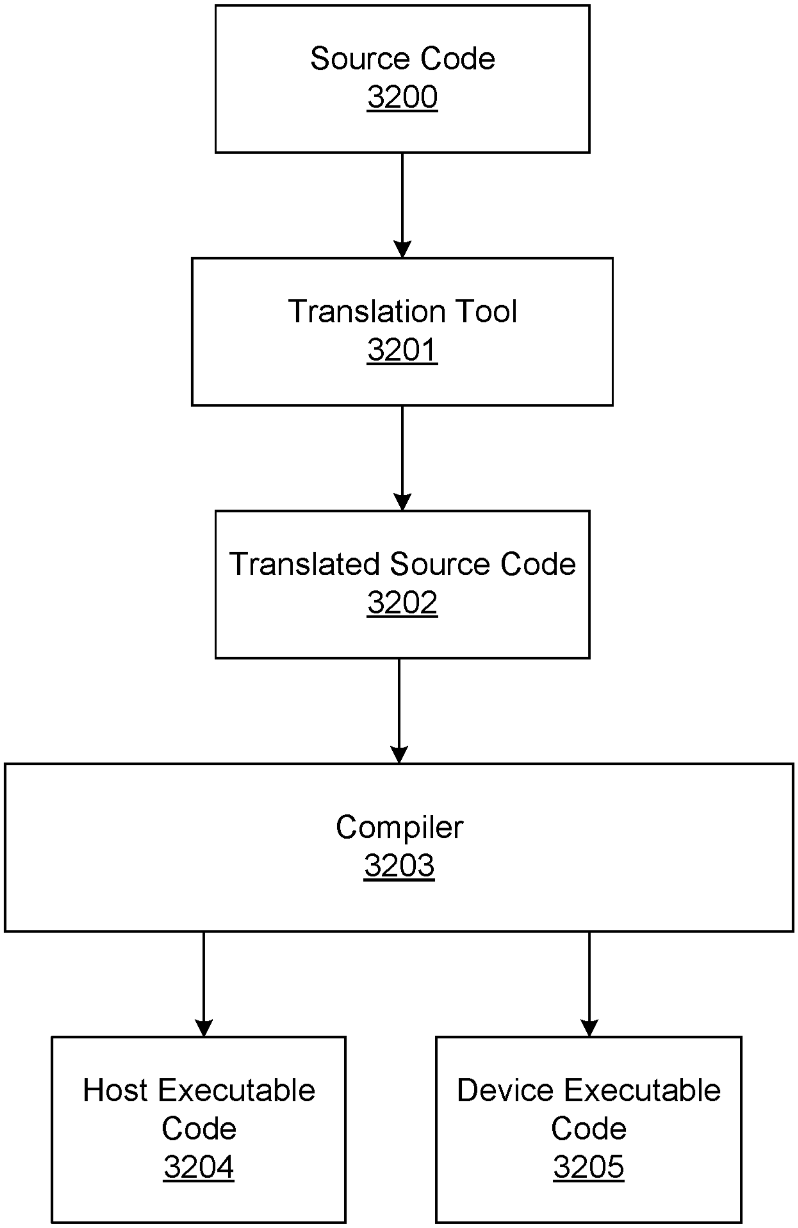
FIG. 32 illustrates translating source code prior to compiling source code, in accordance with at least one embodiment.

FIG. 32 illustrates translating source code prior to compiling source code, in accordance with at least one embodiment. In at least one embodiment, source code 3200 is passed through a translation tool 3201, which translates source code 3200 into translated source code 3202. In at least one embodiment, a compiler 3203 is used to compile translated source code 3202 into host executable code 3204 and device executable code 3205 in a process that is similar to compilation of source code 3000 by compiler 3001 into host executable code 3002 and device executable 3003, as discussed above in conjunction with FIG. 30.

In at least one embodiment, a translation performed by translation tool 3201 is used to port source 3200 for execution in a different environment than that in which it was originally intended to run. In at least one embodiment, translation tool 3201 may include, but is not limited to, a HIP translator that is used to "hipify" CUDA code intended for a CUDA platform into HIP code that can be compiled and executed on a ROCm platform. In at least one embodiment, translation of source code 3200 may include parsing source code 3200 and converting calls to API(s) provided by one programming model (e.g., CUDA) into corresponding calls to API(s) provided by another programming model (e.g., HIP), as discussed in greater detail below in conjunction with FIGS. 33A-34. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3201 may sometimes be incomplete, requiring additional, manual effort to fully port source code 3200.

Configuring GPUS for General-Purpose Computing

The following figures set forth, without limitation, exemplary architectures for compiling and executing compute source code, in accordance with at least one embodiment.

Figure 33A:
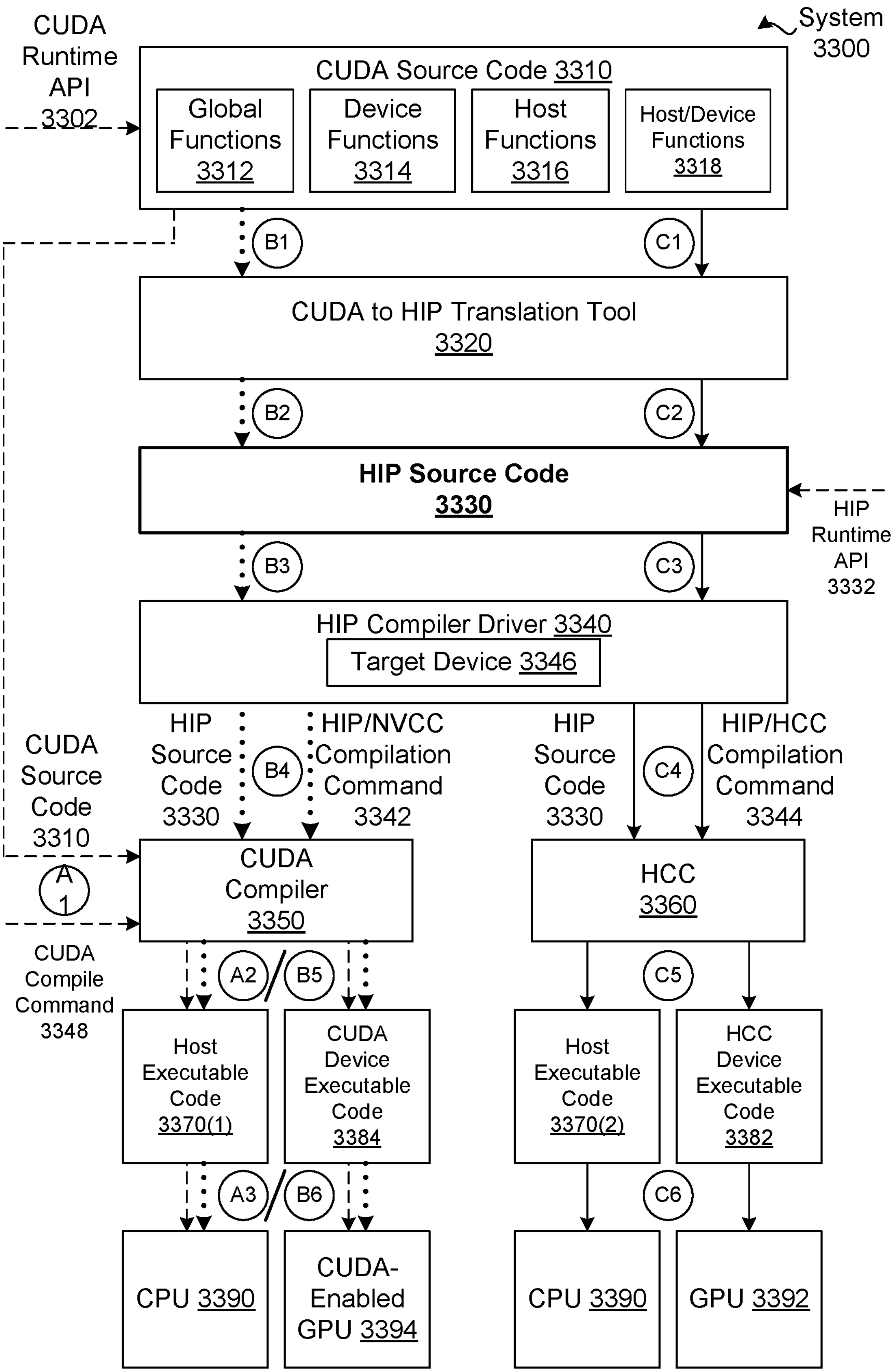
FIG. 33A illustrates a system configured to compile and execute CUDA source code using different types of processing units, in accordance with at least one embodiment.

FIG. 33A illustrates a system 33A00 configured to compile and execute CUDA source code 3310 using different types of processing units, in accordance with at least one embodiment. In at least one embodiment, system 33A00 includes, without limitation, CUDA source code 3310, a CUDA compiler 3350, host executable code 3370(1), host executable code 3370(2), CUDA device executable code 3384, a CPU 3390, a CUDA-enabled GPU 3394, a GPU 3392, a CUDA to HIP translation tool 3320, HIP source code 3330, a HIP compiler driver 3340, an HCC 3360, and HCC device executable code 3382.

In at least one embodiment, CUDA source code 3310 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 3390, GPU 33192, or another GPGPU, etc. In at least one embodiment, host code is source code that, after compilation, is executable on a host. In at least one embodiment, a host is a processor that is optimized for sequential instruction processing, such as CPU 3390.

In at least one embodiment, CUDA source code 3310 includes, without limitation, any number (including zero) of global functions 3312, any number (including zero) of device functions 3314, any number (including zero) of host functions 3316, and any number (including zero) of host/device functions 3318. In at least one embodiment, global functions 3312, device functions 3314, host functions 3316, and host/device functions 3318 may be mixed in CUDA source code 3310. In at least one embodiment, each of global functions 3312 is executable on a device and callable from a host. In at least one embodiment, one or more of global functions 3312 may therefore act as entry points to a device. In at least one embodiment, each of global functions 3312 is a kernel. In at least one embodiment and in a technique known as dynamic parallelism, one or more of global functions 3312 defines a kernel that is executable on a device and callable from such a device. In at least one embodiment, a kernel is executed N (where N is any positive integer) times in parallel by N different threads on a device during execution.

In at least one embodiment, each of device functions 3314 is executed on a device and callable from such a device only. In at least one embodiment, each of host functions 3316 is executed on a host and callable from such a host only. In at least one embodiment, each of host/device functions 3316 defines both a host version of a function that is executable on a host and callable from such a host only and a device version of the function that is executable on a device and callable from such a device only.

In at least one embodiment, CUDA source code 3310 may also include, without limitation, any number of calls to any number of functions that are defined via a CUDA runtime API 3302. In at least one embodiment, CUDA runtime API 3302 may include, without limitation, any number of functions that execute on a host to allocate and deallocate device memory, transfer data between host memory and device memory, manage systems with multiple devices, etc. In at least one embodiment, CUDA source code 3310 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 3302, a CUDA driver API, APIs for any number of CUDA libraries, etc. In at least one embodiment and relative to CUDA runtime API 3302, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 3350 compiles input CUDA code (e.g., CUDA source code 3310) to generate host executable code 3370(1) and CUDA device executable code 3384. In at least one embodiment, CUDA compiler 3350 is NVCC. In at least one embodiment, host executable code 3370(1) is a compiled version of host code included in input source code that is executable on CPU 3390. In at least one embodiment, CPU 3390 may be any processor that is optimized for sequential instruction processing.

In at least one embodiment, CUDA device executable code 3384 is a compiled version of device code included in input source code that is executable on CUDA-enabled GPU 3394. In at least one embodiment, CUDA device executable code 3384 includes, without limitation, binary code. In at least one embodiment, CUDA device executable code 3384 includes, without limitation, IR code, such as PTX code, that is further compiled at runtime into binary code for a specific target device (e.g., CUDA-enabled GPU 3394) by a device driver. In at least one embodiment, CUDA-enabled GPU 3394 may be any processor that is optimized for parallel instruction processing and that supports CUDA. In at least one embodiment, CUDA-enabled GPU 3394 is developed by NVIDIA Corporation of Santa Clara, CA.

In at least one embodiment, CUDA to HIP translation tool 3320 is configured to translate CUDA source code 3310 to functionally similar HIP source code 3330. In a least one embodiment, HIP source code 3330 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 3312, but such a HIP programming language may lack support for dynamic parallelism and therefore global functions 3312 defined in HIP code may be callable from a host only.

In at least one embodiment, HIP source code 3330 includes, without limitation, any number (including zero) of global functions 3312, any number (including zero) of device functions 3314, any number (including zero) of host functions 3316, and any number (including zero) of host/device functions 3318. In at least one embodiment, HIP source code 3330 may also include any number of calls to any number of functions that are specified in a HIP runtime API 3332. In at least one embodiment, HIP runtime API 3332 includes, without limitation, functionally similar versions of a subset of functions included in CUDA runtime API 3302. In at least one embodiment, HIP source code 3330 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 3332, a HIP driver API, APIs for any number of HIP libraries, APIs for any number of ROCm libraries, etc.

In at least one embodiment, CUDA to HIP translation tool 3320 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 3320 converts any number of calls to functions specified in CUDA runtime API 3302 to any number of calls to functions specified in HIP runtime API 3332.

In at least one embodiment, CUDA to HIP translation tool 3320 is a tool known as hipify-perl that executes a text-based translation process. In at least one embodiment, CUDA to HIP translation tool 3320 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 3320.

In at least one embodiment, HIP compiler driver 3340 is a front end that determines a target device 3346 and then configures a compiler that is compatible with target device 3346 to compile HIP source code 3330. In at least one embodiment, target device 3346 is a processor that is optimized for parallel instruction processing. In at least one embodiment, HIP compiler driver 3340 may determine target device 3346 in any technically feasible fashion.

In at least one embodiment, if target device 3346 is compatible with CUDA (e.g., CUDA-enabled GPU 3394), then HIP compiler driver 3340 generates a HIP/NVCC compilation command 3342. In at least one embodiment and as described in greater detail in conjunction with FIG. 33B, HIP/NVCC compilation command 3342 configures CUDA compiler 3350 to compile HIP source code 3330 using, without limitation, a HIP to CUDA translation header and a CUDA runtime library. In at least one embodiment and in response to HIP/NVCC compilation command 3342, CUDA compiler 3350 generates host executable code 3370(1) and CUDA device executable code 3384.

In at least one embodiment, if target device 3346 is not compatible with CUDA, then HIP compiler driver 3340 generates a HIP/HCC compilation command 3344. In at least one embodiment and as described in greater detail in conjunction with FIG. 33C, HIP/HCC compilation command 3344 configures HCC 3360 to compile HIP source code 3330 using, without limitation, an HCC header and a HIP/HCC runtime library. In at least one embodiment and in response to HIP/HCC compilation command 3344, HCC 3360 generates host executable code 3370(2) and HCC device executable code 3382. In at least one embodiment, HCC device executable code 3382 is a compiled version of device code included in HIP source code 3330 that is executable on GPU 3392. In at least one embodiment, GPU 3392 may be any processor that is optimized for parallel instruction processing, is not compatible with CUDA, and is compatible with HCC. In at least one embodiment, GPU 3392 is developed by AMD Corporation of Santa Clara, CA. In at least one embodiment GPU, 3392 is a non-CUDA-enabled GPU 3392.

For explanatory purposes only, three different flows that may be implemented in at least one embodiment to compile CUDA source code 3310 for execution on CPU 3390 and different devices are depicted in FIG. 33A. In at least one embodiment, a direct CUDA flow compiles CUDA source code 3310 for execution on CPU 3390 and CUDA-enabled GPU 3394 without translating CUDA source code 3310 to HIP source code 3330. In at least one embodiment, an indirect CUDA flow translates CUDA source code 3310 to HIP source code 3330 and then compiles HIP source code 3330 for execution on CPU 3390 and CUDA-enabled GPU 3394. In at least one embodiment, a CUDA/HCC flow translates CUDA source code 3310 to HIP source code 3330 and then compiles HIP source code 3330 for execution on CPU 3390 and GPU 3392.

A direct CUDA flow that may be implemented in at least one embodiment is depicted via dashed lines and a series of bubbles annotated A1-A3. In at least one embodiment and as depicted with bubble annotated A1, CUDA compiler 3350 receives CUDA source code 3310 and a CUDA compile command 3348 that configures CUDA compiler 3350 to compile CUDA source code 3310. In at least one embodiment, CUDA source code 3310 used in a direct CUDA flow is written in a CUDA programming language that is based on a programming language other than C++ (e.g., C, Fortran, Python, Java, etc.). In at least one embodiment and in response to CUDA compile command 3348, CUDA compiler 3350 generates host executable code 3370(1) and CUDA device executable code 3384 (depicted with bubble annotated A2). In at least one embodiment and as depicted with bubble annotated A3, host executable code 3370(1) and CUDA device executable code 3384 may be executed on, respectively, CPU 3390 and CUDA-enabled GPU 3394. In at least one embodiment, CUDA device executable code 3384 includes, without limitation, binary code. In at least one embodiment, CUDA device executable code 3384 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 3320 receives CUDA source code 3310. In at least one embodiment and as depicted with bubble annotated B2, CUDA to HIP translation tool 3320 translates CUDA source code 3310 to HIP source code 3330. In at least one embodiment and as depicted with bubble annotated B3, HIP compiler driver 3340 receives HIP source code 3330 and determines that target device 3346 is CUDA-enabled.

In at least one embodiment and as depicted with bubble annotated B4, HIP compiler driver 3340 generates HIP/NVCC compilation command 3342 and transmits both HIP/NVCC compilation command 3342 and HIP source code 3330 to CUDA compiler 3350. In at least one embodiment and as described in greater detail in conjunction with FIG. 33B, HIP/NVCC compilation command 3342 configures CUDA compiler 3350 to compile HIP source code 3330 using, without limitation, a HIP to CUDA translation header and a CUDA runtime library. In at least one embodiment and in response to HIP/NVCC compilation command 3342, CUDA compiler 3350 generates host executable code 3370(1) and CUDA device executable code 3384 (depicted with bubble annotated B5). In at least one embodiment and as depicted with bubble annotated B6, host executable code 3370(1) and CUDA device executable code 3384 may be executed on, respectively, CPU 3390 and CUDA-enabled GPU 3394. In at least one embodiment, CUDA device executable code 3384 includes, without limitation, binary code. In at least one embodiment, CUDA device executable code 3384 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 3320 receives CUDA source code 3310. In at least one embodiment and as depicted with bubble annotated C2, CUDA to HIP translation tool 3320 translates CUDA source code 3310 to HIP source code 3330. In at least one embodiment and as depicted with bubble annotated C3, HIP compiler driver 3340 receives HIP source code 3330 and determines that target device 3346 is not CUDA-enabled.

In at least one embodiment, HIP compiler driver 3340 generates HIP/HCC compilation command 3344 and transmits both HIP/HCC compilation command 3344 and HIP source code 3330 to HCC 3360 (depicted with bubble annotated C4). In at least one embodiment and as described in greater detail in conjunction with FIG. 33C, HIP/HCC compilation command 3344 configures HCC 3360 to compile HIP source code 3330 using, without limitation, an HCC header and a HIP/HCC runtime library. In at least one embodiment and in response to HIP/HCC compilation command 3344, HCC 3360 generates host executable code 3370(2) and HCC device executable code 3382 (depicted with bubble annotated C5). In at least one embodiment and as depicted with bubble annotated C6, host executable code 3370(2) and HCC device executable code 3382 may be executed on, respectively, CPU 3390 and GPU 3392.

In at least one embodiment, after CUDA source code 3310 is translated to HIP source code 3330, HIP compiler driver 3340 may subsequently be used to generate executable code for either CUDA-enabled GPU 3394 or GPU 3392 without re-executing CUDA to HIP translation tool 3320. In at least one embodiment, CUDA to HIP translation tool 3320 translates CUDA source code 3310 to HIP source code 3330 that is then stored in memory. In at least one embodiment, HIP compiler driver 3340 then configures HCC 3360 to generate host executable code 3370(2) and HCC device executable code 3382 based on HIP source code 3330. In at least one embodiment, HIP compiler driver 3340 subsequently configures CUDA compiler 3350 to generate host executable code 3370(1) and CUDA device executable code 3384 based on stored HIP source code 3330.

Figure 33B:
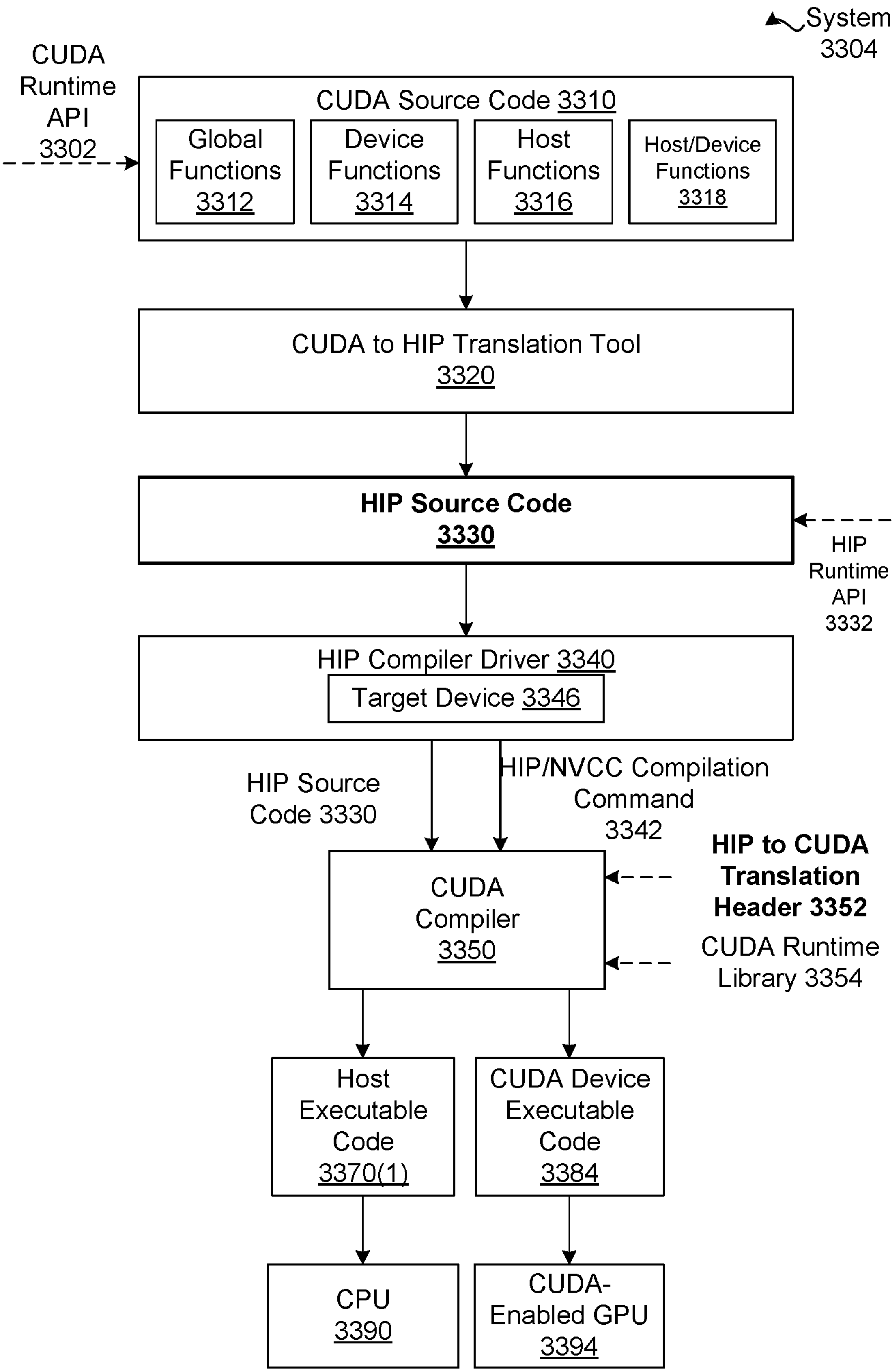
FIG. 33B illustrates a system configured to compile and execute CUDA source code of FIG. 33A using a CPU and a CUDA-enabled GPU, in accordance with at least one embodiment.

FIG. 33B illustrates a system 3304 configured to compile and execute CUDA source code 3310 of FIG. 33A using CPU 3390 and CUDA-enabled GPU 3394, in accordance with at least one embodiment. In at least one embodiment, system 3304 includes, without limitation, CUDA source code 3310, CUDA to HIP translation tool 3320, HIP source code 3330, HIP compiler driver 3340, CUDA compiler 3350, host executable code 3370(1), CUDA device executable code 3384, CPU 3390, and CUDA-enabled GPU 3394.

In at least one embodiment and as described previously herein in conjunction with FIG. 33A, CUDA source code 3310 includes, without limitation, any number (including zero) of global functions 3312, any number (including zero) of device functions 3314, any number (including zero) of host functions 3316, and any number (including zero) of host/device functions 3318. In at least one embodiment, CUDA source code 3310 also includes, without limitation, any number of calls to any number of functions that are specified in any number of CUDA APIs.

In at least one embodiment, CUDA to HIP translation tool 3320 translates CUDA source code 3310 to HIP source code 3330. In at least one embodiment, CUDA to HIP translation tool 3320 converts each kernel call in CUDA source code 3310 from a CUDA syntax to a HIP syntax and converts any number of other CUDA calls in CUDA source code 3310 to any number of other functionally similar HIP calls.

In at least one embodiment, HIP compiler driver 3340 determines that target device 3346 is CUDA-enabled and generates HIP/NVCC compilation command 3342. In at least one embodiment, HIP compiler driver 3340 then configures CUDA compiler 3350 via HIP/NVCC compilation command 3342 to compile HIP source code 3330. In at least one embodiment, HIP compiler driver 3340 provides access to a HIP to CUDA translation header 3352 as part of configuring CUDA compiler 3350. In at least one embodiment, HIP to CUDA translation header 3352 translates any number of mechanisms (e.g., functions) specified in any number of HIP APIs to any number of mechanisms specified in any number of CUDA APIs. In at least one embodiment, CUDA compiler 3350 uses HIP to CUDA translation header 3352 in conjunction with a CUDA runtime library 3354 corresponding to CUDA runtime API 3302 to generate host executable code 3370(1) and CUDA device executable code 3384. In at least one embodiment, host executable code 3370(1) and CUDA device executable code 3384 may then be executed on, respectively, CPU 3390 and CUDA-enabled GPU 3394. In at least one embodiment, CUDA device executable code 3384 includes, without limitation, binary code. In at least one embodiment, CUDA device executable code 3384 includes, without limitation, PTX code and is further compiled into binary code for a specific target device at runtime.

Figure 33C:
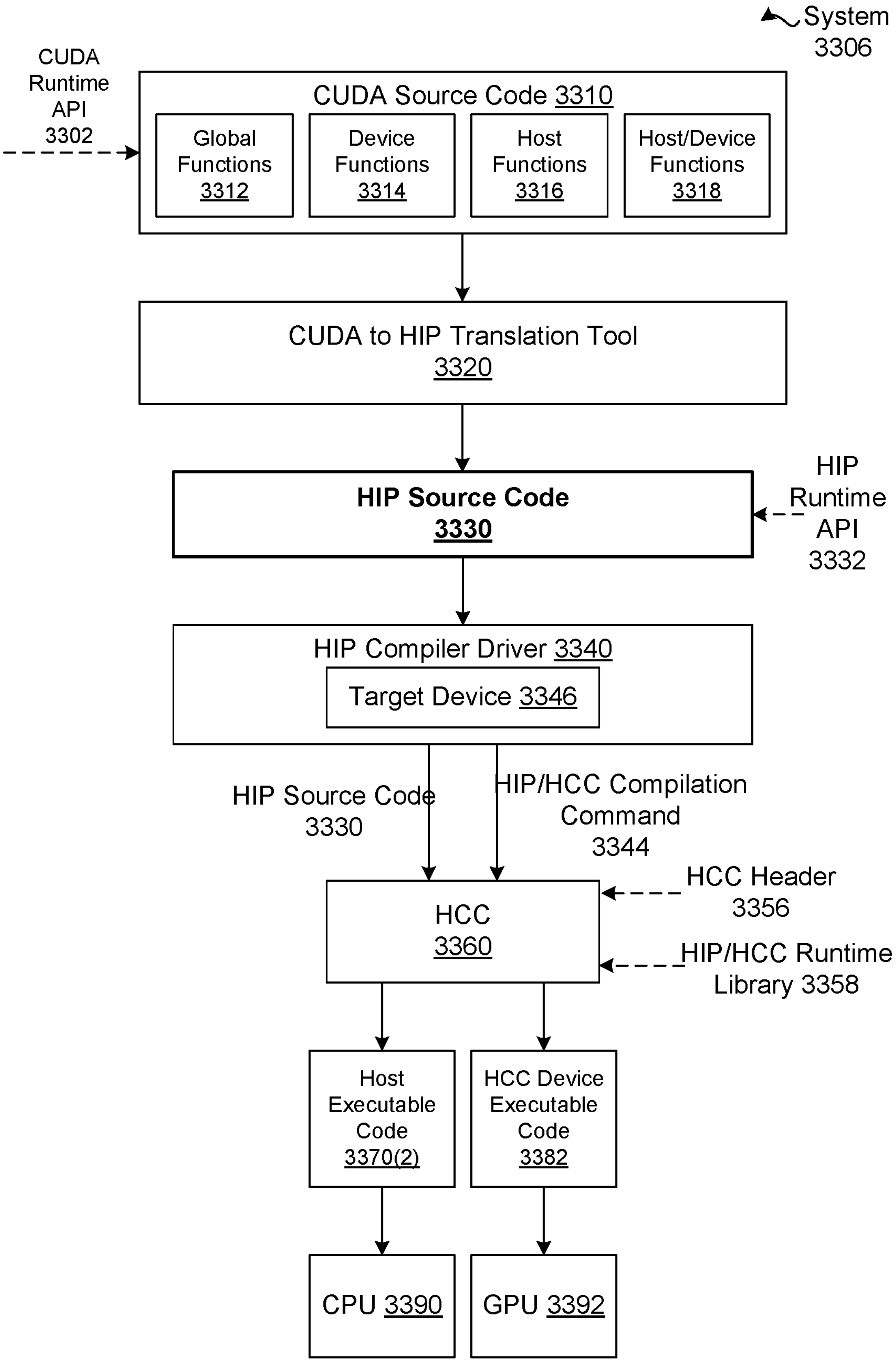
FIG. 33C illustrates a system configured to compile and execute CUDA source code of FIG. 33A using a CPU and a non-CUDA-enabled GPU, in accordance with at least one embodiment.

FIG. 33C illustrates a system 3306 configured to compile and execute CUDA source code 3310 of FIG. 33A using CPU 3390 and non-CUDA-enabled GPU 3392, in accordance with at least one embodiment. In at least one embodiment, system 3306 includes, without limitation, CUDA source code 3310, CUDA to HIP translation tool 3320, HIP source code 3330, HIP compiler driver 3340, HCC 3360, host executable code 3370(2), HCC device executable code 3382, CPU 3390, and GPU 3392.

In at least one embodiment and as described previously herein in conjunction with FIG. 33A, CUDA source code 3310 includes, without limitation, any number (including zero) of global functions 3312, any number (including zero) of device functions 3314, any number (including zero) of host functions 3316, and any number (including zero) of host/device functions 3318. In at least one embodiment, CUDA source code 3310 also includes, without limitation, any number of calls to any number of functions that are specified in any number of CUDA APIs.

In at least one embodiment, CUDA to HIP translation tool 3320 translates CUDA source code 3310 to HIP source code 3330. In at least one embodiment, CUDA to HIP translation tool 3320 converts each kernel call in CUDA source code 3310 from a CUDA syntax to a HIP syntax and converts any number of other CUDA calls in source code 3310 to any number of other functionally similar HIP calls.

In at least one embodiment, HIP compiler driver 3340 subsequently determines that target device 3346 is not CUDA-enabled and generates HIP/HCC compilation command 3344. In at least one embodiment, HIP compiler driver 3340 then configures HCC 3360 to execute HIP/HCC compilation command 3344 to compile HIP source code 3330. In at least one embodiment, HIP/HCC compilation command 3344 configures HCC 3360 to use, without limitation, a HIP/HCC runtime library 3358 and an HCC header 3356 to generate host executable code 3370(2) and HCC device executable code 3382. In at least one embodiment, HIP/

HCC runtime library 3358 corresponds to HIP runtime API 3332. In at least one embodiment, HCC header 3356 includes, without limitation, any number and type of interoperability mechanisms for HIP and HCC. In at least one embodiment, host executable code 3370(2) and HCC device executable code 3382 may be executed on, respectively, CPU 3390 and GPU 3392.

Figure 34:
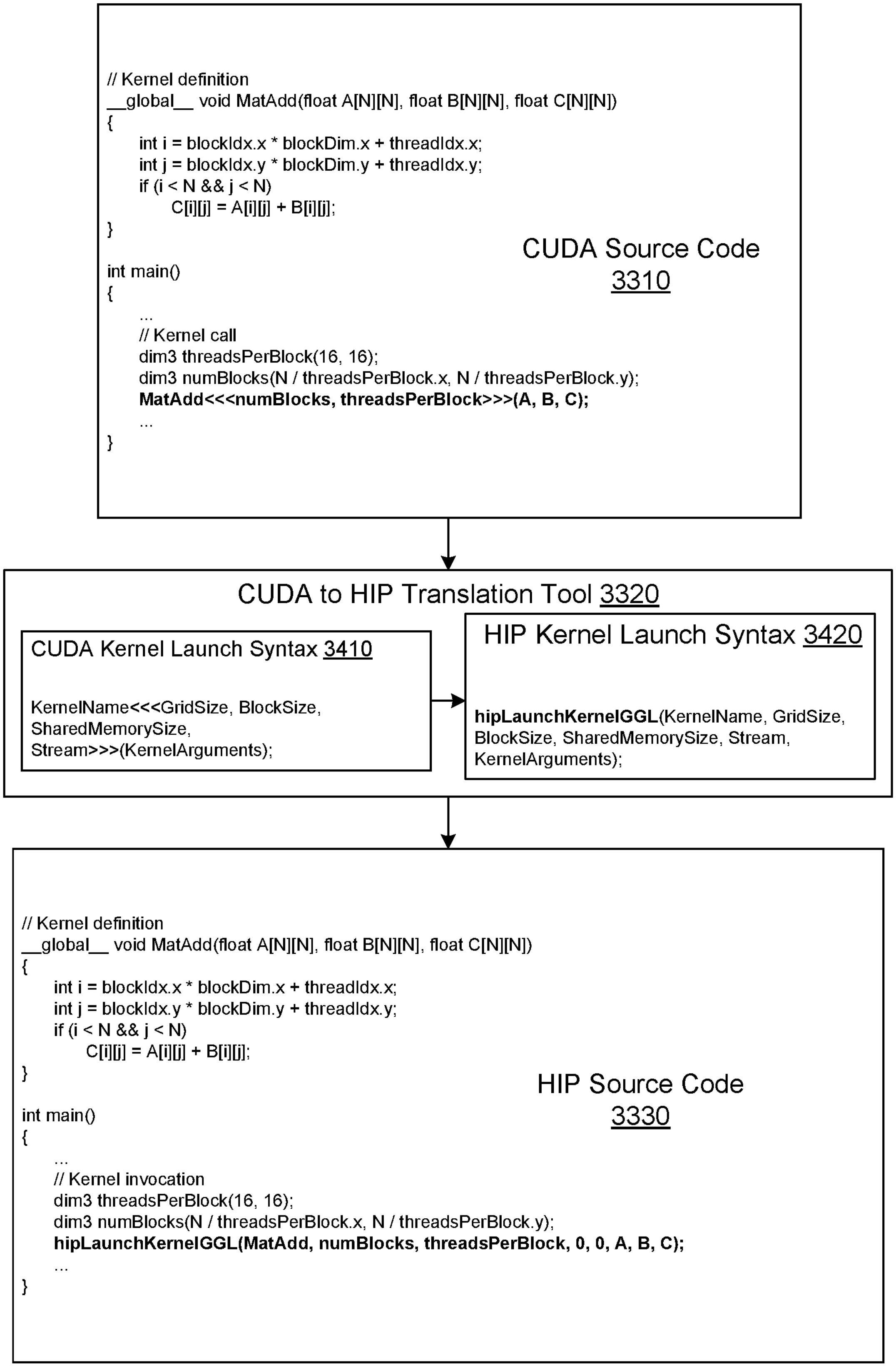
FIG. 34 illustrates an exemplary kernel translated by CUDA-to-HIP translation tool of FIG. 33C, in accordance with at least one embodiment.

FIG. 34 illustrates an exemplary kernel translated by CUDA-to-HIP translation tool 3320 of FIG. 33C, in accordance with at least one embodiment. In at least one embodiment, CUDA source code 3310 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 3310 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 3410. In at least one embodiment, CUDA kernel launch syntax 3410 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 3410 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 3410, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 3410, SharedMemorySize defaults to zero. In at least one embodiment and with respect to CUDA kernel launch syntax 3410, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 3310 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 3410, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 3310 to HIP source code 3330, CUDA to HIP translation tool 3320 translates each kernel call in CUDA source code 3310 from CUDA kernel launch syntax 3410 to a HIP kernel launch syntax 3420 and converts any number of other CUDA calls in source code 3310 to any number of other functionally similar HIP calls. In at least one embodiment, HIP kernel launch syntax 3420 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 3420 as in CUDA kernel launch syntax 3410 (described previously herein). In at least one embodiment, arguments SharedMemorySize and Stream are required in HIP kernel launch syntax 3420 and are optional in CUDA kernel launch syntax 3410.

In at least one embodiment, a portion of HIP source code 3330 depicted in FIG. 34 is identical to a portion of CUDA source code 3310 depicted in FIG. 34 except for a kernel call that causes kernel MatAdd to execute on a device. In at least one embodiment, kernel MatAdd is defined in HIP source code 3330 with the same "_global_" declaration specifier with which kernel MatAdd is defined in CUDA source code 3310. In at least one embodiment, a kernel call in HIP source code 3330 is "hipLaunchKernelGGL(MatAdd, numBlocks, threadsPerBlock, 0, 0, A, B, C);", while a corresponding kernel call in CUDA source code 3310 is "MatAdd<<<numBlocks, threadsPerBlock>>>(A, B, C);".

Figure 35:
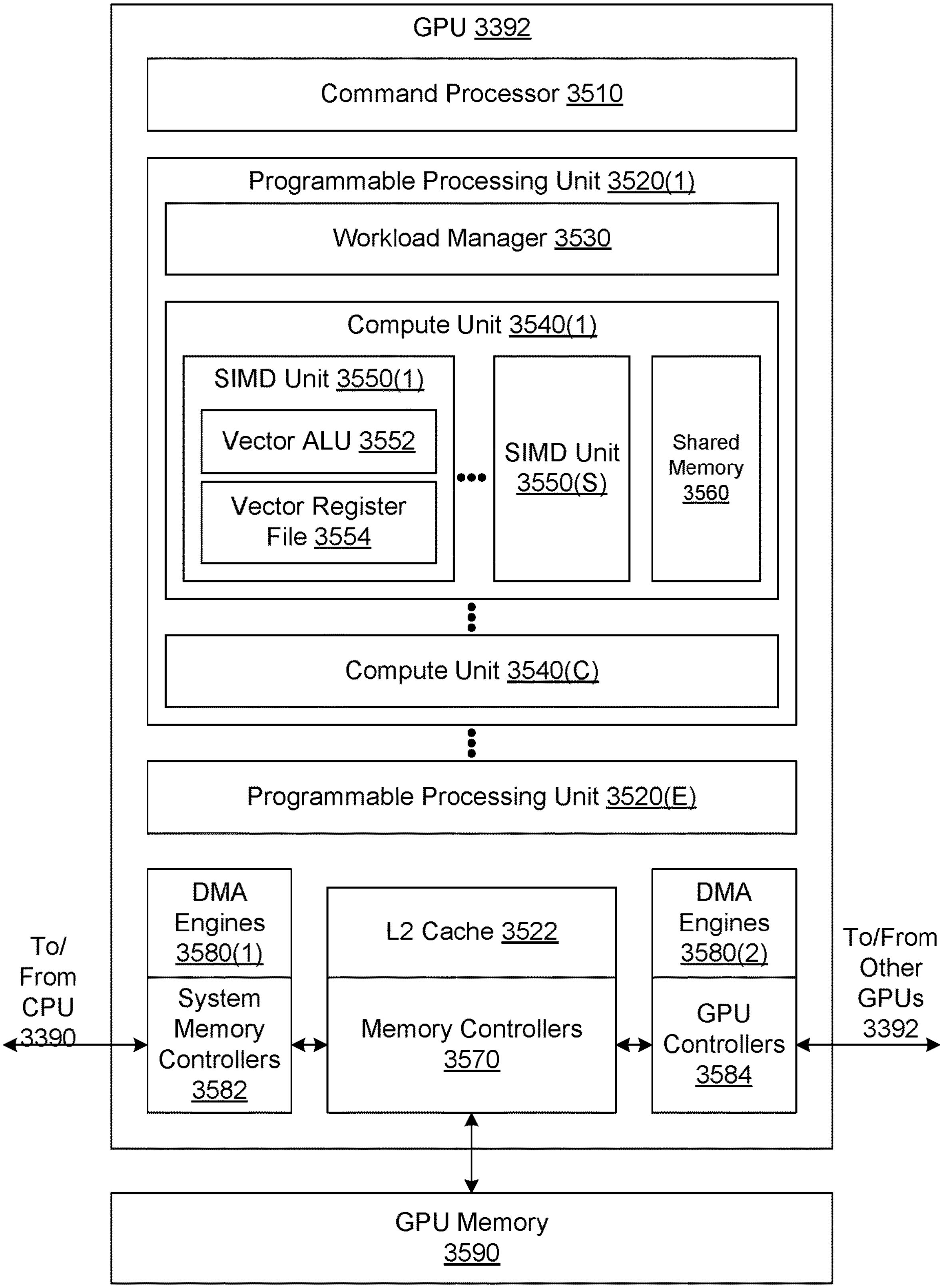
FIG. 35 illustrates non-CUDA-enabled GPU of FIG. 33C in greater detail, in accordance with at least one embodiment.

FIG. 35 illustrates non-CUDA-enabled GPU 3392 of FIG. 33C in greater detail, in accordance with at least one embodiment. In at least one embodiment, GPU 3392 is developed by AMD corporation of Santa Clara. In at least one embodiment, GPU 3392 can be configured to perform compute operations in a highly-parallel fashion. In at least one embodiment, GPU 3392 is configured to execute graphics pipeline operations such as draw commands, pixel operations, geometric computations, and other operations associated with rendering an image to a display. In at least one embodiment, GPU 3392 is configured to execute operations unrelated to graphics. In at least one embodiment, GPU 3392 is configured to execute both operations related to graphics and operations unrelated to graphics. In at least one embodiment, GPU 3392 can be configured to execute device code included in HIP source code 3330.

In at least one embodiment, GPU 3392 includes, without limitation, any number of programmable processing units 3520, a command processor 3510, an L2 cache 3522, memory controllers 3570, DMA engines 3580(1), system memory controllers 3582, DMA engines 3580(2), and GPU controllers 3584. In at least one embodiment, each programmable processing unit 3520 includes, without limitation, a workload manager 3530 and any number of compute units 3540. In at least one embodiment, command processor 3510 reads commands from one or more command queues (not shown) and distributes commands to workload managers 3530. In at least one embodiment, for each programmable processing unit 3520, associated workload manager 3530 distributes work to compute units 3540 included in programmable processing unit 3520. In at least one embodiment, each compute unit 3540 may execute any number of thread blocks, but each thread block executes on a single compute unit 3540. In at least one embodiment, a workgroup is a thread block.

In at least one embodiment, each compute unit 3540 includes, without limitation, any number of SIMD units 3550 and a shared memory 3560. In at least one embodiment, each SIMD unit 3550 implements a SIMD architecture and is configured to perform operations in parallel. In at least one embodiment, each SIMD unit 3550 includes, without limitation, a vector ALU 3552 and a vector register file 3554. In at least one embodiment, each SIMD unit 3550 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3560.

In at least one embodiment, programmable processing units 3520 are referred to as "shader engines." In at least one embodiment, each programmable processing unit 3520 includes, without limitation, any amount of dedicated graphics hardware in addition to compute units 3540. In at least one embodiment, each programmable processing unit 3520 includes, without limitation, any number (including zero) of geometry processors, any number (including zero) of rasterizers, any number (including zero) of render back ends, workload manager 3530, and any number of compute units 3540.

In at least one embodiment, compute units 3540 share L2 cache 3522. In at least one embodiment, L2 cache 3522 is partitioned. In at least one embodiment, a GPU memory 3590 is accessible by all compute units 3540 in GPU 3392. In at least one embodiment, memory controllers 3570 and system memory controllers 3582 facilitate data transfers between GPU 3392 and a host, and DMA engines 3580(1) enable asynchronous memory transfers between GPU 3392 and such a host. In at least one embodiment, memory controllers 3570 and GPU controllers 3584 facilitate data transfers between GPU 3392 and other GPUs 3392, and DMA engines 3580(2) enable asynchronous memory transfers between GPU 3392 and other GPUs 3392.

In at least one embodiment, GPU 3392 includes, without limitation, any amount and type of system interconnect that facilitates data and control transmissions across any number and type of directly or indirectly linked components that may be internal or external to GPU 3392. In at least one embodiment, GPU 3392 includes, without limitation, any number and type of I/O interfaces (e.g., PCIe) that are coupled to any number and type of peripheral devices. In at least one embodiment, GPU 3392 may include, without limitation, any number (including zero) of display engines and any number (including zero) of multimedia engines. In at least one embodiment, GPU 3392 implements a memory subsystem that includes, without limitation, any amount and type of memory controllers (e.g., memory controllers 3570 and system memory controllers 3582) and memory devices (e.g., shared memories 3560) that may be dedicated to one component or shared among multiple components. In at least one embodiment, GPU 3392 implements a cache subsystem that includes, without limitation, one or more cache memories (e.g., L2 cache 3522) that may each be private to or shared between any number of components (e.g., SIMD units 3550, compute units 3540, and programmable processing units 3520).

Figure 36:
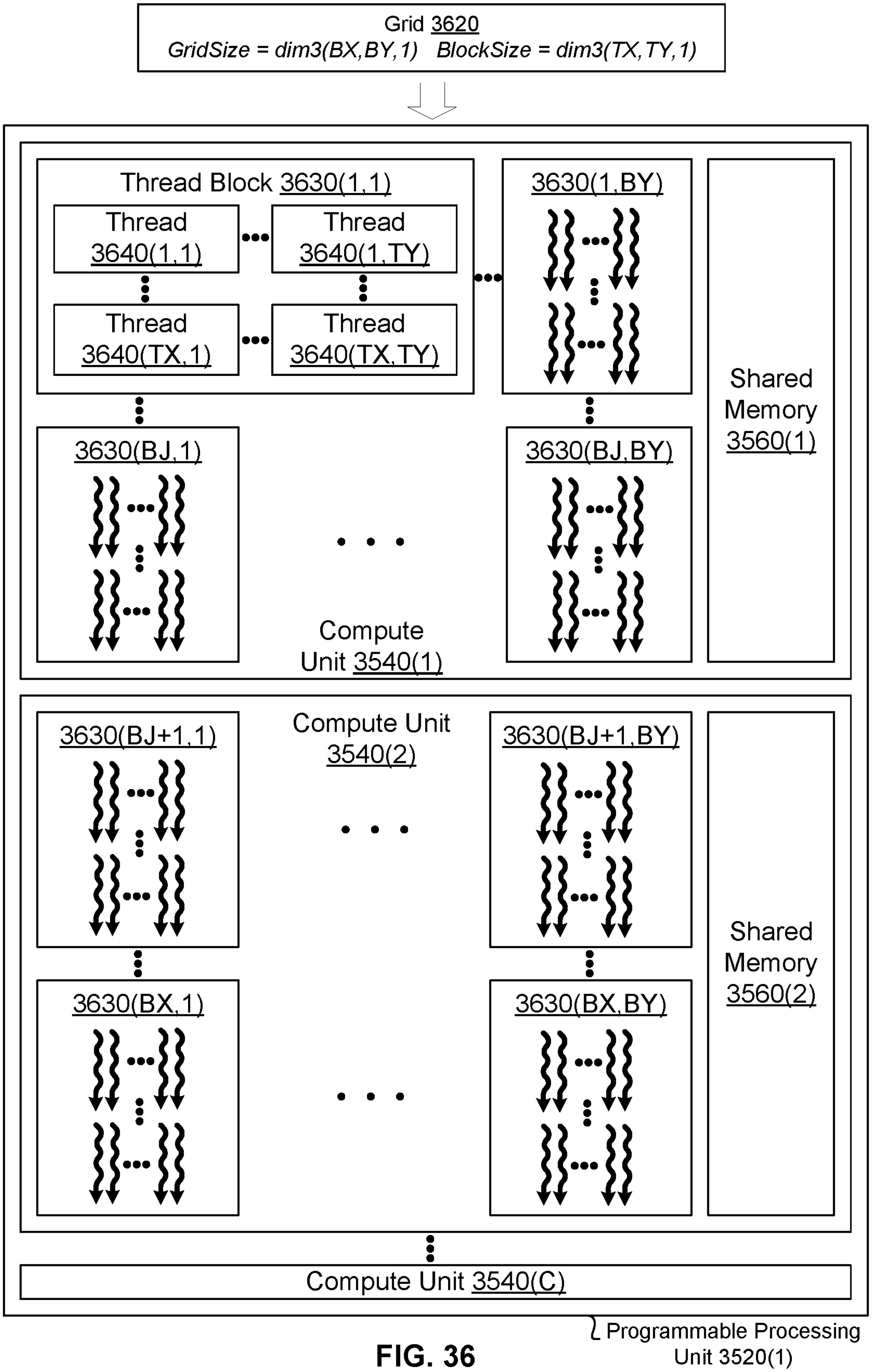
FIG. 36 illustrates how threads of an exemplary CUDA grid are mapped to different compute units of FIG. 35, in accordance with at least one embodiment.

FIG. 36 illustrates how threads of an exemplary CUDA grid 3620 are mapped to different compute units 3540 of FIG. 35, in accordance with at least one embodiment. In at least one embodiment and for explanatory purposes only, grid 3620 has a GridSize of BX by BY by 1 and a BlockSize of TX by TY by 1. In at least one embodiment, grid 3620 therefore includes, without limitation, (BX*BY) thread blocks 3630 and each thread block 3630 includes, without limitation, (TX*TY) threads 3640. Threads 3640 are depicted in FIG. 36 as squiggly arrows.

In at least one embodiment, grid 3620 is mapped to programmable processing unit 3520(1) that includes, without limitation, compute units 3540(1)-3540(C). In at least one embodiment and as shown, (BJ*BY) thread blocks 3630 are mapped to compute unit 3540(1), and the remaining thread blocks 3630 are mapped to compute unit 3540(2). In at least one embodiment, each thread block 3630 may include, without limitation, any number of warps, and each warp is mapped to a different SIMD unit 3550 of FIG. 35.

In at least one embodiment, warps in a given thread block 3630 may synchronize together and communicate through shared memory 3560 included in associated compute unit 3540. For example and in at least one embodiment, warps in thread block 3630(BJ,1) can synchronize together and communicate through shared memory 3560(1). For example and in at least one embodiment, warps in thread block 3630(BJ+1,1) can synchronize together and communicate through shared memory 3560(2).

Figure 37:
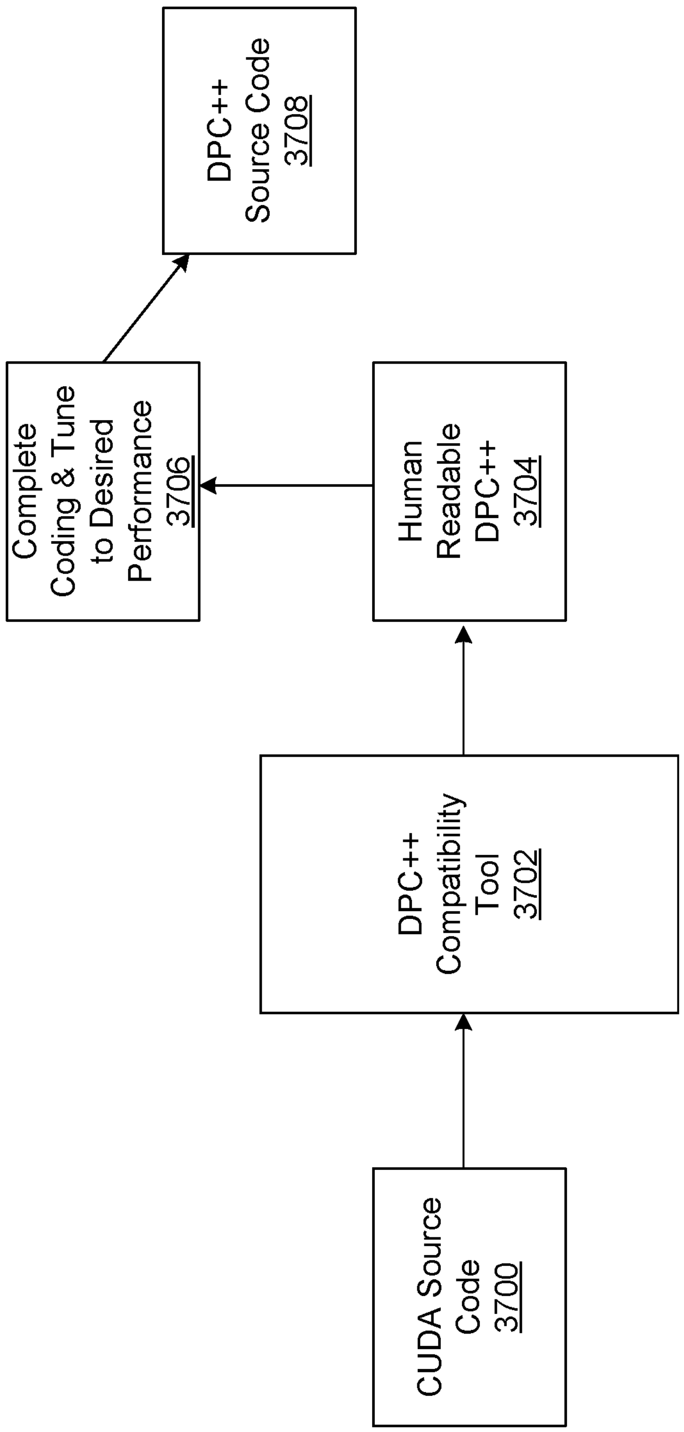
FIG. 37 illustrates how to migrate existing CUDA code to Data Parallel C++ code, in accordance with at least one embodiment.

FIG. 37 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multi-platform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 3700 is provided as an input to a DPC++ compatibility tool 3702 to generate human readable DPC++ 3704. In at least one embodiment, human readable DPC++ 3704 includes inline comments generated by DPC++ compatibility tool 3702 that guides a developer on how and/or where to modify DPC++ code to complete coding and tuning to desired performance 3706, thereby generating DPC++ source code 3708.

In at least one embodiment, CUDA source code 3700 is or includes a collection of human-readable source code in a CUDA programming language. In at least one embodiment, CUDA source code 3700 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 3700 described in connection with FIG. 37 may be in accordance with those discussed elsewhere in this document.

In at least one embodiment, DPC++ compatibility tool 3702 refers to an executable tool, program, application, or any other suitable type of tool that is used to facilitate migration of CUDA source code 3700 to DPC++ source code 3708. In at least one embodiment, DPC++ compatibility tool 3702 is a command-line-based code migration tool available as part of a DPC++ tool kit that is used to port existing CUDA sources to DPC++. In at least one embodiment, DPC++ compatibility tool 3702 converts some or all source code of a CUDA application from CUDA to DPC++ and generates a resulting file that is written at least partially in DPC++, referred to as human readable DPC++ 3704. In at least one embodiment, human readable DPC++ 3704 includes comments that are generated by DPC++ compatibility tool 3702 to indicate where user intervention may be necessary. In at least one embodiment, user intervention is necessary when CUDA source code 3700 calls a CUDA API that has no analogous DPC++ API; other examples where user intervention is required are discussed later in greater detail.

In at least one embodiment, a workflow for migrating CUDA source code 3700 (e.g., application or portion thereof) includes creating one or more compilation database files; migrating CUDA to DPC++ using a DPC++ compatibility tool 3702; completing migration and verifying correctness, thereby generating DPC++ source code 3708; and compiling DPC++ source code 3708 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 3702 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 3702 migrates CUDA code (e.g., applications) written in CUDA to DPC++ by generating DPC++ wherever possible. In at least one embodiment, DPC++ compatibility tool 3702 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 3702 to migrate CUDA code to DPC++. In at least one embodiment, non-CUDA C++ code and files are migrated as is. In at least one embodiment, DPC++ compatibility tool 3702 generates human readable DPC++ 3704 which may be DPC++ code that, as generated by DPC++ compatibility tool 3702, cannot be compiled by DPC++ compiler and requires additional plumbing for verifying portions of code that were not migrated correctly, and may involve manual intervention, such as by a developer. In at least one embodiment, DPC++ compatibility tool 3702 provides hints or tools embedded in code to help developers manually migrate additional code that could not be migrated automatically. In at least one embodiment, migration is a one-time activity for a source file, project, or application.

In at least one embodiment, DPC++ compatibility tool 37002 is able to successfully migrate all portions of CUDA code to DPC++ and there may simply be an optional step for manually verifying and tuning performance of DPC++ source code that was generated. In at least one embodiment, DPC++ compatibility tool 3702 directly generates DPC++ source code 3708 which is compiled by a DPC++ compiler without requiring or utilizing human intervention to modify DPC++ code generated by DPC++ compatibility tool 3702. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 3702. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global_void VectorAddKernel(float* A, float* B, float* C)
{
  A[threadIdx.x] = threadIdx.x + 1.0f;
  B[threadIdx.x] = threadIdx.x + 1.0f;
  C[threadIdx.x] = A[threadIdx.x] + B[threadIdx.x];
}
int main( )
{
  float *d_A, *d_B, *d_C;
  cudaMalloc(&d_A, VECTOR_SIZE*sizeof(float));
  cudaMalloc(&d_B, VECTOR_SIZE*sizeof(float));
  cudaMalloc(&d_C, VECTOR_SIZE*sizeof(float));
  VectorAddKernel<<<1, VECTOR_SIZE>>>(d_A, d_B, d_C);
  float Result[VECTOR_SIZE] = { };
  cudaMemcpy(Result, d_C, VECTOR_SIZE*sizeof(float),
cudaMemcpyDeviceToHost);
  cudaFree(d_A);
  cudaFree(d_B);
  cudaFree(d_C);
  for (int i=0; i<VECTOR_SIZE; i++ {
    if (i % 16 == 0) {
      printf("\n");
    }
    printf("%f", Result[i]);
  }
  return 0;
}
```

In at least one embodiment and in connection with CUDA source file presented above, DPC++ compatibility tool 3702 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 3702 converts CUDA thread IDs used to index work elements to SYCL standard addressing for work elements via a local ID as part of migrating CUDA code to DPC++ code. In at least one embodiment, DPC++ code generated by DPC++ compatibility tool 3702 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 3702. In at least one embodiment, DPC++ compatibility tool 3702 modify CUDA APIs for memory setup and/or host calls to execute kernel on the acceleration device. In at least one embodiment and in connection with CUDA source file presented above, a corresponding human readable DPC++ 3704 (e.g., which can be compiled) is written as or related to:

```
#include <CL/sycl.hpp>
#include <dpct/dpct.hpp>
#define VECTOR_SIZE 256
void Vector AddKernel(float* A, float* B, float* C,
            sycl::nd_item<3> item ct1)
{
  A[item_ct1.get_local_id(2)] = item_ct1.get_local_id(2) + 1.0f;
  B[item_ct1.get_local_id(2)] = item_ct1.get_local_id(2) + 1.0f;
  C[item_ct1.get_local_id(2)] =
    A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
    dpct: :get_current_device( ),
    dpct: :get_default_context( ));
  d_B = (float *)sycl::malloc_device(VECTOR_SIZE * sizeof(float),
    dpct::get_current_device( ),
    dpct::get_default_context( ));
  d_C = (float *)sycl::malloc_device(VECTOR_SIZE * sizeof(float),
    dpct::get_current_device( ),
```

-continued

```
    dpct: :get_default_context( ));
  dpct::get_default_queue_wait( ).submit([&](sycl::handler &cgh) {
    cgh.parallel_for(
      sycl::nd_range<3>(sycl::range<3>(1, 1, 1) *
          sycl::range<3>(1, 1, VECTOR_SIZE) *
          sycl::range<3>(1, 1, VECTOR_SIZE)),
      [=](sycl::nd_items<3> item_ct1) {
        VectorAddKernel(d_A, d_B, d_C, item ct1);
      });
});
float Result[VECTOR_SIZE] = { };
dpct::get_default_queue_wait( )
  .memcpy(Result, d_C, VECTOR_SIZE * sizeof(float))
  .wait( );
sycl::free(d_A, dpct::get_default_context( ));
sycl::free(d_B, dpct::get_default_context( ));
sycl::free(d_C, dpct::get_default_context( ));
for (int i=0; i<VECTOR_SIZE; i++ {
    if (i % 16 == 0) {
      printf("\n");
    }
    printf("%f", Result[i]);
  }
  return 0;
}
```

In at least one embodiment, human readable DPC++ 3704 refers to output generated by DPC++ compatibility tool 3702 and may be optimized in one manner or another. In at least one embodiment, human readable DPC++ 3704 generated by DPC++ compatibility tool 3702 can be manually edited by a developer after migration to make it more maintainable, performance, or other considerations. In at least one embodiment, DPC++ code generated by DPC++ compatibility tool 37002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 3702 replace uses of unified shared memory with accessors. In at least one embodiment, DPC++ compatibility tool 3702 has an option to change how it migrates CUDA code to DPC++ code. In at least one embodiment, DPC++ compatibility tool 3702 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 3702; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

At least one embodiment of the disclosure can be described in view of the following clauses:

1. A processor comprising: one or more circuits to cause information to be stored in one or more memory locations based, at least in part, on one or more graphs.

2. The processor of clause 1, wherein the one or more circuits are to perform a compiler to generate one or more kernels to store the information in the one or more memory locations based, at least in part, on the compiler partitioning the one or more graphs into one or more sub-graphs and computing one or more coordinate sets for each of the one or more sub-graphs, the one or more coordinate sets indicating how the information is to be used by one or more operations indicated by the one or more sub-graphs and the one or more coordinate sets indicating how to store the information in the one or more memory locations.

3. The processor of clauses 1 or 2, wherein the information is to be determined as a result of applying one or more rules to one or more data items representing edges of the one or more graphs.

4. The processor of any of clauses 1-3, wherein the one or more memory locations are consecutive memory locations to store the information for use by one or more computational operations to be performed by one or more kernels.

5. The processor of any of clauses 1-4, wherein the one or more graphs comprise nodes indicating one or more respective operations on one or more sets of data and edges indicating the one or more respective sets of data to be used by the one or more computational operations.

6. The processor of any of clauses 1-5, wherein the one or more circuits are to cause a compiler to apply one or more rules to the one or more graphs to determine one or more sets of data used by one or more computational operations indicated by the one or more graphs, the one or more sets of data comprising the information to be stored in the one or more memory locations.

7. The processor of any of clauses 1-6, wherein one or more circuits are to cause a compiler to compute one or more coordinate sets based, at least in part, on applying one or more sets of rules to one or more edges of the one or more graphs, the one or more coordinate sets indicating, at least in part, how the information is to be stored in the one or more memory locations.

8. A system comprising: one or more processors to cause information to be stored in one or more memory locations based, at least in part, on one or more graphs.

9. The system of clause 8, wherein the one or more memory locations are consecutive memory locations usable to store one or more sets of data comprising the information.

10. The system of clauses 8 or 9, wherein the one or more processors are to cause a compiler to calculate one or more coordinate sets indicating how the information is to be used by the one or more graphs, the one or more coordinate sets usable by the compiler to generate one or more kernels to store the information in the one or more memory locations.

11. The system of any of clauses 8-10, wherein the information comprises one or more sets of tensor data to be stored in the one or more memory locations.

12. The system of any of clauses 8-11, wherein the one or more processors are to cause a compiler to partition the one or more graphs into one or more subgraphs and apply one or more rules to the one or more subgraphs to determine one or more coordinate sets indicating the information, the compiler to generate one or more kernels using at least the one or more sub-graphs and the one or more coordinate sets.

13. The system of any of clauses 8-12, wherein the one or more graphs comprise nodes indicating one or more computational operations and edges indicating one or more sets of data to be used by the one or more computational operations, and the information is to be determined based, at least in part, on the nodes and edges.

14. The system of any of clauses 8-13, wherein the information is to be stored in the one or more memory locations as a result of one or more graphics processing units (GPUs) performing one or more kernels generated, based at least in part, on the one or more graphs.

15. A machine-readable medium having stored thereon one or more instructions which, if performed by one or more processors, cause the one or more processors to: cause information to be stored in one or more memory locations based, at least in part, on one or more graphs.

16. The machine-readable medium of clause 15, wherein the one or more graphs are to be generated by a compiler based, at least in part, on source code indicated to the compiler comprising one or more computational operations to be performed using the information.

17. The machine-readable medium of clauses 15 or 16, further comprising instructions which, if performed by the one or more processors, cause the one or more processors to cause a compiler to generate one or more kernels based, at least in part, on the one or more graphs and one or more coordinate sets indicating the information, where the one or more kernels, if performed, are to cause the information to be stored in the one or more memory locations.

18. The machine-readable medium of any of clauses 15-17, further comprising instructions which, if performed by the one or more processors, cause the one or more processors to apply one or more rules to the one or more graphs, the one or more rules to determine one or more coordinate sets indicating the information to be stored in the one or more memory locations.

19. The machine-readable medium of any of clauses 15-18, wherein the one or more memory locations are consecutive memory locations in memory of a graphics processing unit (GPU) to be used by one or more kernels to store vectorized data representing the information as a result of one or more computations indicated by the one or more graphs.

20. The machine-readable medium of any of clauses 15-19, wherein the information comprises one or more sets of vectorized data to be stored in the one or more memory locations.

21. The machine-readable medium of any of clauses 15-20, further comprising instructions which, if performed by the one or more processors, cause the one or more processors to cause a compiler to partition the one or more graphs into one or more sub-graphs and apply one or more rules to the one or more sub-graphs to generate one or more coordinate sets indicating the information, the one or more coordinate sets and the one or more graphs usable to generate one or more kernels to store the information in the one or more memory locations.

22. The machine-readable medium of any of clauses 15-21, wherein the one or more graphs comprise one or more nodes indicating one or more computational operations and one or more edges indicating one or more sets of data, and the information is to be determined by a compiler based, at least in part, on the one or more nodes and the one or more edges.

23. The machine-readable medium of any of clauses 15-22, further comprising instructions which, if performed by the one or more processors, cause the one or more processors to determine one or more sets of data indicating the information, the one or more sets of data determined in response to applying one or more rules to one or more edges of the one or more graphs.

24. A method comprising: causing information to be stored in one or more memory locations based, at least in part, on one or more graphs.

25. The method of clause 24, further comprising determining one or more sub-graphs of the one or more graphs and, for each sub-graph, applying one or more rules to determine one or more coordinate sets indicating the information to be stored in the one or more memory locations.

26. The method of clauses 24 or 25, further comprising determining the information based, at least in part, on applying one or more rules to one or more sets of data indicated by the one or more graphs, the one or more sets of data indicating data to be used by one or more computational operations of the one or more graphs.

27. The method of any of clauses 24-26, further comprising generating one or more kernels that, if performed, store the information in the one or more memory locations, the one or more kernels generated based, at least in part, on the one or more graphs.

28. The method of any of clauses 24-27, further comprising generating one or more sets of data based, at least in part, on one or more computational operations indicated by the one or more graphs and generating one or more kernels based, at least in part, on the one or more sets of data and the one or more graphs.

29. The method of any of clauses 24-28, further comprising generating the one or more graphs based, at least in part, on one or more source code files input to a compiler, the source code files indicating one or more computational operations to be performed using the information.

30. The method of any of clauses 24-29, wherein the one or more memory locations are memory locations of a graphics processing unit (GPU) to store vectorized data, and the GPU is to store the information in the one or more memory locations as a result of executing one or more kernels generated based, at least in part, on the one or more graphs.

31. The method of any of clauses 24-30, wherein the one or more memory locations are consecutive memory locations to store a set of data representing the information.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable and/or machine-readable storage medium, for example, in form of a computer program comprising a plurality of instructions executable by one or more processors. In at least one embodiment, code is stored on a computer-readable and/or machine-readable storage medium, for example, in form of one or more application programming interfaces (APIs) comprising a plurality of instructions executable by one or more processors. In at least one embodiment, code is stored on a computer-readable and/or machine-readable storage medium, for example, in form of one or more APIs comprising one or more interfaces that, when invoked, cause a plurality of instructions to be executed by one or more processors In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, a machine-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable and/or machine-readable storage media having stored thereon executable instructions (or other memory to store executable instructions) that, when executed (e.g., as a result of being executed) by one or more processors of a computer system, cause computer system to perform operations described herein. A set of non-transitory computer-readable and/or machine-readable storage media, in at least one embodiment, comprises multiple non-transitory computer-readable and/or machine-readable storage media and one or more of individual non-transitory storage media of multiple non-transitory computer-readable storage media lack all of code while multiple non-transitory computer-readable and/or machine-readable storage media collectively store all of code. In at least one embodiment, executable instructions are executed such that different instructions are executed by different processors—for example, a non-transitory computer-readable and/or machine-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:
circuitry to:
use a graph corresponding to an execution of a software program to identify one or more elements of a data structure to be generated in discrete elements by execution of corresponding different parts of the software program; and
compile the software program to cause the one or more elements to be stored in a contiguous range of memory.

2. The one or more processors of claim 1, wherein the circuitry is to perform a compiler to generate one or more kernels to store the one or more elements of the data structure in the contiguous range of memory based, at least in part, on the compiler partitioning the graph into one or more sub-graphs and computing one or more coordinate sets for each of the one or more sub-graphs, the one or more coordinate sets indicating how the one or more elements of the data structure are to be used by one or more operations indicated by the one or more sub-graphs and the one or more coordinate sets indicating how to store the one or more elements of the data structure in the contiguous range of memory.

3. The one or more processors of claim 1, wherein the one or more elements of the data structure are to be determined as a result of applying one or more rules to one or more data items representing edges of the graph.

4. The one or more processors of claim 1, wherein the contiguous range of memory locations are consecutive memory locations to store the one or more elements of the data structure for use by one or more computational operations to be performed by one or more kernels.

5. The one or more processors of claim 1, wherein the graph comprise nodes indicating one or more respective operations on one or more sets of data and edges indicating one or more respective sets of data to be used by one or more computational operations.

6. The one or more processors of claim 1, wherein the circuitry is to cause a compiler to apply one or more rules to the graph to determine one or more sets of data used by one or more computational operations indicated by the graph, the one or more sets of data comprising the one or more elements of the data structure to be stored in the contiguous range of memory.

7. The one or more processors of claim 1, wherein the circuitry is to cause a compiler to compute one or more coordinate sets based, at least in part, on applying one or more sets of rules to one or more edges of the graph, the one or more coordinate sets indicating, at least in part, how the one or more elements of the data structure are to be stored in the contiguous range of memory.

8. The one or more processors of claim 1, wherein the one or more elements comprise information to be generated by different threads to be performed in parallel.

9. The one or more processors of claim 1, wherein the execution of the corresponding different parts of the software program generates elements of the same data structure.

10. A system comprising:

one or more processors to:

use a graph corresponding to an execution of a software program to identify one or more elements of a data structure to be generated in discrete elements by execution of corresponding different parts of the software program; and compile the software program to cause the one or more elements to be stored in a contiguous range of memory.

11. The system of claim 10, wherein the contiguous range of memory is usable to store one or more sets of data comprising the one or more elements of the data structure.

12. The system of claim 10, wherein the one or more processors are to cause a compiler to calculate one or more coordinate sets indicating how the one or more elements of the data structure are to be used by the graph, the one or more coordinate sets usable by the compiler to generate one or more kernels to store the one or more elements of the data structure in the contiguous range of memory.

13. The system of claim 10, wherein the one or more elements of the data structure comprise one or more sets of tensor data to be stored in the contiguous range of memory.

14. The system of claim 10, wherein the one or more processors are to cause a compiler to partition the graph into one or more sub-graphs and apply one or more rules to the one or more sub-graphs to determine one or more coordinate sets indicating the one or more elements of the data structure, and further to cause the compiler to generate one or more kernels using at least the one or more sub-graphs and the one or more coordinate sets.

15. The system of claim 10, wherein the graph comprise nodes indicating one or more computational operations and edges indicating one or more sets of data to be used by the one or more computational operations, and the one or more elements of the data structure are to be determined based, at least in part, on the nodes and edges.

16. The system of claim 10, wherein the one or more elements of the data structure are to be stored in the contiguous range of memory as a result of one or more graphics processing units (GPUs) performing one or more kernels generated, based at least in part, on the graph.

17. A non-transitory machine-readable medium having stored thereon one or more instructions which, if performed by one or more processors, cause the one or more processors to:

use a graph corresponding to an execution of a software program to identify one or more elements of a data structure to be generated in discrete elements by execution of corresponding different parts of the software program; and compile the software program to cause the one or more elements to be stored in a contiguous range of memory.

18. The non-transitory machine-readable medium of claim 17, wherein the graph is to be generated by a compiler based, at least in part, on source code indicated to the compiler comprising one or more computational operations to be performed using the one or more elements of the data structure.

19. The non-transitory machine-readable medium of claim 17, further comprising instructions which, if performed by the one or more processors, cause the one or more processors to cause a compiler to generate one or more kernels based, at least in part, on the graph and one or more coordinate sets indicating the one or more elements of the data structure, where the one or more kernels, if performed, are to cause the one or more elements of the data structure to be stored in the contiguous range of memory.

20. The non-transitory machine-readable medium of claim 17, further comprising instructions which, if performed by the one or more processors, cause the one or more processors to apply one or more rules to the graph, the one or more rules to determine one or more coordinate sets indicating the one or more elements of the data structure to be stored in the contiguous range of memory.

21. The non-transitory machine-readable medium of claim 17, wherein the contiguous range of memory is in memory of a graphics processing unit (GPU) to be used by one or more kernels to store vectorized data representing the one or more elements of the data structure as a result of one or more computations indicated by the graph.

22. The non-transitory machine-readable medium of claim 17, wherein the one or more elements of the data structure comprise one or more sets of vectorized data to be stored in the contiguous range of memory.

23. The non-transitory machine-readable medium of claim 17, further comprising instructions which, if performed by the one or more processors, cause the one or more processors to cause a compiler to partition the graph into one or more sub-graphs and apply one or more rules to the one or more sub-graphs to generate one or more coordinate sets indicating the one or more elements of the data structure, the one or more coordinate sets and the graph usable to generate one or more kernels to store the one or more elements of the data structure in the contiguous range of memory.

24. The non-transitory machine-readable medium of claim 17, wherein the graph comprise one or more nodes indicating one or more computational operations and one or more edges indicating one or more sets of data, and the one or more elements of the data structure are to be determined by a compiler based, at least in part, on the one or more nodes and the one or more edges.

25. The non-transitory machine-readable medium of claim 17, further comprising instructions which, if performed by the one or more processors, cause the one or more processors to determine one or more sets of data indicating the one or more elements of the data structure, the one or more sets of data determined in response to applying one or more rules to one or more edges of the graph.

26. A method comprising:

using a graph corresponding to an execution of a software program to identify one or more elements of a data structure to be generated in discrete elements by execution of corresponding different parts of the software program; and compiling the software program to cause the one or more elements to be stored in a contiguous range of memory.

27. The method of claim 26, further comprising:
determining one or more sub-graphs of the graph and, for each sub-graph, applying one or more rules to determine one or more coordinate sets indicating the one or more elements of the data structure to be stored in the contiguous range of memory.

28. The method of claim 26, further comprising:
determining the one or more elements of the data structure based, at least in part, on applying one or more rules to one or more sets of data indicated by the graph, the one or more sets of data indicating data to be used by one or more computational operations of the graph.

29. The method of claim 26, further comprising:
generating one or more kernels that, if performed, store the one or more elements of the data structure in the contiguous range of memory, the one or more kernels generated based, at least in part, on the graph.

30. The method of claim 26, further comprising:
generating one or more sets of data based, at least in part, on one or more computational operations indicated by the graph and generating one or more kernels based, at least in part, on the one or more sets of data and the graph.

31. The method of claim 26, further comprising:
generating the graph based, at least in part, on one or more source code files input to a compiler, the one or more source code files indicating one or more computational operations to be performed using the one or more elements of the data structure.

32. The method of claim 26, wherein the contiguous range of memory comprises memory locations of a graphics processing unit (GPU) to store vectorized data, and the GPU is to store the one or more elements of the data structure in the contiguous range of memory as a result of executing one or more kernels generated based, at least in part, on the graph.

33. The method of claim 26, wherein the contiguous range of memory is to store a set of data representing the one or more elements of the data structure.

* * * * *